(12) United States Patent
Wang et al.

(10) Patent No.: US 11,233,943 B2
(45) Date of Patent: Jan. 25, 2022

(54) MULTI-GIMBAL ASSEMBLY

(71) Applicant: SZ DJI TECHNOLOGY CO., LTD., Shenzhen (CN)

(72) Inventors: Mingxi Wang, Shenzhen (CN); Qi Zhou, Shenzhen (CN); Hanping Chen, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 226 days.

(21) Appl. No.: 16/540,457

(22) Filed: Aug. 14, 2019

(65) Prior Publication Data
US 2019/0373173 A1 Dec. 5, 2019

Related U.S. Application Data

(63) Continuation of application No. PCT/CN2017/074778, filed on Feb. 24, 2017.

(51) Int. Cl.
*H04N 5/232* (2006.01)
*G03B 15/00* (2021.01)

(52) U.S. Cl.
CPC ....... *H04N 5/23258* (2013.01); *G03B 15/006* (2013.01); *H04N 5/23216* (2013.01); *H04N 5/23241* (2013.01)

(58) Field of Classification Search
CPC .......... H04N 5/23258; H04N 5/23241; H04N 5/23216; H04N 5/23245; H04N 5/232;
(Continued)

(56) References Cited

U.S. PATENT DOCUMENTS 5,418,364 A * 5/1995 Hale .................... F41G 3/24
244/3.16
2013/0321656 A1 12/2013 Ducharme et al.
(Continued)

FOREIGN PATENT DOCUMENTS

CN 101093653 A 12/2007
CN 101291396 A 10/2008
(Continued)

OTHER PUBLICATIONS

World Intellectual Property Organization International Search Report and Written Opinion for PCT/CN2017/074778 dated Nov. 29, 2017 10 Pages.

*Primary Examiner* — Clayton E. LaBalle
*Assistant Examiner* — Fang-Chi Chang
(74) *Attorney, Agent, or Firm* — Anova Law Group, PLLC

(57) ABSTRACT

A method includes showing a plurality of regions on a display each associated with a respective gimbal of a plurality of gimbals carried by a movable object and configured to depict data captured by a payload carried by the respective gimbal. The plurality of regions include a first region and a second region, and the plurality of gimbals include a first gimbal associated with the first region and a second gimbal associated with the second region. The method further includes, in response to a user interaction with the first region, controlling operation of the first gimbal and not operation of the second gimbal based on the user interaction with the first region when the movable object is operating in an independent mode, and simultaneously controlling the operation of the first gimbal and at least the operation of the second gimbal in a synchronized manner based on the user interaction with the first region when the movable object is operating in a simultaneous mode.

20 Claims, 30 Drawing Sheets

(58) Field of Classification Search
CPC ....... H04N 5/232933; H04N 5/232935; H04N 5/232939; H04N 5/232945; H04N 5/23299; G03B 15/006
See application file for complete search history.

(56) References Cited

U.S. PATENT DOCUMENTS

| | | | |
|---|---|---|---|
| 2016/0292403 A1 | 10/2016 | Gong et al. | |
| 2017/0053169 A1 | 2/2017 | Cuban et al. | |
| 2017/0363391 A1* | 12/2017 | Conklin | F41G 5/14 |
| 2021/0011358 A1* | 1/2021 | Weng | G05D 1/0038 |

FOREIGN PATENT DOCUMENTS

| | | | |
|---|---|---|---|
| CN | 101656873 A | | 2/2010 |
| CN | 101788884 A | | 7/2010 |
| CN | 102156481 A | | 8/2011 |
| CN | 102316306 A | | 1/2012 |
| CN | 102419171 A | | 4/2012 |
| CN | 103076810 A | | 5/2013 |
| CN | 103426282 A | | 12/2013 |
| CN | 104061910 A | | 9/2014 |
| CN | 104486543 A | | 4/2015 |
| CN | 104793887 A | | 7/2015 |
| CN | 104883492 A | | 9/2015 |
| CN | 204993614 U | | 1/2016 |
| CN | 105334869 A | | 2/2016 |
| CN | 105700812 A | | 6/2016 |
| CN | 105872365 A | | 8/2016 |
| CN | 105892472 A | | 8/2016 |
| CN | 205809292 U | | 12/2016 |
| CN | 205847409 U | * | 12/2016 |
| JP | 2006005451 A | | 1/2006 |
| JP | 2006282039 A | | 10/2006 |
| JP | 2013005275 A | | 1/2013 |

* cited by examiner

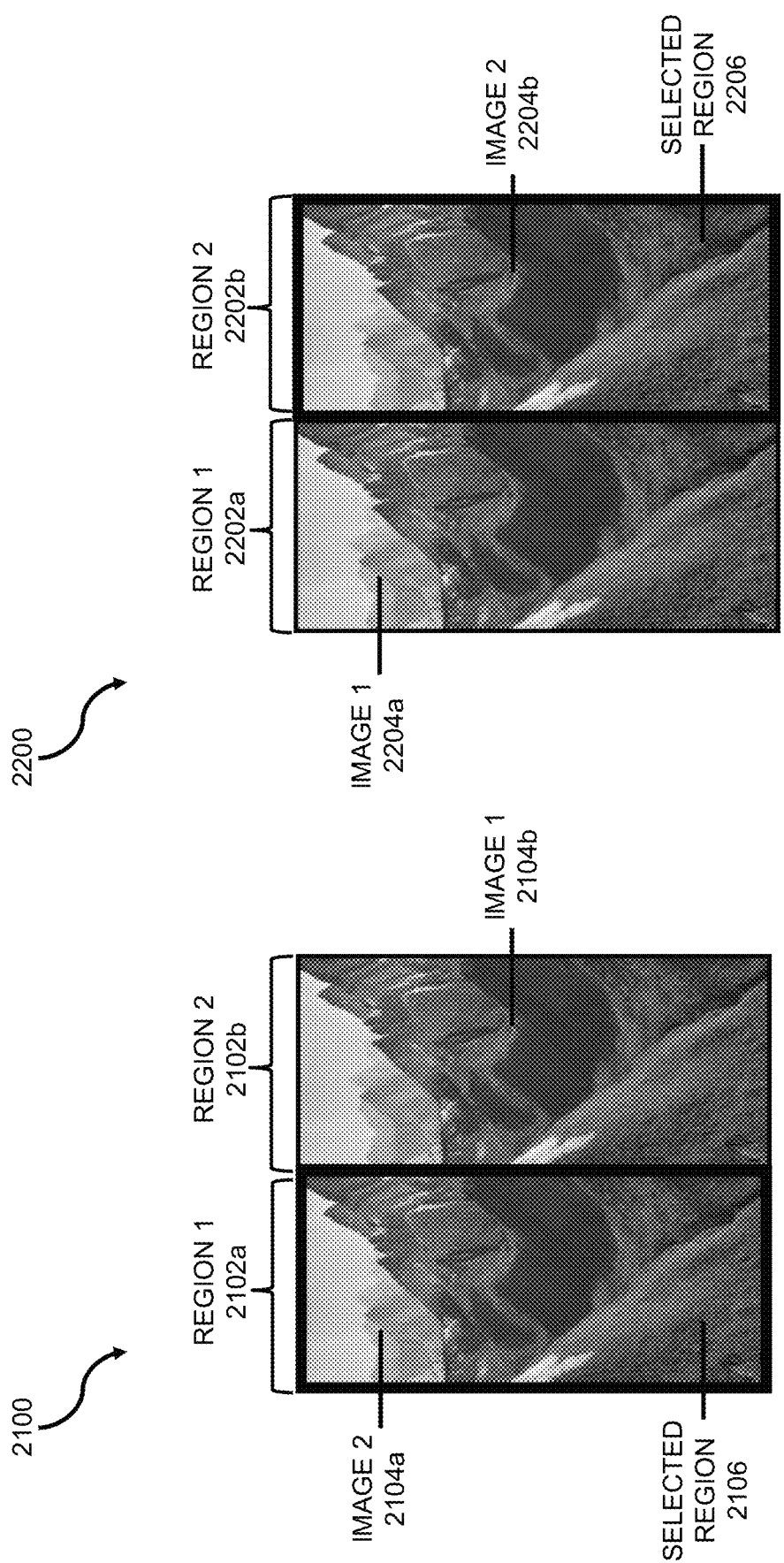

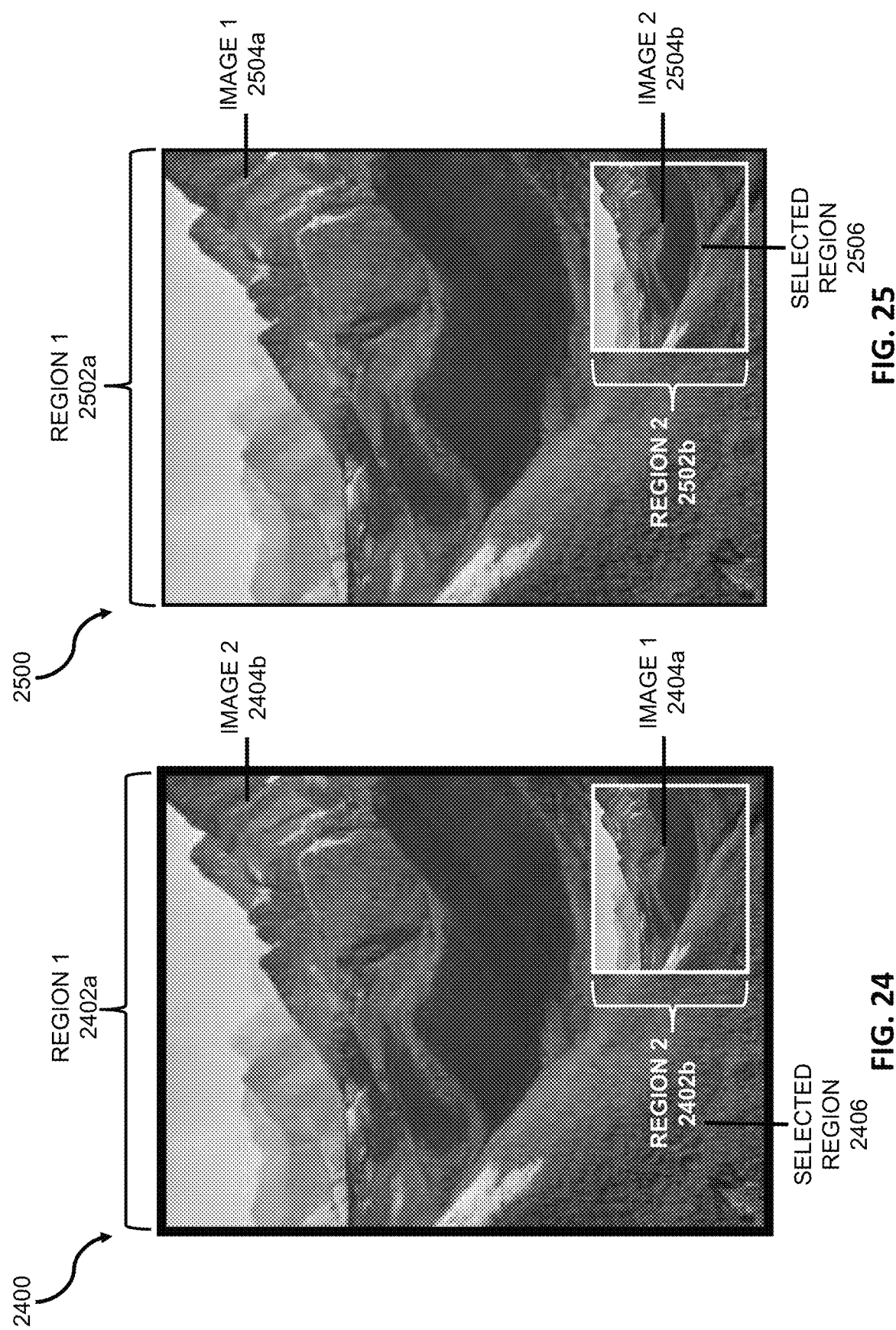

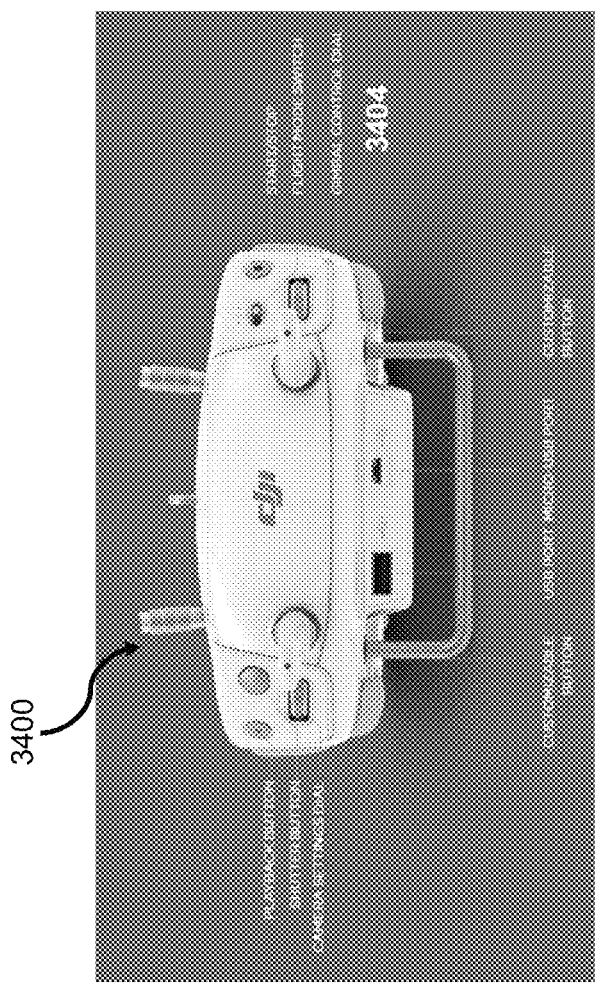
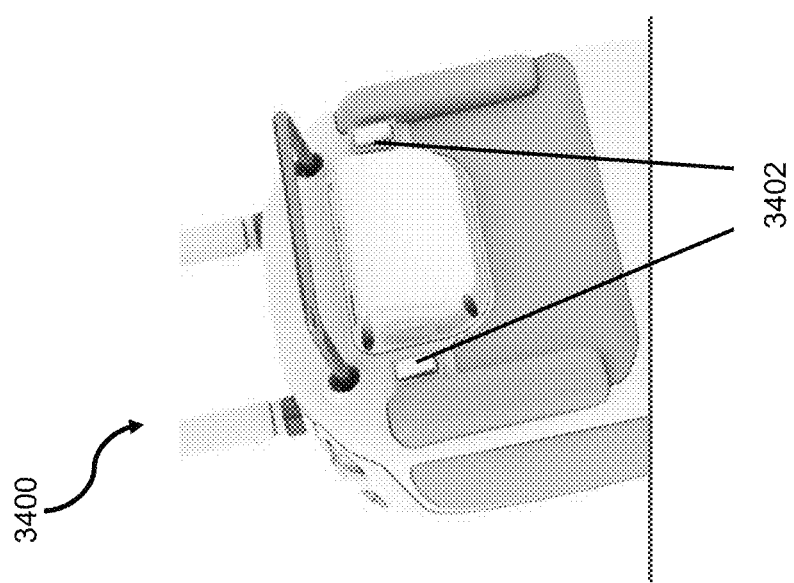
FIG. 34

MULTI-GIMBAL ASSEMBLY

CROSS-REFERENCE TO RELATED APPLICATION

This application is a continuation of International Application No. PCT/CN2017/074778, filed Feb. 24, 2017, the entire content of which is incorporated herein by reference.

BACKGROUND OF THE DISCLOSURE

Traditionally, movable objects, such as unmanned aerial vehicles (UAVs) carry a single gimbal that supports a camera. The movable object may traverse an environment to capture images using the camera supported by the single gimbal. While this permits the movable object to be operated for surveillance and recreational purposes, this limits the use of the movable object.

For instance, during a fire rescue, a user may mount an infrared camera on a UAV to capture infrared images. Then the user would have to land the UAV, take off the infrared camera, and then mount a second visible light camera to capture visible light images, wasting time and resources, and potentially missing the best rescue time. In another example, a UAV may be used to inspect both banks of a river. However, the user has to fly the UAV back and forth because only a single bank can be inspected during a single pass.

SUMMARY OF THE DISCLOSURE

A need exists for systems and methods for providing greater flexibility during operation of a movable object to capture information about the surrounding environment. A need exists for a movable object to support two or more gimbals, each supporting at least one camera. A need exists to simplify operation of the movable object with multiple cameras that may make it easy for a single user or two users to operate such a movable object.

Multi-gimbal assemblies may be provided. For example, a UAV may carry a dual-gimbal configuration, with two gimbals, each supporting at least one camera. The gimbals may be separable from the UAV. The cameras may be of the same type or different types. The gimbals and/or cameras may be interchangeable with other gimbals and/or cameras. Mechanical and electrical communications may be made upon coupling the gimbals with the UAV. A platform may be provided to facilitate coupling the gimbals with the UAV. Controls of the operation of the UAV and/or operation of the gimbals may be executed with aid of one, two, or more remote controllers.

Aspects of the disclosure are directed to a method of controlling operation of a plurality of gimbals carried by a movable object, said method comprising: showing, on a display, a plurality of regions, each region associated with a respective gimbal of said plurality of gimbals and configured to depict data captured by a payload carried by the respective gimbal; in response to a user interaction with a first region of said plurality of regions, the first region associated with a first gimbal of said plurality of gimbals, controlling operation of the first gimbal and not a second gimbal of said plurality of gimbals based on the user interaction with the first region when operating in an independent mode; and simultaneously controlling operation of the first gimbal and at least the second gimbal in a synchronized manner based on the user interaction with the first region when operating in a simultaneous mode.

Further aspects of the disclosure may be directed to a controller of controlling operation of a plurality of gimbals carried by a movable object, said controller comprising: a display showing a plurality of regions, each region associated with a respective gimbal and depicting data captured by a payload carried by the respective gimbal; and one or more processors configured to generate one or more signals for, in response to a user interaction with a first region of said plurality of regions, the first region associated with a first gimbal of said plurality of gimbals: (a) controlling operation of the first gimbal and not a second gimbal of said plurality of gimbals based on the user interaction with the first region when operating in an independent mode; and (b) simultaneously controlling operation of the first gimbal and at least the second gimbal in a synchronized manner based on the user interaction with the first region when operating in a simultaneous mode.

Additionally, aspects of the disclosure may be directed to a method of controlling operation of a plurality of gimbals carried by an unmanned aerial vehicle, said method comprising: receiving a first set of commands from a first remote controller configured to transmit commands to the unmanned aerial vehicle that affect flight of the unmanned aerial vehicle; receiving a second set of commands from a second remote controller configured to transmit commands that affect operation the plurality of gimbals; and controlling operation of the plurality of gimbals in accordance with the commands that affect operation of the plurality of gimbals.

An unmanned aerial vehicle (UAV) carrying a plurality of gimbals may be provided in accordance with additional aspects of the disclosure, said unmanned aerial vehicle comprising: one or more propulsion units allow flight of the unmanned aerial vehicle; and one or more communication units carried by the unmanned aerial vehicle, wherein the one or more communication units are configured to: receive a first set of commands from a first remote controller configured to transmit commands to the unmanned aerial vehicle that affect the flight of the unmanned aerial vehicle; and receive a second set of commands from a second remote controller configured to transmit commands that affect operation the plurality of gimbals.

Moreover, aspects of the disclosure may be directed to a method of controlling operation of a plurality of gimbals carried by an unmanned aerial vehicle, said method comprising: receiving a first set of commands from a first remote controller configured to transmit (1) commands to the unmanned aerial vehicle that affect flight of the unmanned aerial vehicle and (2) commands that affect operation of a first gimbal of said plurality of gimbals; receiving a second set of commands from a second remote controller configured to transmit commands that affect operation of a second gimbal of said plurality of gimbals; controlling operation of the first gimbal in accordance with the commands that affect operation of the first gimbal; and controlling operation of the second gimbal in accordance with the commands that affect operation of the second gimbal.

Aspects of the disclosure may also be directed to an unmanned aerial vehicle (UAV) carrying a plurality of gimbals, said unmanned aerial vehicle comprising: one or more propulsion units allow flight of the unmanned aerial vehicle; and one or more communication units carried by the unmanned aerial vehicle, wherein the one or more communication units are configured to: receive a first set of commands from a first remote controller configured to transmit (1) commands to the unmanned aerial vehicle that affect flight of the unmanned aerial vehicle and (2) commands that affect operation of a first gimbal of said plurality of gimbals;

and receive a second set of commands from a second remote controller configured to transmit commands that affect operation of a second gimbal of said plurality of gimbals.

Further aspects of the disclosure may be directed to a platform configured to be carried by a movable object, said platform comprising: a first interface configured to couple with a first gimbal, wherein the first interface is capable of receiving communications from the first gimbal indicative of a type of the first gimbal, when the first gimbal is coupled with the first interface; and a second interface, at a different location from the first interface, configured to couple with a second gimbal, wherein the second interface is capable of receiving communications from the second gimbal indicative of a type of the second gimbal, when the second gimbal is coupled with the second interface.

Additionally, aspects of the disclosure may be directed to a method of supporting a first gimbal and a second gimbal to be carried by a movable object, said method comprising: receiving, at a first interface configured to couple with the first gimbal, communications from the first gimbal indicative of a type of the first gimbal, when the first gimbal is coupled with the first interface; and receiving, at a second interface at a different location from the first interface and configured to couple with the second gimbal, communications from the second gimbal indicative of a type of the second gimbal, when the second gimbal is coupled with the second interface.

An unmanned aerial vehicle (UAV) may be provided in accordance with further aspects of the disclosure, the UAV comprising: a first interface configured to couple with a first gimbal, wherein the first interface is capable of receiving communications from the first gimbal indicative of a type of the first gimbal, when the first gimbal is couple with the first interface; and a second interface, at a different location from the first interface, configured to couple with a second gimbal, wherein the second interface is capable of receiving communications from the second gimbal indicative of a type of the second gimbal, when the second gimbal is coupled with the second interface.

In some aspects of the disclosure, a platform configured to be carried by a movable object may be provided, said platform comprising: a first interface configured to couple with a first gimbal, wherein the first interface is capable of conveying one or more commands to the first gimbal that affects operation of the first gimbal or a payload carried by the first gimbal; and a second interface configured to couple with a second gimbal, wherein the second interface comprises a microcontroller unit (MCU) configured to update and convey one or more commands to the second gimbal that affects operation of the second gimbal or a payload carried by the second gimbal.

Additionally, aspects of the disclosure may also be directed to a method of supporting a first gimbal and a second gimbal to be carried by a movable object, said method comprising: conveying, via a first interface configured to couple with the first gimbal, one or more commands to the first gimbal that affects operation of the first gimbal or a payload carried by the first gimbal, when the first gimbal is coupled with the first interface; and conveying, via a microcontroller unit (MCU) of a second interface configured to couple with the second gimbal, one or more commands to the second gimbal that affects operation of the second gimbal or a payload carried by the second gimbal, when the second gimbal is coupled with at the second interface.

Aspects of the disclosure may also be directed to an unmanned aerial vehicle (UAV) comprising: a first interface configured to couple with a first gimbal, wherein the first interface is capable of conveying one or more commands to the first gimbal that affects operation of the first gimbal or a payload carried by the first gimbal; and a second interface configured to couple with a second gimbal, wherein the second interface comprises a microcontroller unit (MCU) configured to update and convey one or more commands to the second gimbal that affects operation of the second gimbal or a payload carried by the second gimbal.

Moreover, aspects of the disclosure may be directed to a method of supporting multiple gimbals on a movable object, said method comprising: providing a plurality of interfaces, each interface carried by the movable object and configured to releasably couple with a gimbal; detecting, with aid of a first sensor of an interface, that a gimbal is at least partially connected to the interface; detecting with aid of a second sensor of the interface, that a gimbal is securely locked into the interface; and providing (1) power to the gimbal via the interface, (2) data to the gimbal via the interface, or (3) data from the gimbal to the interface, in response to detecting that the gimbal is at least partially connected to the interface and detecting that the gimbal is securely locked into the interface.

In some aspects of the disclosure, a platform configured to support multiple gimbals on a movable object may be provided, said platform comprising: a plurality of interfaces, each interface carried by the movable object and configured to releasably couple with a gimbal; a first sensor of an interface of said plurality of interfaces, said first sensor configured to detect that a gimbal is at least partially connected to the interface; and a second sensor of the interface configured to detect that a gimbal is securely locked into the interface, wherein (1) the interface is configured to provide power to the gimbal, (2) the interface is configured to provide data to the gimbal, or (3) the gimbal is configured to provide data to the interface, when the first sensor indicates that the gimbal is at least partially connected to the interface and the second sensor indicates that the gimbal is securely locked into the interface.

Further aspects of the disclosure maybe directed to an unmanned aerial vehicle (UAV) comprising: a plurality of propulsion units configured to generate lift for the UAV; and one or more processors configured to: receive data indicative of a type of a first gimbal carried by the UAV and data indicative of a type of a second gimbal carried by the UAV; and generate instructions to control operation of the plurality of propulsion units based on the type of the first gimbal and the type of the second gimbal.

Additionally, aspects of the disclosure may be directed to a method of controlling flight based on gimbal type, said method comprising: obtaining data indicative of a type of a first gimbal carried by the UAV and data indicative of a type of a second gimbal carried by the UAV; generating, with aid of one or more processors, instructions to control operation of a plurality of propulsion units based on the type of the first gimbal and the type of the second gimbal; and actuating the plurality of propulsion units in response to the instructions, thereby generating lift of the UAV.

In accordance with aspects of the disclosure, a method of controlling operation of a plurality of gimbals carried by a movable object may be provided, said method comprising: receiving, with aid of a communication unit, communications for controlling operation of a selected gimbal of said plurality of gimbals; generating, with aid of one or more processors, commands that include (1) a designation of the selected gimbal and (2) instructions for controlling operation of the selected gimbal; and conveying the commands to the selected gimbal and not to other gimbals of the plurality of gimbals with aid of the designation of the selected gimbal.

Moreover, aspects of the disclosure may be directed to a movable object carrying a plurality of gimbals, said movable object comprising: a communication unit configured to receive communications for controlling operation of a selected gimbal of said plurality of gimbals; one or more processors configured to generate commands that include (1) a designation of the selected gimbal and (2) instructions for controlling operation of the selected gimbal; and a communication bus configured to convey the commands to the selected gimbal and not to other gimbals of the plurality of gimbals with aid of the designation of the selected gimbal.

Additional aspects and advantages of the present disclosure will become readily apparent to those skilled in this art from the following detailed description, wherein only exemplary embodiments of the present disclosure are shown and described, simply by way of illustration of the best mode contemplated for carrying out the present disclosure. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the disclosure are set forth with particularity in the appended claims. A better understanding of the features and advantages of the present disclosure will be obtained by reference to the following detailed description that sets forth illustrative embodiments, in which the principles of the disclosure are utilized, and the accompanying drawings (also "Figure" and "FIG." herein), of which:

FIG. 21 shows an example of a user interface when operating in a simultaneous mode, in accordance with embodiments of the disclosure.

FIG. 22 shows another example of a user interface when operating in a simultaneous mode, in accordance with embodiments of the disclosure.

FIG. 24 shows another example of a user interface when operating in a simultaneous mode, in accordance with embodiments of the disclosure.

FIG. 25 shows another example of a user interface when operating in a simultaneous mode, in accordance with embodiments of the disclosure.

FIG. 34 illustrates examples of a remote controller that may be used to control a gimbal, in accordance with embodiments of the disclosure.

DETAILED DESCRIPTION OF THE EMBODIMENTS

Figure 1:
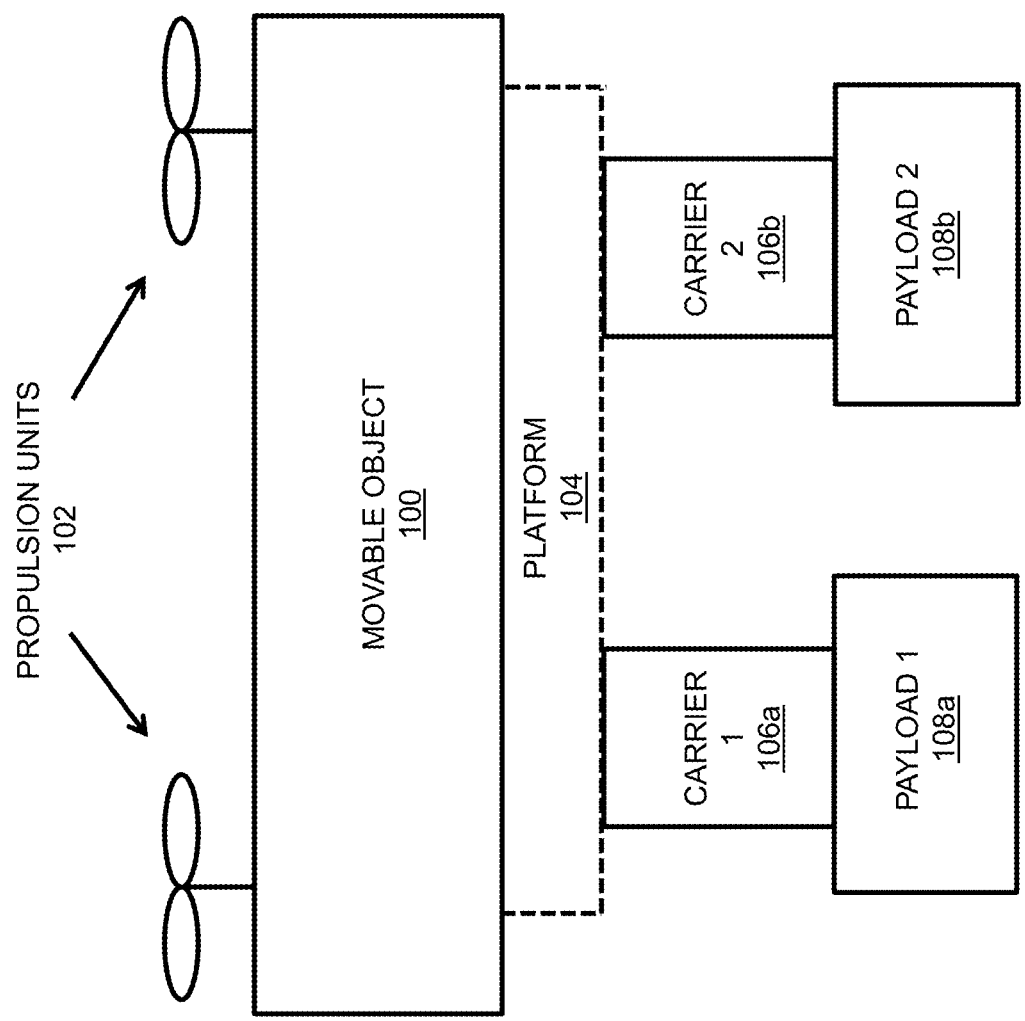
FIG. 1 shows a schematic of a movable object supporting multiple payloads, in accordance with embodiments of the disclosure.

Systems, methods, and devices are provided for multi-gimbals. A movable object, such as an unmanned aerial vehicle (UAV), may carry multiple payloads. The payloads may comprise cameras or other sensing equipment. The payloads may be supported with aid of one or more carriers. For instance, multiple gimbals may be provided, each of which may support one or more payloads. For example, a UAV may comprise multiple gimbals, such as dual gimbals, each supporting one or more payloads. The gimbals may be detachable from the UAV. In some instances, the UAV may comprise a platform which may support the multiple gimbals. The gimbals may be removed and/or interchanged with other gimbals.

When a gimbal is attached to UAV, a mechanical connection may be formed. In some instances, a simple mechanism may be used to attach the gimbals to the UAV. For example, a quick-release mechanism, or any other mechanism that does not require tools for attachment and/or detachment may be used. In one example, a UAV may slide and/or rotate to be attached to the UAV. When a gimbal is attached to the UAV an electrical connection may also be formed. Power and/or communications may traverse the electrical connection. The connections may be used to recognize gimbal identity and/or gimbal type and/or convey commands that affect operation of the gimbals and/or corresponding payloads. This may permit the gimbals to operate in a plug-n-play fashion, and increase the functionality of the UAV by easily attaching and detaching various gimbals with various payloads.

The UAV may be controlled with aid of one or more remote controllers. In some embodiments, a single remote controller may be used to control flight of the UAV and the multiple gimbals. In other embodiments, two remote controllers may be used to control flight of the UAV and the multiple gimbals. A first remote controller may control flight of the UAV while a second remote controls the multiple gimbals, or a first remote controller may control flight of the UAV and operation of a first gimbal, while a second remote controller controls the second gimbal. At least one of the remote controllers may control flight of the UAV while another remote controller may control at least one gimbal. At least one additional gimbal may be controlled by a remote controller controlling flight of the UAV or controlling the at least one gimbal. The remote controllers may have any interface that may enable such control, including but not limited to an application that facilitates such control. The remote control systems and methods provided herein may advantageously permit a single operator or two operators to easily control both flight of the UAV and control the operation of the gimbals.

In some embodiments, the UAV may be capable of operating in an independent mode, in which the gimbals may operate independently of one another. The UAV may also be capable of operating in a simultaneous mode, in which both gimbals operate in a concerted manner to substantially be oriented in the same direction using a same control instruction. The UAV may switch between the modes easily.

The multiple gimbal systems and methods described herein advantageously expand the commercial application of UAVs and improve the efficiency and performance of UAVs in various applications. For instance, various gimbals having different payloads may increase flexibility on the type of sensing that is performed with the UAV. The UAV may have the same types of payloads or may have different types of payloads. The various gimbals may also be capable of being controlled independently of one another when desired which may increase the range that is sensed by the UAV during a single pass.

FIG. 1 shows a schematic of a movable object supporting multiple payloads, in accordance with embodiments of the disclosure. A movable object 100 may comprise one or more propulsion units 102 that may aid in movement of the movable object. The movable object may comprise and/or be coupled to a platform 104 that may support multiple carriers 106a, 106b. Each carrier may support one or more payloads 108a, 108b.

A movable object 100 may be any object capable of moving within an environment. The movable object may be capable of self-propulsion. The movable object may be capable of navigating any type of environment, such as air, land, water, and/or space. The movable object may be capable of flight. The movable object may comprise one or more propulsion units 102 that may aid in movement of the movable object. The propulsion units may enable the movable object to be self-propelled without requiring human intervention. The propulsion units may include an actuator that may operate on electrical, magnetic, electromagnetic, chemical, biochemical, thermal, photovoltaic, or any other type of energy. The movable object may have any characteristic as described in detail elsewhere herein. The movable object may be a UAV. Any description herein of a movable object may apply to a UAV or any other type of movable object. Similarly, any description herein of a UAV may apply to any movable object, or specific type of movable object.

The movable object may be capable of any type of motion. For instance, the movable object may be capable of translation with respect to one, two, or three axes. The movable object may be capable of rotation about one, two, or three axes. The axes may be orthogonal to one another. The axes may comprise a yaw axis, pitch axis, and/or roll axis of the movable object.

The one or more propulsion units 102 of the movable object may comprise one or more rotor blades that may rotate to generate lift and/or thrust for the movable object. One or more actuators, such as one or more motors may control rotation of the one or more rotors. A motor may be coupled to a shaft that may be coupled directly or indirectly to one or more rotor blades. The motors may be in communication with a controller on-board the movable object. The controller may generate one or more flight commands that may be delivered to the one or more motors to affect rotation of the one or more rotors. Faster rotation of the rotors may generate more lift than lower rotation of the rotors.

A platform 104 may be provided that may support multiple carriers (e.g., gimbals). The platform may be part of the movable object or may be separate from the movable object. The platform may be mechanically and/or electrically connected to the movable object. The platform may communicate with a controller of the movable object. The controller may issue one or more commands that may affect operation of the carriers supported by the platform.

The platform may be separate from the movable object. The platform may be coupled to the movable object. The platform may be separable from the movable object. The platform may be attachable and/or detachable from the movable object. Alternatively, the platform may be permanently affixed to the movable object. The platform may comprise an interface that allows mechanical connection of the platform to the movable object. The interface may permit electrical connection with the movable object. The interface may permit power to be conveyed from the movable object to the platform or vice versa. The interface may permit communications to be conveyed from the platform to the movable object or vice versa. The platform may or may not comprise a housing that may partially or completely enclose one or more components of the platform. The housing of the platform may be separate from a housing of the movable object. For instance, the movable object may comprise a central body. The central body may comprise a housing that may enclose one or more components therein. For instance, one or more electrical components of the platform may be partially or completely within the housing. The housing of the platform and the housing of the central body may be separate and/or separable from one another. The housing of the platform the housing of the central body may or may not follow the same contour or be aesthetically harmonious with one another. Optionally, the platform does not include a housing, and the various components of the platform may be exposed to the surrounding environment.

The platform may be attached to the movable object in any manner. In some embodiments, the platform may be attached and/or detached to the movable object with aid of a quick-release mechanism. The platform may be attached and/or detached to the movable object using one or fewer, two or fewer, three or fewer, four or fewer, five or fewer, six or fewer, eight or fewer, or ten or fewer motions. The motions may be the same type of motions or different types of motions. The carriers may be attached and/or detached from the platform without aid of any tools. The carriers may be attached and/or detached from the platform manually by hand.

The payload may be attached and/or detached to movable object with the aid of tools. For example, a screwdriver may be used to attached and/or detach the payload. In some embodiments, the payload may be attached to the movable object in a permanent or semi-permanent manner.

In some embodiments, the platform may comprise a vibration damper that may be attached and/or detached to the movable object. Alternatively, the movable object may comprise a vibration damper that may interface with the platform. The vibration damper may comprise one or more dampening mechanisms such as springs, deformable members (e.g., balls), elastics, pneumatic dampeners, hydraulic dampeners, magnetic dampeners, or any other type of dampening mechanism. The dampening mechanism may dampen vertical movement of the platform relative to the movable object, and/or may dampen lateral movement of the platform relative to the movable object.

In some embodiments, the platform may be attached to the movable object in a rigid manner.

The platform may be a part of the movable object. The platform may be integral to the movable object. The platform may be integral to a central body of the movable object. The platform and/or any functionality thereof may be within a housing of the movable object. One or more electrical components of the platform may be within the housing of the movable object. The platform and/or any functionality there of may be within a housing of a central body of the movable object. One or more electrical components of the platform may be within the housing of the central body of the movable object.

The platform may comprise one or more components that may extend beyond or be part of the housing of the movable object, such as the central body of the movable object. In some instances, one or more interfaces of the platform may be exposed. This may occur when there is a housing, or when there isn't a housing. For instance, an interface connecting a platform to a movable object may be exposed. One or more interfaces connecting the platform to one or more carriers may be exposed.

The platform may be formed of a single continuous assembly or multiple discontinuous assemblies. The platform may refer to any single component or set of components that may be used to support multiple carriers 106a, 106b. The platform may comprise a single continuous assembly that may support both a first carrier 106a and a second carrier 106b. Any description herein of dual carriers may apply to any number of carriers. Any description herein of a first carrier and second carrier may apply to any number of multiple carriers (e.g., two or more, three or more, four or more, five or more, seven or more, ten or more, fifteen or more, twenty or more, thirty or more, or fifty or more carriers). Alternatively, the platform may comprise multiple discontinuous assemblies that may support the various carriers. For example, the platform may comprise a first assembly that may support the first carrier, and a second assembly that may support the second carrier. The first assembly and second assembly may be separated from one another or may be connected to one another. In some instances, the first assembly and the second assembly may be separate from one another and not contact one another. The platform may comprise multiple assemblies that need not contact one another. Each assembly may or may not have its own housing.

In one example, when a platform is formed of a single continuous assembly, the single continuous assembly may have multiple interfaces that may couple to the various carriers. For example, an assembly may have a first interface that couples to the first carrier and a second interface that couples to the second carrier. In another example, when a platform is formed of multiple separate assemblies, each assembly may have one or more interfaces that may couple to one or more corresponding carriers. For example, a first assembly may have an interface that may couple to a first carrier, while a second assembly may have an interface that may couple to a second carrier.

The carriers may be coupled to the platform during operation. The carriers may be separable from the platform. The carriers may be attached and/or detached from the platform. The carriers may directly contact the platform during operation. In some instances, the carriers may be attached to the platform with aid of a quick-release mechanism. The carriers may be attached and/or detached to the platform using one or fewer, two or fewer, three or fewer, four or fewer, five or fewer, six or fewer, eight or fewer, or ten or fewer motions. The motions may be the same type of motions or different types of motions. The carriers may be attached and/or detached from the platform without aid of any tools. The carriers may be attached and/or detached from the platform manually by hand. Exemplary attachment mechanisms are provided in further detail elsewhere herein.

The carriers 106a, 106b may each support one or more payloads 108a, 108b. In some embodiments, each carrier may support a payload. The carrier may bear weight of the corresponding payload. The carrier may control spatial disposition of the payload. The carrier may control orientation of the payload with respect to the movable object. The carrier may control orientation of the payload about one axis, two axes, or three axes, with respect to the movable object. The carrier may permit rotation of the payload about one axis, two axes, or three axes, with respect to the movable object. The axes may be orthogonal to one another. The axes may comprise a yaw axis, pitch axis, and/or roll axis of a payload supported by the corresponding carrier. The carrier may control a rotational angle of the payload with respect to a yaw axis alone, pitch axis alone, roll axis alone, yaw and pitch axis, pitch and roll axis, roll and yaw axis, or a yaw axis, pitch axis, and roll axis.

Each carrier may be a gimbal. The gimbal may be a one-axis gimbal, two-axis gimbal, or three-axis gimbal. The gimbal may comprise a frame assembly and a motor assembly. The frame assembly may comprise one or more frame components that may rotate relative to one another and/or the movable object. In one example, a gimbal assembly may comprise a first frame component that may support the payload. The payload may rotate relative to the first frame component or may rotate relative to the first frame component. The first frame component may be directly connected to the platform, or may be supported by a second frame component. The first frame component may rotate relative to the second frame component. The second frame component may bear weight of the first frame component. The second frame component may be directly connected to the platform, or may be supported by a third frame component. The third frame component may bear weight of the second frame component. The second frame component may rotate relative to the third frame component. The third frame component may bear weight of the second frame component. Any number of additional frame components may be presented.

The motor assembly may permit the frame assemblies to rotate relative to one another. For example, a first motor may permit a first frame assembly to rotate relative to the second frame assembly. A second motor may permit a second frame assembly to rotate relative to the third frame assembly. A third motor may permit a third frame assembly to rotate relative to the platform. Any number of motors may be provided. For instance, one or more, two or more, three or more, four or more, five or more, six or more, or seven or more motors may be employed.

The gimbal may comprise one or more sensors that may detect disposition and/or movement of one or more components of the gimbal. For example, the one or more sensors may be disposed on the frame assembly and/or one or more sensors may be disposed on the motor assembly. One or more sensors may be disposed on a first frame component, second frame component, and/or third frame component. One or more sensors may be disposed on or incorporated into a first motor, second motor, and/or third motor. One or more sensors may be disposed on the payload itself. One or more sensors may be disposed onto a platform supporting the gimbal. One or more sensors may be disposed on the movable object. The one or more sensors may comprise inertial sensors. Inertial sensors may comprise, but are not limited to, accelerometers, gyroscopes, magnetometers, or gravity-based sensors. The inertial sensors may detect an orientation of the respective component on which it is disposed with respect to one axis, two axes, or three axes. The inertial sensors may detect movement of the respective component, such as linear velocity, angular velocity, linear acceleration, and/or angular acceleration of the respective component. The inertial sensors may be useful for detecting how a payload is oriented relative to the movable object or an inertial reference frame (e.g., the environment). The inertial sensors may be useful for detecting how a payload is moving relative to the movable object or an inertial reference frame. The inertial sensors may be useful for detecting how a respective component by which it is supported is oriented relative to the movable object or an inertial reference frame. The inertial sensors may be useful for detecting how a respective component by which it is supported is moving relative to the movable object or an inertial reference frame.

The carriers of a multi-carrier movable object may be of the same type as one another or may be different types from one another. For example, a UAV may support a first gimbal and a second gimbal. The first gimbal and second gimbal may be of different types or may be of the same types. When the gimbals are of the same type they may share the same characteristics or parameters. When the gimbals are of different types at least one of the characteristics or parameters may be different. Examples of characteristics or parameters may include, but are not limited to: size/dimensions, weight, number of axes, orientation or order of axes, frame component shapes, number of frame components, motor types, amount of energy consumed, response time, and/or type of payload that may be supported.

Each carrier may support one or more payloads 108a, 108b. For example, a first carrier 106a may support a first payload 108a. A second carrier 106b may support a second payload 108b. A payload may be a device that may sense a condition of the environment, makes an emission into the environment and/or interacts with the environment.

The payload may comprise one or more sensors. Any sensor suitable for collecting environmental information can be used, including location sensors (e.g., global positioning system (GPS) sensors, mobile device transmitters enabling location triangulation), vision sensors (e.g., imaging devices capable of detecting visible, infrared, or ultraviolet light, such as cameras), proximity sensors (e.g., ultrasonic sensors, lidar, time-of-flight cameras), inertial sensors (e.g., accelerometers, gyroscopes, inertial measurement units (IMUs)), altitude sensors, pressure sensors (e.g., barometers), audio sensors (e.g., microphones) or field sensors (e.g., magnetometers, electromagnetic sensors). Any suitable number and combination of sensors can be used, such as one, two, three, four, five, or more sensors. Optionally, the data can be received from sensors of different types (e.g., two, three, four, five, or more types). Sensors of different types may measure different types of signals or information (e.g., position, orientation, velocity, acceleration, proximity, pressure, etc.) and/or utilize different types of measurement techniques to obtain data. For instance, the sensors may include any suitable combination of active sensors (e.g., sensors that generate and measure energy from their own source) and passive sensors (e.g., sensors that detect available energy).

In one example, the payload may be an imaging device. An imaging device may be a physical imaging device. An imaging device can be configured to detect electromagnetic radiation (e.g., visible, infrared, and/or ultraviolet light) and generate image data based on the detected electromagnetic radiation. In some embodiments, a payload may be a camera. The payload may be a camera that images an environment anywhere along an electromagnetic spectrum. For example, the payload may be a visible light camera. The payload may be an infrared camera. The payload may be an ultraviolet camera. The camera may be a night-vision camera. The payload may be a camera that may sense and visualize vibrations, sounds, reflected light, radiation, or any other condition of the environment that may be visualized.

An imaging device may include a charge-coupled device (CCD) sensor or a complementary metal-oxide-semiconductor (CMOS) sensor that generates electrical signals in response to wavelengths of light. The resultant electrical signals can be processed to produce image data. The image data generated by an imaging device can include one or more images, which may be static images (e.g., photographs), dynamic images (e.g., video), or suitable combinations thereof. The image data can be polychromatic (e.g., RGB, CMYK, HSV) or monochromatic (e.g., grayscale, black-and-white, sepia). The imaging device may include a lens configured to direct light onto an image sensor.

In some embodiments, the imaging device can be a camera. A camera can be a movie or video camera that captures dynamic image data (e.g., video). A camera can be a still camera that captures static images (e.g., photographs). A camera may capture both dynamic image data and static images. A camera may switch between capturing dynamic image data and static images. Although certain embodiments provided herein are described in the context of cameras, it shall be understood that the present disclosure can be applied to any suitable imaging device, and any description herein relating to cameras can also be applied to any suitable imaging device, and any description herein relating to cameras can also be applied to other types of imaging devices. A camera can be used to generate 2D images of a 3D scene (e.g., an environment, one or more objects, etc.). The images generated by the camera can represent the projection of the 3D scene onto a 2D image plane. Accordingly, each point in the 2D image corresponds to a 3D spatial coordinate in the scene. The camera may comprise optical elements (e.g., lens, mirrors, filters, etc.). The camera may capture color images, greyscale image, infrared images, and the like. The camera may be a thermal imaging device when it is configured to capture infrared images.

The imaging device may capture an image or a sequence of images at a specific image resolution. In some embodiments, the image resolution may be defined by the number of pixels in an image. In some embodiments, the image resolution may be greater than or equal to about 352×420 pixels, 480×320 pixels, 720×480 pixels, 1280×720 pixels, 1440×1080 pixels, 1920×1080 pixels, 2048×1080 pixels, 3840×2160 pixels, 4096×2160 pixels, 7680×4320 pixels, or 15360×8640 pixels. In some embodiments, the camera may be a 4K camera or a camera with a higher resolution.

The imaging device may capture a sequence of images at a specific capture rate. In some embodiments, the sequence of images may be captured standard video frame rates such as about 24p, 25p, 30p, 48p, 50p, 60p, 72p, 90p, 100p, 120p, 300p, 50i, or 60i. In some embodiments, the sequence of images may be captured at a rate less than or equal to about one image every 0.0001 seconds, 0.0002 seconds, 0.0005 seconds, 0.001 seconds, 0.002 seconds, 0.005 seconds, 0.01 seconds, 0.02 seconds, 0.05 seconds. 0.1 seconds, 0.2 seconds, 0.5 seconds, 1 second, 2 seconds, 5 seconds, or 10 seconds. In some embodiments, the capture rate may change depending on user input and/or external conditions (e.g. rain, snow, wind, unobvious surface texture of environment).

The imaging device may have adjustable parameters. Under differing parameters, different images may be captured by the imaging device while subject to identical external conditions (e.g., location, lighting). The adjustable parameter may comprise exposure (e.g., exposure time, shutter speed, aperture, film speed), gain, gamma, area of interest, binning/subsampling, pixel clock, offset, triggering, ISO, etc. Parameters related to exposure may control the amount of light that reaches an image sensor in the imaging device. For example, shutter speed may control the amount of time light reaches an image sensor and aperture may control the amount of light that reaches the image sensor in a given time. Parameters related to gain may control the amplification of a signal from the optical sensor. ISO may control the level of sensitivity of the camera to available light. Parameters controlling for exposure and gain may be collectively considered and be referred to herein as EXPO.

The payload may make an emission into the environment. For example, the payload may comprise a microphone that may emit sound into the environment. The payload may comprise a light source that may emit a light into the environment. The emission may be directed. For example, having a UAV with multiple gimbals may be useful when one of the payloads is a light source and another payload is a visible light camera, particularly when the UAV is flying in the night or within an area with low lighting (e.g., indoors, caves, cave-ins, etc.).

The payload may permit interaction with the environment. For example, the payload may comprise a robotic arm. The robotic arm may be capable of gripping and/or picking up objects. Having a UAV with multiple gimbals may be useful when one of the payloads is a camera and the other payload is a robotic arm, particularly when the UAV is flying and interacting with an environment. The camera may detect an object for the UAV to pick up. This may be particularly useful in sample-collection applications where the UAV with multiple gimbals may expand the range of collection. In another example, the payload may be a delivery system that may spray objects, such as pesticides or water where needed.

The payloads of a multi-carrier movable object may be of the same type as one another or may be different types from one another. For example, a UAV may support a first payload and a second payload. The first payload and second payload may be of different types or may be of the same types. When the payloads are of the same type they may share the same characteristics or parameters. When the payloads are of different types at least one of the characteristics or parameters may be different. Examples of characteristics or parameters may include, but are not limited to: size/dimensions, weight, type of information about the environment detected, type of image formed, resolution of image, amount of energy consumed, zoom, focus, image processing capabilities, memory, model, brand, and/or any other type of payload characteristic.

In some embodiments, a particular type of gimbal may be used to a particular type of payload. A gimbal may be compatible with a single type of payload or a subset of types of payloads which may comprise two or more types of payloads. For instance a gimbal may be able to support various payloads that meet certain parameters. A particular payload may be supported by a single of gimbal or a subset of types of gimbals which may comprise two or more gimbals. For instance, a payload may be supported by any gimbal that meets particular parameters.

The payloads may be separable from the corresponding gimbal. For example, the payload may be attached to and/or detached from the corresponding gimbal. The gimbal may have an interface that may allow the payload to be attached and/or detached. The payload may be removed and replaced with another payload. The other payload may be the same type of payload as the original payload or may be a different type of payload as the original payload. The payloads may directly contact the gimbal during operation. In some instances, the payloads may be attached to the gimbals with aid of a quick-release mechanism. A payload may be attached and/or detached to a corresponding gimbal using one or fewer, two or fewer, three or fewer, four or fewer, five or fewer, six or fewer, eight or fewer, or ten or fewer motions. The motions may be the same type of motions or different types of motions. The payload may be attached and/or detached from the gimbal without aid of any tools. The payload may be attached and/or detached from the gimbal manually by hand.

In other embodiments, the payload may be permanently affixed to the gimbal. The payload may be integral to the gimbal. The payload may be permanently affixed to a frame component or integral to the frame component.

Each payload may be mechanically attached to the corresponding gimbal. This may include a locked attachment, or may just include any attachment that may permit the payload to be supported by the corresponding gimbal. The payload may or may not be electrically connected to the corresponding gimbal.

In some embodiments, no electrical connection is provided between the gimbal the corresponding payload. The gimbal may be used to control spatial disposition of the payload relative to the movable object. The payload may collect data which may be transmitted to the movable object and/or off-board the movable object in a wireless fashion. Similarly, instructions that may affect operation of the payload may be transmitted from the movable object and/or an external device (e.g., remote controller) off-board the movable object in a wireless fashion to the payload. For example, instructions that may affect the power state of the payload, zoom of the payload, range of the payload, modes of the payload, speed settings of the payload, sensitivity of the payload, focus of the payload, filters used by the payload, or any other type of setting may be conveyed via the electrical connection.

In other embodiments, electrical connection may be provided between the gimbal and the corresponding payload. The electrical connection may permit power to be provided from the gimbal to the corresponding payload and vice versa. The electrical connection may permit communications to be provided from the gimbal to the corresponding payload and vice versa. In some instances, two-way communications may be provided between the payload and the gimbal. The payload may collect data which may be conveyed via the electrical connection to the gimbal. The electrical connection may convey the data from the gimbal to the payload. For instance, one or more instructions that may affect operation of the payload may be delivered via the electrical connection to the gimbal. Any of the instructions described elsewhere herein may be delivered via the electrical connection to the gimbal.

Optionally, on-board a movable object with multiple gimbals, one of the gimbals may support a detachable payload while the other may support an integral payload. Both of the gimbals may support detachable payloads, or both of the gimbals may support integral payloads. Similarly, one of the gimbals may support a payload that is electrically connected to the gimbal while the other gimbal supports a payload that is not electrically connected to the gimbal. Both gimbals may support payloads that are electrically connected to the corresponding gimbals, or both gimbals may support payloads that are not electrically connected to the corresponding gimbals. Depending on the type of gimbal attached to the movable object at any given times, various types of payloads or payload connection mechanisms may be provided.

Figure 2:
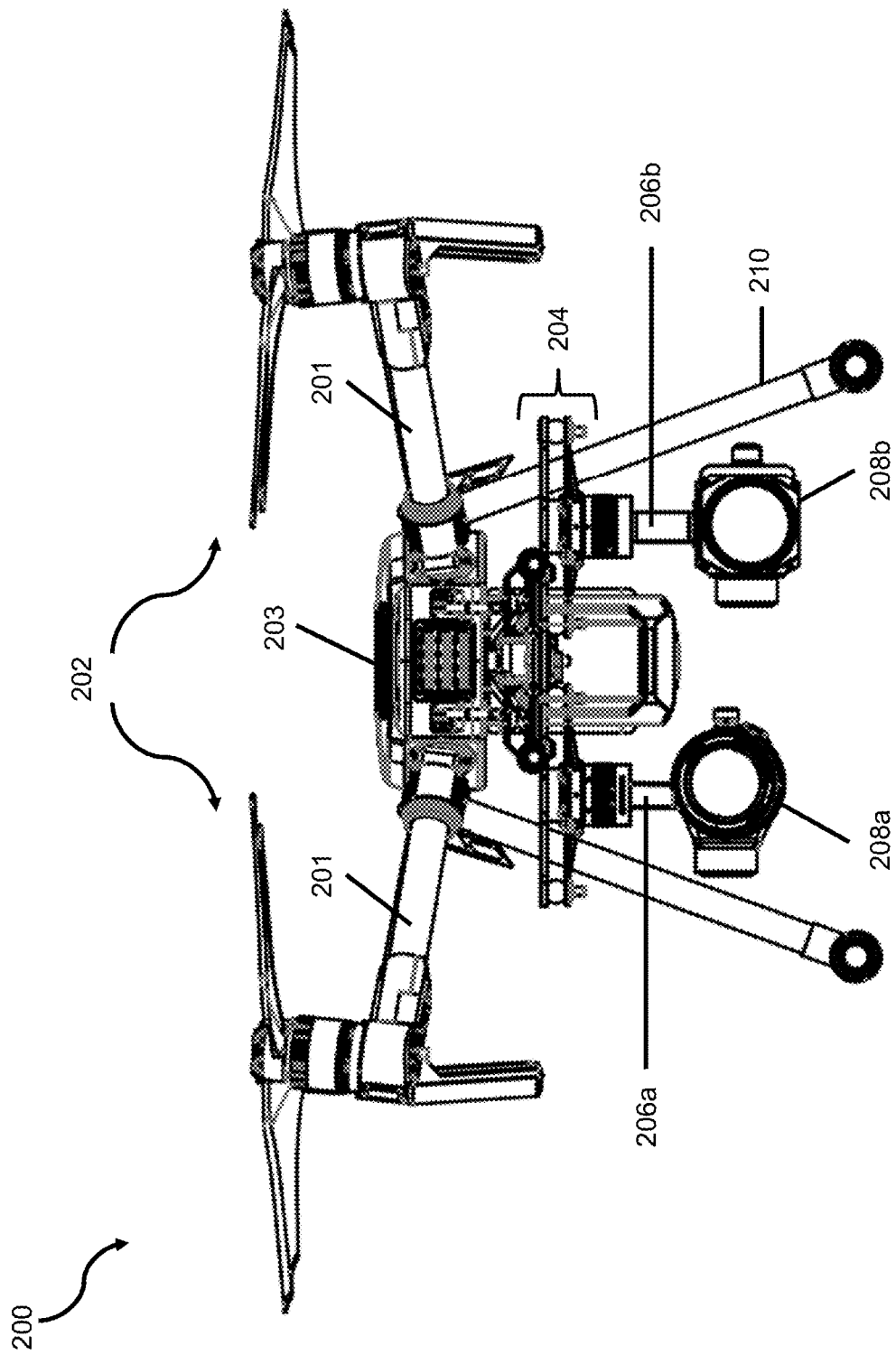
FIG. 2 shows an example of an unmanned aerial vehicle (UAV) carrying multiple payloads, in accordance with embodiments of the disclosure.

FIG. 2 shows an example of an unmanned aerial vehicle (UAV) carrying multiple payloads, in accordance with embodiments of the disclosure. A UAV 200 may comprise one or more propulsion units 202 that may generate lift and/or thrust that allow the UAV to fly within an environment. The UAV may have a central body 203 and one or more arms 201. The propulsion units may be supported by the one or more arms. A platform 204 may connect one or more gimbals 206a, 206b to the UAV. Each gimbal may support one or more payloads 208a, 208b. The UAV may comprise one or more landing stands 210 configured to bear weight of the UAV when the UAV is not airborne.

The UAV 200 may comprise a central body. The central body may comprise a housing. The housing may be formed from a single part, two parts, three parts, four parts, or more. In some embodiments, the housing may form an upper half and a lower half. The central body may comprise one or more interior cavities. One or more electrical components may be provided within the electrical cavities. Examples of electrical components may include one or more sensors (e.g., any of the types of sensors described elsewhere herein for the payload, including but not limited to GPS sensors, inertial sensors, pressures sensors, temperature sensors, audio sensors, light sensors, image sensors, etc.), controller (e.g., one or more processors), electronic speed controls (ESCs), power source, memory storage units, communication units, or any other electrical components. The UAV may or may not have a display screen. The display screen may be shown on an exterior of a housing of the UAV. For instance, the display may be shown on an exterior of the central body. The display may show any information, including but not limited to, power level of a power source on-board the UAV, images or other data captured by the payloads of the UAV, operational status of the UAV, errors relating to the UAV, navigation information for the UAV (e.g., geographical information of the UAV), mode of operation for the UAV, information about an operator of the UAV or a remote controller of the UAV.

One or more arms 201 may extend from the central body 203. Any number of arms may be provided. For example, one or more, two or more, three or more, four or more, five or more, six or more, eight or more, ten or more, twelve or more, twenty or more, thirty or more, or fifty or more arms may extend from the central body. The UAV may be a quadcopter or an octocopter. The arms may extend in a radial manner. The UAV may be symmetrical about a plane of symmetry passing through the central body of the UAV. The arms of the UAV may be arranged in a radially symmetric manner. The arms may be hollow, or may have solid interiors. In some embodiments, electrical wires may traverse the interior of the arms. The electrical wires may connect to one or more electrical components within the central body of the UAV.

Each arm 201 may support one or more propulsion units 202. In some embodiments, each arm may support one, two, three, four, or more propulsion units. A proximal end of the arm may be connected to the central body. In some embodiments, a propulsion unit may be located at or near a distal end of the arm. The propulsion units may be located at a region along the length of the arm within 50%, 30%, 25%, 20%, 10%, 5%, 3% or 1% of the distal end of the arm.

The arms may be substantially stationary relative to the central body. Alternatively, the arms may move relative to the central body. The arms may move relative to the central body about a proximal end of the arm. The arms may move relative to the central body anywhere along the length of the arm. The arm may include one or more joints that may permit folding of the arm. Alternatively, the arm may not have any joints and may not fold. The arms may move along vertical angles relative to the central body, and/or horizontal angles relative to the central body.

The propulsion unit may comprise one or more sets of rotor blades. The rotor blades may rotate to generate lift and/or thrust for the UAV. The rotor blades may be operatively coupled to one or more motors that may control the speed and/or direction of rotation of the rotor blades. In some embodiments, a controller may send one or more flight commands that may affect operation of the propulsion units. For example, the controller may send a command that may affect rotation of one or more rotors, that may in turn affect rotation of one or rotor blades. In some embodiments, the commands from the controller may be provided to one or more ESCs, which may be located within the central cavity, or anywhere along the length of the arm (e.g., proximal end of the arm, central portion of the arm, distal end of the arm), which may in turn convey instructions to the one or more motors.

The multiple gimbals 206a, 206b may be coupled to the UAV with aid of a platform 204. The platform may be separate or separable from the UAV, or may be a part of the UAV. In some embodiments, the platform may be one or more regions of the UAV that may allow connection to the gimbals. The platform may be located anywhere on the UAV. In some embodiments, the platform may be beneath a central body 203 of the UAV. The platform may be integral or directly beneath the central body of the UAV. In some instances, the platform may be beneath the central body of the UAV, but a gap may be provided between the central body and the platform. In other embodiments, the platform may be above the central body. The platform may be integral or directly above the central body of the UAV. In some instances, the platform may be above the central body of the UAV, but a gap may be provided between the central body and the platform. In other embodiments, the platform may be on a side of the central body (e.g., right side, left side, front side, and/or back side). The platform may be beneath, above, and/or on a side (e.g., right side, left side, front side, and/or back side) of one or more arms of the UAV.

The gimbals may be coupled to the UAV based on the location of the platform. Thus, the gimbals may have any location relative to the UAV. In some embodiments, the gimbals may be beneath a central body of the UAV. In some instances, the gimbals may be beneath the central body of the UAV, but a gap may be provided between the central body and the gimbals. In other embodiments, the gimbals may be above the central body. In some instances, the gimbals may be above the central body of the UAV, but a gap may be provided between the central body and the gimbals. In other embodiments, the gimbals may be on a side of the central body (e.g., right side, left side, front side, and/or back side). The gimbals may be beneath, above, and/or on a side (e.g., right side, left side, front side, and/or back side) of one or more arms of the UAV.

The gimbals 206a, 206b may support one or more payloads 208a, 208b. The gimbals may control the spatial disposition of the payload relative to the UAV. The payloads may have a reference coordinate system. The UAV may have a reference coordinate system. The spatial disposition of the payload relative the UAV may depend on the orientation of the payload reference coordinate system relative to the UAV coordinate system. The payloads may move independently of one another at one or more moments in time. In some instances, the payloads may move together in a coordinated fashion. The coordinate systems of the payloads relative to one another may be compared. The coordinate system of the UAV may be used as a common reference coordinate system. The coordinate system of one or more inertial reference frame (e.g., of the environment) may be employed as a common reference coordinate system. The disposition of the UAV relative to the inertial reference frame may be known. The disposition of the UAV relative to the inertial reference frame may be used to determine a relationship between the coordinate system of the UAV and the coordinate system of the inertial reference frame. Similarly, the disposition of the payloads relative to the UAV may be known. The disposition of the payloads relative to the UAV may be used to determine a relationship between the coordinate system of each of the payloads and the coordinate system of the UAV. This may permit the coordinate system of each of the payloads relative to the coordinate system of the inertial reference frame to be determined.

In some embodiments, the gimbals may be carried by the UAV in a manner such that they are hanging downwards, and the payloads are supported beneath the highest portion of the gimbal. The gimbals may be hanging downward as the payloads are supported beneath the platform. The portion of the gimbals connecting to the platform may be above the payloads. In other embodiments, the gimbals may be carried by the UAV in a manner such that they are supported upwards, so that the payloads are above the highest portion of the gimbal. The gimbals may be supported upwards so that the payloads are supported above the platform. The portion of the gimbals connecting to the platform may be beneath the payloads. Optionally, the gimbals may be oriented so that they are arranged sideways, so that the payloads are to the side of the portion of the gimbal connecting to the platform. In some embodiments, any combination of the various orientations of the gimbal relative to the movable object may be provided.

The multiple gimbals of the UAV may be arranged in any manner relative to one another. For instance, the gimbals may be arranged so that they are adjacent to one another. The portions of the gimbals connecting to the UAV may be substantially coplanar. The gimbals may connect to the platform within a plane. The plane may be a substantially lateral plane relative to the central body of the UAV. Alternatively, the plane may be a substantially vertical plane relative to the central body of the UAV. The plane may be beneath the central body of the UAV, or above the central body of the UAV.

In some embodiments, a gap may be provided between the portions of the gimbal connecting to the UAV. The gap may be of a sufficient distance such that the payloads of the gimbals do not interfere with one another. The gap may be of a sufficient distance to be greater than the dimensions of at least one of the payloads (e.g., the largest payload supported), or the average of the dimensions of the multiple payloads. The gap may be of a sufficient distance to be greater than the lateral dimensions of at least one of the gimbals (e.g., the largest gimbal supported), or the average of the dimensions of the multiple gimbals. The center-to-center distance between the gimbal attachment points may be greater than 1×, 1.5×, 2×, 3×, 4×, 5×, or 6× any of the dimensions mentioned (e.g., lateral dimension of individual payload, averaged lateral dimensions of the payloads, lateral dimension of individual gimbal, averaged lateral dimensions of the gimbals). The center-to-center distance between the gimbal attachment points may be greater than a lateral dimension of the central body, the same as a lateral dimension of the central body, or less than a lateral dimension of the central body. The gap distance may advantageously permit stable flight of the UAV while allowing the gimbals to operate without interfering with one another (e.g., making contact with one another regardless of the spatial disposition of the payload).

The UAV may have a landing stand 210 that may be configured to bear weight of the UAV when the UAV is not airborne. The landing stand may support the UAV upon a surface when the UAV is landed on the surface. The landing stand may remain substantially static relative to the central body of the UAV. Alternatively, the landing stand may move relative to the central body of the UAV. In some embodiments, the landing stand may lift during flight of the UAV. The landing stand may lift upwards so that the landing stand is substantially in line with the arms 201 of the UAV. The landing stand may lift to advantageously reduce interference with operation of the multiple payloads 208a, 208b.

The UAV may be configured such that when the UAV is resting on a surface, the gimbals 206a, 206b and payloads 208a, 208b are located above the lowest portion of the landing stand 210. The gimbals and payloads may be attached to the UAV in a manner that prevents them from contacting the underlying surface upon which the UAV is resting. This may reduce the likelihood of damage to the UAV. The multiple gimbals and/or payloads may be provided between the legs of the landing stand. The multiple gimbals and/or payloads may be laterally between the legs of the landing stand. This may aid in providing stabilization and balance while the UAV is resting on the surface.

Figure 3:
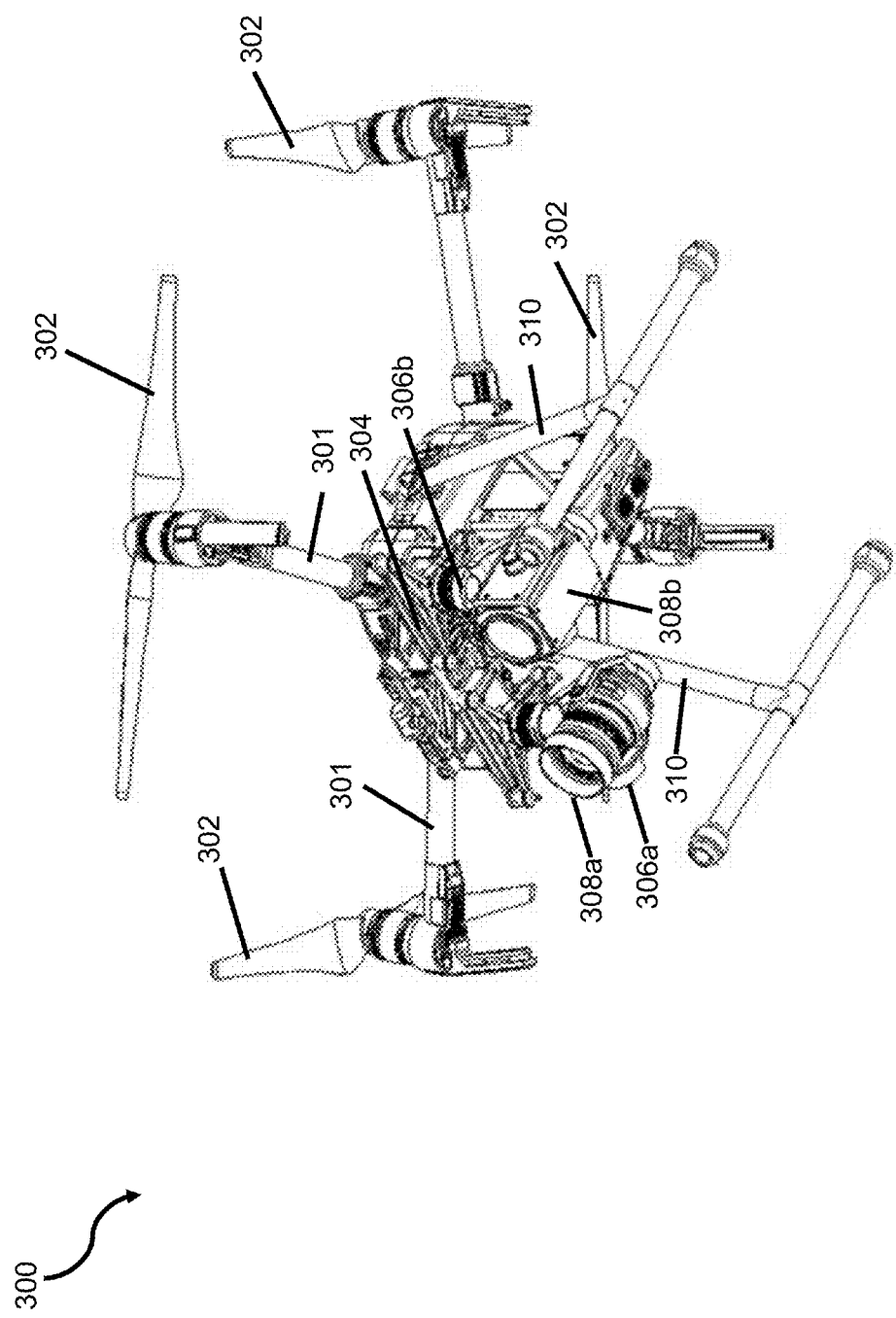
FIG. 3 shows a lower angled view of an example of an unmanned aerial vehicle (UAV) carrying multiple payloads, in accordance with embodiments of the disclosure.

FIG. 3 shows a lower angled view of an example of an unmanned aerial vehicle (UAV) carrying multiple payloads, in accordance with embodiments of the disclosure. A UAV 300 may comprise one or more propulsion units 302 that may generate lift and/or thrust that allow the UAV to fly within an environment. The UAV may have a central body 303 and one or more arms 301. The propulsion units may be supported by the one or more arms. A platform 304 may connect one or more gimbals 306a, 306b to the UAV. Each gimbal may support one or more payloads 308a, 308b. The UAV may comprise one or more landing stands 310 configured to bear weight of the UAV when the UAV is not airborne.

As illustrated, the gimbals 306a, 306b may be positioned beneath the central body 303 of the UAV. The UAV may have a 'front' orientation which may be a side of the UAV where the gimbals are attached. The gimbals may be attached so that the center of mass of the gimbals is in 'front' of the center of mass of the UAV as a whole. In some instances, the gimbals may be attached so that the center of mass of the gimbals is 'behind', 'to the right', or 'to the left' of the center of mass of the UAV as a whole. The gimbals may be attached so that the center of mass of the gimbals is in line laterally with the center of mass of the UAV as a whole. The center of mass of the gimbals may be 'beneath' the center of mass of the UAV as a whole. Alternatively, the center of mass of the gimbals may be 'above' or in line with the center of mass of the UAV as a whole. When referring to the center of mass of the gimbals, this may include the center of mass of each gimbal individually, or the center of mass of gimbals taken together collectively.

Any description herein of the weight of the gimbal may include the weight of both the gimbal and the payload supported by the gimbal. For example, description of a weight of a gimbal may refer to a weight of a gimbal 306a alone or the combined weight of the gimbal 306a and corresponding payload 308a. Similarly, description of a center of mass of a gimbal may refer to the center of mass of a gimbal alone or the combined weight of the gimbal and corresponding payload.

The weight of the gimbals may vary. As different gimbals may be attached and/or detached from the UAV, the masses of the gimbals may change. This may affect the overall weight of the UAV and/or positioning of the center of mass of the UAV. For example, if a first gimbal has weight A, and second gimbal also has weight A, and then first gimbal is swapped out for third gimbal which has weight B, which is significantly heavier than weight A, then the location center of mass of the UAV will be altered, as well as the overall mass of the UAV. The UAV may need to compensate for the mass changes (e.g., weight and/or changes in location of the center of mass) to provide desired flight.

In some embodiments, information about the gimbals may be provided to the UAV so that the UAV knows how to compensate for updated mass changes. In some instances, the information about the gimbals may include the type of gimbal. The type of gimbal may include a gimbal model and/or brand. The type of gimbal may include information about a payload supported by the gimbal, such as payload model and/or brand. The UAV may use the information about the type of gimbal to determine the weight of the gimbal. For example, for Gimbal Model A, the weight may be known to be A, while for Gimbal Model B, the weight may be known to be B. When gimbals are of different types, they may or may not have different weights. For example, weight A and weight B may be different from one another. In some instances, even different models of gimbals may have the same weight. For instance, weight A and weight B may be the same. In other instances, the information about the gimbal may be weight of the gimbal. For example, a gimbal may store information about its weight, and may convey the information about its weight directly to the UAV.

The information about the gimbals may be provided from the gimbals themselves. Upon being connected to the UAV, the gimbals may send information to the UAV. Information about a gimbal (e.g., gimbal type, gimbal weight), may be provided when the gimbal is placed into electrical communication with the controller. This electrical communication may occur when the gimbal is attached to the platform of the UAV. The attachment of the gimbal to the platform may form an electrical connection between the gimbal and the UAV. This may permit the gimbal to provide information about the gimbal to the UAV. The information may be conveyed in an automated fashion upon the physical connection of the gimbal to the UAV. An initialization process may or may not occur prior to the gimbal conveying information about the gimbal to the UAV. An initialization process may include an initial communication from the UAV to the gimbal, or from the gimbal to the UAV, or initial communications from both the UAV and the gimbal.

The information from the gimbals may be provided from an external source, such as a remote controller. For example, when a gimbal is attached to the UAV, the user may send information to the UAV via the remote controller about the gimbal (e.g., gimbal type, gimbal weight) that was attached. In some instances, the user may directly input the information about the gimbal into the UAV via an interface.

The UAV may have a controller, which may generate commands to affect flight of the UAV. The controller may comprise one or more processors. The controller may receive information about the gimbals and, based on the information, generate the commands that affect flight of the UAV. In some embodiments, a UAV may comprise a plurality of propulsion units configured to generate lift for the UAV; and one or more processors configured to: (1) receive data indicative of a type of a first gimbal carried by the UAV and data indicative of a type of a second gimbal carried by the UAV; and (2) generate instructions to control operation of the plurality of propulsion units based on the type of the first gimbal and the type of the second gimbal. Similarly, a method of controlling flight based on gimbal type may be provided, said method comprising: obtaining data indicative of a type of a first gimbal carried by the UAV and data indicative of a type of a second gimbal carried by the UAV; generating, with aid of one or more processors, instructions to control operation of a plurality of propulsion units based on the type of the first gimbal and the type of the second gimbal; and actuating the plurality of propulsion units in response to the instructions, thereby generating lift of the UAV.

The controller may calculate how much thrust needs to be generated by each propulsion unit to offset any updates to the center of mass and/or total mass of the UAV as a result of attaching new gimbals. The controller may receive the information about the gimbals, and use that information to calculate a location of the center of mass of the UAV and/or total mass of the UAV. Based on the center of mass location and/or total mass of the UAV, the controller may calculate how much thrust is required by each propulsion unit to provide stable flight of the UAV. Depending on the UAV flight state (e.g., hovering, ascending, turning, etc.), a desired amount of thrust for each propulsion unit to execute to the UAV flight state may be calculated. Based on a desired amount of thrust, the rotational speed of the propulsion units may be calculated and commands that affect the rotational speed of the propulsion units may be generated. These instructions may be sent to the propulsion units.

In some instances, the gimbal masses may permit the center of mass of the UAV to be roughly centered so that the various propulsion units may operate in a uniform manner to keep the UAV hovering. Alternatively, the gimbal masses may cause the center of mass of the UAV to be off-center so that some propulsion units may have to work harder than other propulsion units to keep the UAV hovering. The controller may make the determination of how quickly each individual propulsion unit needs to rotate and send individualized instructions to each of the propulsion units. When the center of mass is off-center, different instructions are sent to two or more of the plurality of propulsion units while the UAV is hovering. In such a situation, the lift generated by two or more of the plurality of propulsion units may differ while the UAV is hovering.

Figure 4:
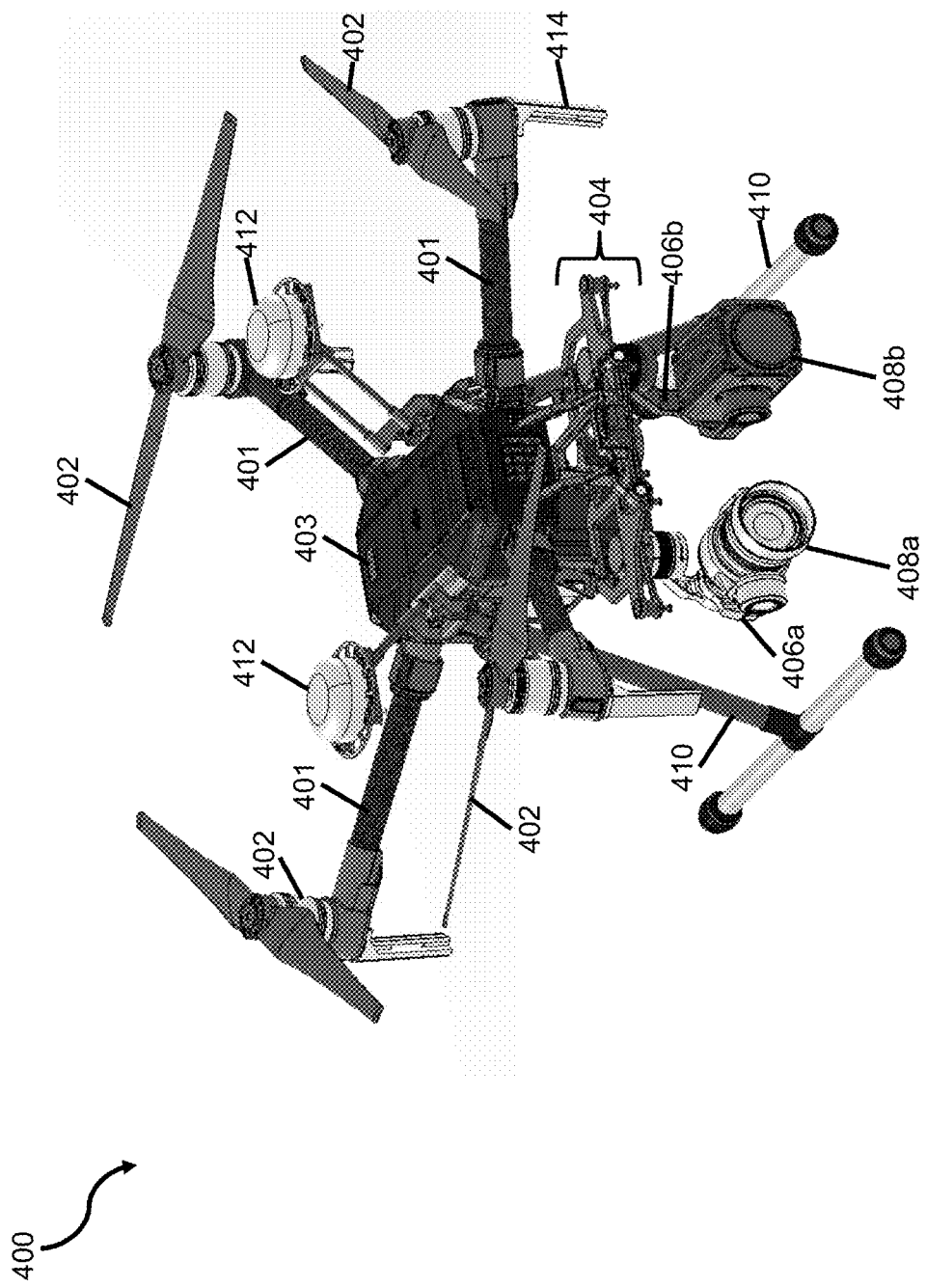
FIG. 4 shows an upper angled view of an example of an unmanned aerial vehicle (UAV) carrying multiple payloads, in accordance with embodiments of the disclosure.

FIG. 4 shows an upper angled view of an example of an unmanned aerial vehicle (UAV) carrying multiple payloads, in accordance with embodiments of the disclosure. A UAV 400 may comprise one or more propulsion units 402 that may generate lift and/or thrust that allow the UAV to fly within an environment. The UAV may have a central body 403 and one or more arms 401. The propulsion units may be supported by the one or more arms. A platform 404 may connect one or more gimbals 406a, 406b to the UAV. Each gimbal may support one or more payloads 408a, 408b. The UAV may comprise one or more landing stands 410 configured to bear weight of the UAV when the UAV is not airborne.

The UAV may also comprise one or more navigation antennas 412. A navigation antenna may be used to aid in navigation of the UAV. The navigation antenna may be useful for collecting information that may be useful for determining a geographical location of the UAV. A navigation antenna may be a GPS antenna. In some instances, real time kinematic (RTK) GPS techniques may be employed to determine the precise location of the UAV. Satellite-based positioning systems (e.g., global navigation satellite systems—GNSS) such as GPS, GLONASS, Galileo, and/or BeiDou may be employed. Any description herein of GPS may apply to any type of satellite-based positioning system.

Additionally, the UAV may comprise one or more image transmission antennas 414. The image transmission antennas may be useful for transmitting data collected by the payloads 408a, 408b. In some embodiments, data collected by the payloads (e.g., images), may be conveyed to the UAV, which may in turn transmit the information to one or more external objects off-board the UAV. For instance, the data collected by the payloads may be transmitted by the UAV to one or more remote controllers of the UAV, or a display device showing data collected by the UAV.

The data collected by the payloads may be conveyed to the UAV by going through the gimbal. For instance, the payload may be electrically connected to the gimbal. The gimbal may be electrically connected to the UAV. The data collected by a payload may be conveyed, via electrical connections of its corresponding gimbal, to the UAV. A platform of the UAV may have one or more interface that may receive the electrical communication about the data from the payload and convey the communication to the image transmission antennas. Pre-processing of the data collected by the payloads (e.g., images) may occur at the payload, the gimbal, and/or the UAV before transmission of the data. Alternatively, raw data may be transmitted.

In some embodiments, the data collected by the payloads may be conveyed directly to the UAV without going through the gimbal. For instance, the data collected by the payloads may be conveyed wirelessly to the UAV. The data collected by the payloads may be conveyed directly to one or more external objects off-board the UAV. For instance, the data collected by the payloads may be transmitted directly to one or more remote controllers or a display device wirelessly by the payload.

The platform 404 may be provided at a location of the UAV lower than the central body of the UAV and toward a front side of the UAV. As illustrated, the gimbals (e.g., gimbals and/or corresponding payloads) may comprise different types of gimbals, or the same type of gimbal. The multiple gimbals may be positioned adjacent to one another. The gimbals may hang from the platform by which they are attached to the UAV. The gimbals may be easily attached and/or detached from the UAV which may provide a user with flexibility during operation of the UAV. The user may attach desired gimbals with the desired characteristics and functionality for a particular operation of the UAV. The gimbals may be coordinated with one another to service a particular function. For instance, based on a need, and a selection of a first gimbal, a second gimbal may be selected. For instance, if the gimbal is engaged in the night time flying, and the first gimbal supports a visible light camera, the second gimbal may support a light source. In another example, if a gimbal is engaging in a search and rescue operation and the first gimbal supports a visible light camera, the second gimbal may be selected to support a thermal imaging camera which may aid in such operations.

Figure 5:
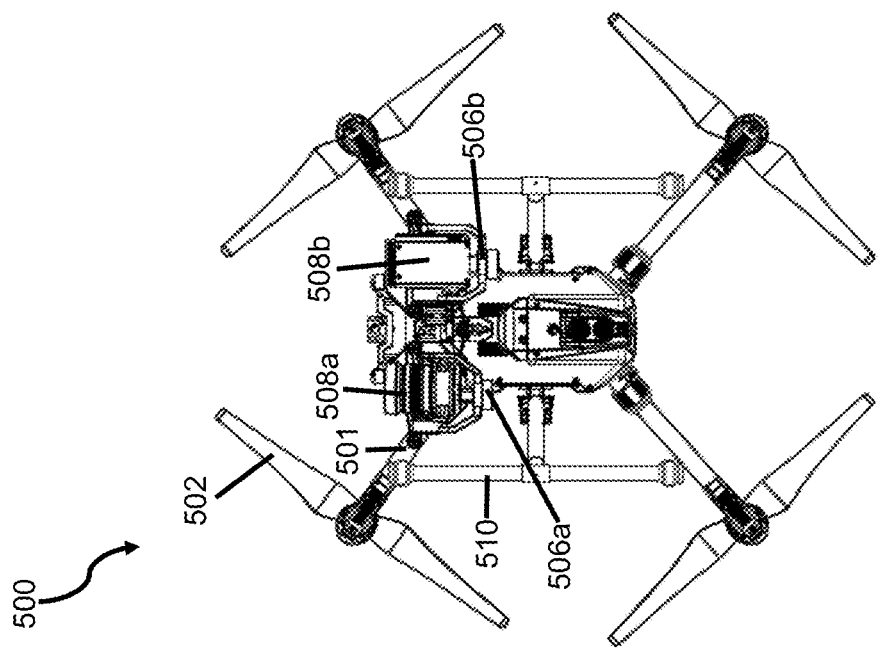
FIG. 5 shows a bottom view of an example of an unmanned aerial vehicle (UAV) carrying multiple payloads, in accordance with embodiments of the disclosure.

FIG. 5 shows a bottom view of an example of an unmanned aerial vehicle (UAV) carrying multiple payloads, in accordance with embodiments of the disclosure. A UAV 500 may comprise one or more propulsion units 502 that may generate lift and/or thrust that allow the UAV to fly within an environment. The UAV may have a central body 503 and one or more arms 501. The propulsion units may be supported by the one or more arms. A platform 504 may connect one or more gimbals 506a, 506b to the UAV. Each gimbal may support one or more payloads 508a, 508b. The UAV may comprise one or more landing stands 510 configured to bear weight of the UAV when the UAV is not airborne.

Optionally, the gimbals may be located toward a front side of the UAV. The gimbals may be located between the one or more landing stands.

Figure 6:
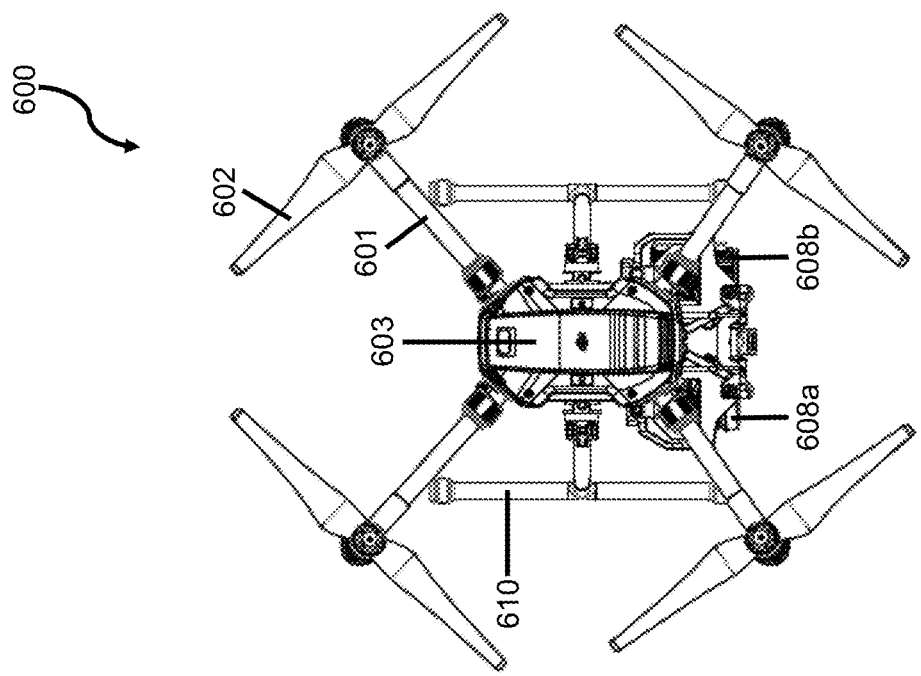
FIG. 6 shows a top view of an example of an unmanned aerial vehicle (UAV) carrying multiple payloads, in accordance with embodiments of the disclosure.

FIG. 6 shows a top view of an example of an unmanned aerial vehicle (UAV) carrying multiple payloads, in accordance with embodiments of the disclosure. A UAV 600 may comprise one or more propulsion units 602 that may generate lift and/or thrust that allow the UAV to fly within an environment. The UAV may have a central body 603 and one or more arms 601. The propulsion units may be supported by the one or more arms. A platform 604 may connect one or more gimbals 606a, 606b to the UAV. Each gimbal may support one or more payloads 608a, 608b. The UAV may comprise one or more landing stands 610 configured to bear weight of the UAV when the UAV is not airborne.

Figure 7:
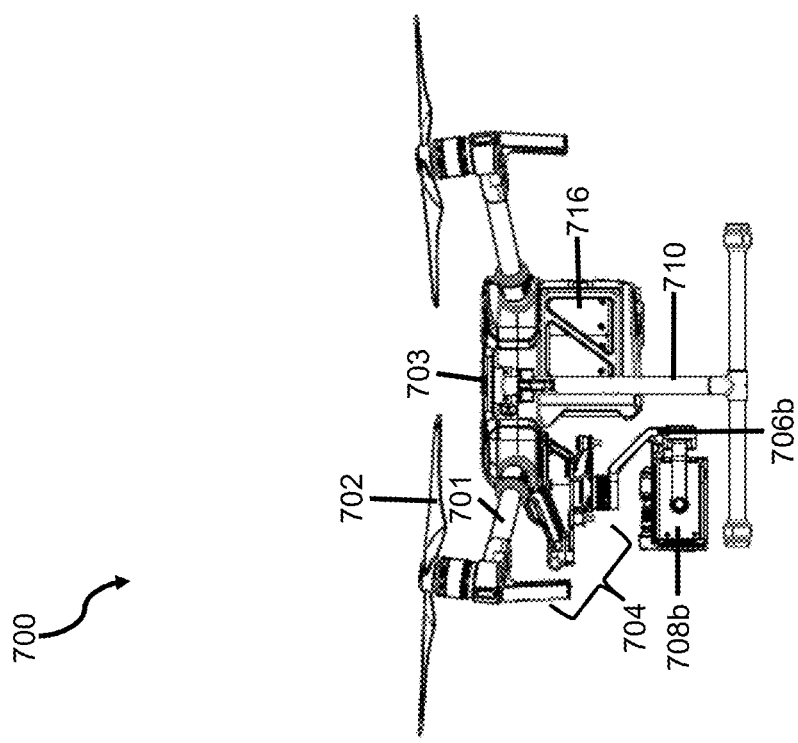
FIG. 7 shows a left side view of an example of an unmanned aerial vehicle (UAV) carrying multiple payloads, in accordance with embodiments of the disclosure.

FIG. 7 shows a left side view of an example of an unmanned aerial vehicle (UAV) carrying multiple payloads, in accordance with embodiments of the disclosure. A UAV 700 may comprise one or more propulsion units 702 that may generate lift and/or thrust that allow the UAV to fly within an environment. The UAV may have a central body 703 and one or more arms 701. The propulsion units may be supported by the one or more arms. A platform 704 may connect one or more gimbals 706a, 706b to the UAV. Each gimbal may support one or more payloads 708a, 708b. The UAV may comprise one or more landing stands 710 configured to bear weight of the UAV when the UAV is not airborne.

The UAV may carry a power source 716, such as a battery. The power source may comprise an energy storage system, such as an electrochemical battery. The power source may comprise an energy generation system, such as a renewable energy generation system. The power source may incorporate any combination of energy storage and/or generation. The power source may or may not be removable from the UAV. For example, a battery may have its own housing and may be removable from the UAV. The battery may be recharged while it is on-board the UAV, or may be recharged when it has been removed from the UAV.

In some embodiments, the multiple gimbals may be located to the 'front' of the UAV relative to the battery. The gimbals may be directly in front of the battery. The weight of the gimbals may be offset by the weight of the battery or vice versa. In some embodiments the weight of the multiple gimbals may collectively be less than, greater than, or approximately equal to the weight of the battery. In some embodiments, the weight of the multiple gimbals may collectively be within a range of about plus or minus 40%, 30%, 25%, 20%, 15%, 10%, 7%, 5%, 3%, or 1% the weight of the battery. The center of mass of the battery may be roughly in line with the collective center of mass of the multiple gimbals. In some embodiments, the center of mass of the battery may be within a range of about plus or minus 5 cm, 4 cm, 3 cm, 2 cm, 1 cm, or 0.5 cm of the collective center of mass of the multiple gimbals. The center of the mass of the battery may be between the center of mass of the first gimbal and the center of mass of the second gimbal laterally with respect to the UAV.

Figure 8:
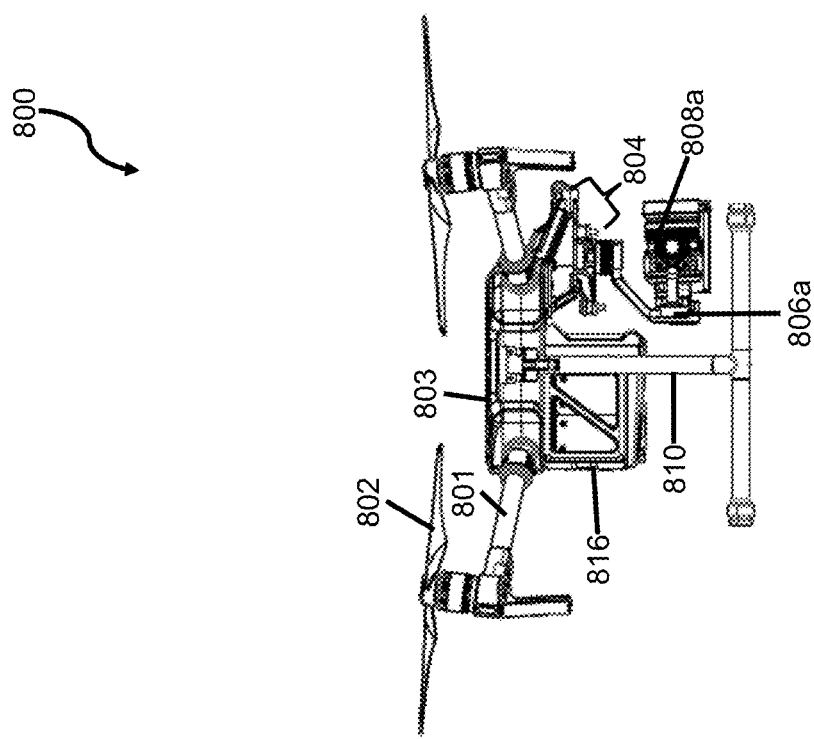
FIG. 8 shows a right side view of an example of an unmanned aerial vehicle (UAV) carrying multiple payloads, in accordance with embodiments of the disclosure.

FIG. 8 shows a right side view of an example of an unmanned aerial vehicle (UAV) carrying multiple payloads, in accordance with embodiments of the disclosure. A UAV 800 may comprise one or more propulsion units 802 that may generate lift and/or thrust that allow the UAV to fly within an environment. The UAV may have a central body 803 and one or more arms 801. The propulsion units may be supported by the one or more arms. A platform 804 may connect one or more gimbals 806a, 806b to the UAV. Each gimbal may support one or more payloads 808a, 808b. The UAV may comprise one or more landing stands 810 configured to bear weight of the UAV when the UAV is not airborne. The UAV may carry a power source 816.

Figure 9:
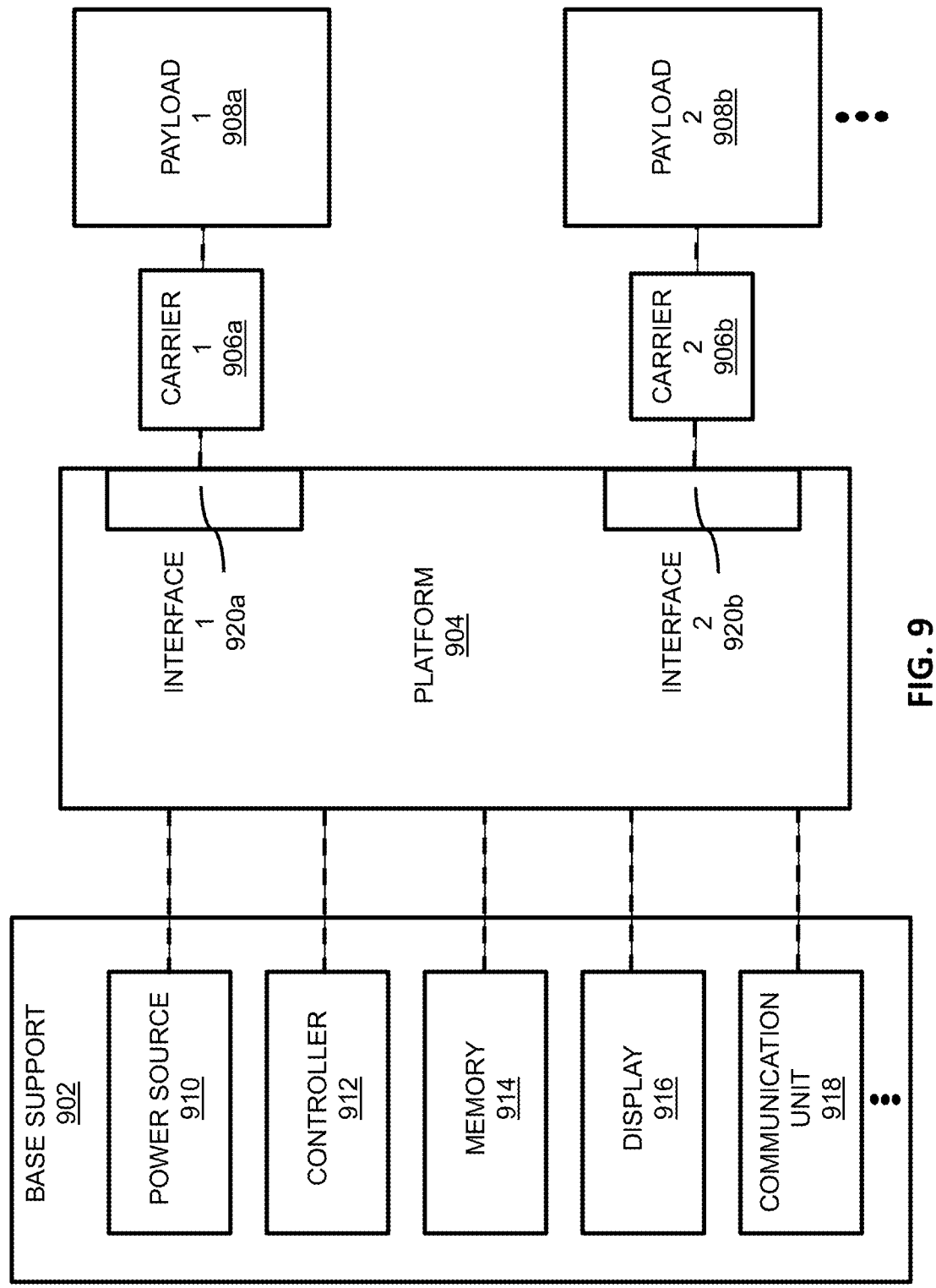
FIG. 9 shows examples of couplings between a base support, platform, carrier and/or payload, in accordance with embodiments of the disclosure.

FIG. 9 shows examples of couplings between a base support, platform, carrier and/or payload, in accordance with embodiments of the disclosure. A base support 902 may be operably coupled to multiple payloads 908a, 908b via respective connections to a platform 904, and via one or more carriers 906a, 906b. Any of these elements may be optional. For instance, a platform may be in direct communication with the payloads without causing the communications to pass through the carriers. In another example, a platform may be in communication with the carriers, but communications may not be required with the payloads. A platform may be separate and/or separable from the base support. Alternatively, the platform may be a part of the base support. In some alternative embodiments, the base support may be operably coupled to the carriers and/or payloads independently of the platform (e.g., via a wireless communication).

A base support 902 may be any object that may be configured to operably couple with the one or more carriers and/or payloads. The base support may be a movable object, such as a UAV. The base support may be self-propelled. The base support may optionally be a stationary object. The base support may be an object that may be capable of being carried by a living being. For example, the base support may be a handheld support, which may be configured to be carried by a human. Any description herein of a UAV or a movable object may apply to any type of base support, and vice versa.

The base support 902 may comprise one or more functional components that are operably coupled to the carriers 906a, 906b and/or payloads 908a, 908b through a platform 904. Examples of functional components may include, but are not limited to, a power source 910, controller 912, memory 914, display 916, and/or communication module 918.

A power source 910 (e.g., one or more batteries) can be used to transmit power to a platform 904, via the electrical couplings described herein. For example, the power source can be used to power a sensor of the mounting platform 904. The power source may be a single-use power source, or a rechargeable power source. In some instances, the power source 206 can be charged while being carried by the base support 902. Alternatively, the power source may need to be removed from the base support in order to be charged. The power source can be the same as the power source providing power to the base support, such that the power source also provides power to other components of the base support (e.g., a propulsion system, a flight control system, etc.) Conversely, the power source may be separate from the power source powering the base support.

In some embodiments, the power source 910 may also be the power source for the one or more carriers 906a, 906b. The power source may provide power to the carriers to affect spatial disposition of the corresponding payloads. The carriers may be gimbals and the power source may provide power that may permit operation of one or more motors of the gimbals. The carriers may optionally have one or more sensors that may provide information about a state of the carrier, such as physical disposition. The power source may provide power to the sensors. Optionally, the carriers may not have their own on-board power source. The carriers may be inert when not coupled to a base support. Alternatively or in addition the carriers may have their own local power source and not require power from a power source on-board the base support. In some instances, the carriers may use their own local power source for low-level operations (e.g., operations that do not consume much power) while using power from the base support power source for higher level operations (e.g., operations that consumer more power). In some instances, the base support power source may be a backup for a local power source of the carrier. Alternatively, the local power source of the carrier may serve as a backup for the base support power source.

The power source may optionally be a power source for the payloads 908a, 908b. The power source may provide power to the payloads to permit operation of the payloads. The payloads may engage in data collection, emission within an environment and/or interaction with an environment. The power source may permit the payloads to function to engage in data collection, emission within an environment and/or interaction with an environment. The payloads may optionally have one or more sensors that may provide information about a state of the payload, such as physical disposition. The power source may provide power to the sensors. Optionally, the payloads may not have their own on-board power source. The payloads may be inert when the carriers are not coupled to a base support. In some instances, the payloads may not have their own power source but may utilize a power source on-board the carriers. Alternatively or in addition the payloads may have their own local power source and not require power from a power source on-board the base support and/or carriers. In some instances, the payloads may use their own local power source for low-level operations (e.g., operations that do not consume much power) while using power from the base support power source and/or gimbal power source for higher level operations (e.g., operations that consumer more power). In some instances, the base support power source may be a backup for a local power source of the payload. Alternatively, the local power source of the payload may serve as a backup for the base support power source.

The same power source may be used to power each of the carriers. Alternatively, different power sources may be used to power each carrier. For instance, a power source may power a first carrier while a second power source powers a second carrier. The same power source may be used to power the carriers and other parts of the base support. For instance, the same power source may be user to power the carriers and one or more propulsion units of the base support. The same power source may be used to power the carriers and a controller, communication unit, or other component of the base support. Different power sources may be used to power the carriers and other parts of the base support. For instance, different power sources may be user to power the carriers and one or more propulsion units of the base support. A first power source may be used to power the carriers and a second power source may be used to power the propulsion units. Similarly, different power sources may be used to power the carriers and a controller, communication unit, or other component of the base support.

One or more power sources may be on-board the base support and not on-board the platform. One or more power sources may be on-board the platform without being on-board the base support. The one or more power sources may be on-board the platform which may be a part of the base support, which may mean the one or more power sources are on-board the base support. One or more power sources may or may not be on-board the carriers. One or more power sources may or may not be on-board the payloads.

A controller 912 can be configured to generate control signals transmitted to the carriers 906a, 906b via the platform 904. In some embodiments, the control signals can be used to control a spatial disposition of the corresponding payloads 908a, 908b via the carriers 906a, 906b, such as via the driving of one or more motors of the carriers as described herein. Alternatively or in addition, the control signals can be transmitted to the payloads via the platform in order to control a function of payload. For example, when the payload is an imaging device, the controller can generate signals for controlling at least one of a record function, zoom function, power on function, power off function, changing image resolution function, changing focus function, changing depth of field function, changing exposure time function, or changing viewing angle function of the imaging device. Control of one or more of these functions may result in a change in the field of view of the imaging device.

The controller may be the same controller that may be used to generate commands for other functions of the base support, or may be a separate controller. For example, the controller may or may not be the same controller that generates instructions to be sent to propulsion units to affect movement of the base support. The controller may comprise one or more processors that may execute instructions to perform one or more steps described herein.

The control signals can be generated based on user input provided to the base support 902. For example, the controller 912 can be operably coupled to a suitable input interface for receiving control signals input by a user. The input interface can be located on the base support, thus enabling user commands to be entered directly to the base support. Alternatively or in addition, the input interface may be located on a device separate from the base support (e.g., on a remote terminal, described elsewhere herein, or a computer, laptop, mobile device, tablet, etc.), such that the entered commands are transmitted to the base support (e.g., via suitable wired or wireless communication methods, such as local area networks (LAN), wide area networks (WAN), infrared, radio, WiFi, point-to-point (P2P) networks, telecommunication networks, cloud communication, etc.) over an intervening distance. Examples of suitable input interfaces include keyboards, mice, buttons, joysticks, or touchscreens. In some embodiments, the control signals can be automatically generated by the base support (or a separate device in communication with the base support) without any user input. For example, the control signals can be provided by a suitable onboard processor (not shown) of the base support.

Alternatively, the carriers 906a, 906b and/or payloads 908a, 908b can be configured to receive control signals from devices other than the controller 912. For example, the carriers and/or payloads can be in direct communication with a device separate from the base support (e.g., a remote terminal, computer, laptop, mobile device, tablet, etc.), and thereby receive control signals for controlling operation of the carriers and/or payloads. As another example, the carriers and/or payloads can include suitable hardware and/or software components enabling the carriers and/or payloads to generate control signals independently.

A base support 902 may comprise memory 914. In some embodiments, the payloads 908a, 908b can transmit payload data to the base support for storage within the memory. The payload data can be conveyed via the platform 904, or directly to the base support (e.g., via wireless communication). The payload data may be conveyed to the base support via the corresponding carriers 906a, 906b, which may in turn convey the information via the platform. The payload data can be any data generated and/or obtained by the payload, such as sensor data (e.g., image data, position data, orientation data, motion data) as well as data relating to a current state of the payload (e.g., data regarding whether the payload is turned on, turned off, currently performing a certain function, completed a certain function, etc.) The payloads may transmit some or all of the payload data to the memory. In some embodiments, the payload data can be transmitted continuously. Alternatively, the payload data can be transmitted at certain times, such as at specified time intervals or when certain events occur (e.g., new data is generated).

The base support 902 can optionally include a display 916, which can be any device suitable for visually displaying the data provided by the payloads 908a, 908b to a user. For example, the display can be a monitor or screen used to display still images or videos generated by a camera. The display may be integrally formed with the base support, or may be provided separately from and coupled to the base support. In some embodiments, the base support can include an interface adapted to receive a mating interface of the display (e.g., a socket or port) such that the display can be releasably coupled to the base support. The data presented on the display can be provided directly from the payloads, or can be retrieved by the display from the memory 914. The display may receive and/or present payload data in real-time, or only at specified time intervals. In some embodiments, the display can also be configured to display data other than payload data, such as data relating to a state of the carriers 906a, 906b (e.g., the current spatial disposition) and/or a state of the base support (e.g., the base support type, spatial disposition, remaining power capacity, connectivity with other devices, etc.). The display can show any other information, as described elsewhere herein. The display may be controlled by a user via the input interface described above.

The base support 902 can include a communication unit 918 for communicating data between the base support and a remote device. The communication unit can include one or more receivers, transmitters, and/or transceivers. The receivers, transmitters, and/or transceivers can be configured to transmit data using any suitable wired or wireless communication method. For example, the communication unit can transmit data to the remote device via WiFi. Alternatively, the communication unit can transmit data to the remote device using cables such as USB cables, and may include suitable interfaces or ports for receiving such cables. The remote device can be a terminal, mobile device, computer, laptop, tablet, or movable object. For example, the communication unit can be used to communicate with a remote device providing user input control signals to the controller 912, as previously mentioned. In some embodiments, the communication unit can be used to transmit payload data to the remote device, and such payload data can be obtained directly from the payloads 908a, 908b or retrieved from the memory 914. For example, the communication unit can be used to transmit image data to another device enabling a remote user to view the data collected by the payloads. The communication unit can also transmit other types of data, such as data relating to a state of the carriers, platform and/or the base support. The operation of the communication unit can be controlled by a user, such as via a suitable input interface.

Optionally, the base support 902 can be used to transmit data (e.g., image data such as video data, audio data, control data, etc.) to other base supports, using wired or wireless communication. The base supports described herein can be networked to each other in any suitable manner. For example, the base support can be used as wireless hub for communicating between a plurality of other base supports. Some or all of the base supports can be controlled by a remote device or a plurality of remote devices. The base support can receive control signals provided by the remote device(s) and relay the control signals to the other base supports. Conversely, the base support can receive data (e.g., image data, audio data, etc.) provided by the other base supports and relay the data to the one or more remote devices.

The platform 904 may provide a plurality of interfaces 920a, 920b which may receive and couple to corresponding carriers 906a, 906b. As previously described, platform may be separate or separable from the base support 902. Alternatively, the platform may be integral to the base support. The platform may be a part of the base support. Each interface of the platform may be configured to couple with the corresponding carrier.

A mechanical coupling may be provided which may allow the corresponding carrier to be securely attached to the corresponding interface. In some instances, the mechanical coupling may allow the corresponding carrier to be attached and/or detached. In some instances, the mechanical coupling may allow the corresponding carrier to be attached and/or detached from the corresponding interface quickly and easily without requiring tools. The mechanical coupling may be a quick-release coupling which may require less than or equal to a single motion, two motions, three motions, four motions, five motions, six motions, or ten motions, manually without the use of tools.

An electrical coupling may be provided which may allow the corresponding carrier to be in electrical communication with the base support via the corresponding interface. Electrical couplings may allow power and/or information to flow between the base support and the corresponding carrier. One or more electrical connectors may be provided on the interfaces that may allow power and/or information to flow between the base support and the corresponding carrier. Power and information may be conveyed on the same electrical connector provided at an interface. Power and information may be conveyed using different electrical connectors at the interface. Information from the carrier to the base support and information from the base support to the carrier may be communicated on the same electrical connector provided at the interface. Information from the carrier to the base support and information from the base support to the carrier may be communicated using different electrical connectors provided at the interface. For example, information indicative of a carrier type and signals for controlling operation of the gimbal may be communicated on the same electrical connector provided at the interface. Information indicative of a carrier type and signals for controlling operation of the gimbal may be communicated using different electrical connectors provided at the interface.

In some embodiments, the electrical coupling may allow power to be conveyed from the base support to the carrier and/or payload. The power may be provided by the power source 910 on-board the base support. As previously described, the power source may be used to power the carrier and/or payload, and power may flow from the base support to the carrier and/or payload. In alternate embodiments, power may be provided on-board the carrier and/or payload and no power need flow. In some instances, no power may flow in either direction. In some instances, power may flow from a power source on-board the carrier and/or payload to the base support.

The electrical coupling may allow information to be conveyed from the base support to the carrier and/or payload. The information may include instructions from a controller 912 of the base support. The instructions may affect operation of the carrier and/or payload. For example, the instructions to the carrier may affect spatial disposition of the payload relative to the base support. For instance, the carrier may be a one-axis, two-axis, or three-axis gimbal. The rotation of the frame components of the gimbal may be controlled to cause the payload to achieve a desired orientation. In some instances, passive control and/or active control of the gimbal may be provided. Passive control may include instructions that may offset vibrations or other movements by the base support. Passive control may cause the payload to maintain its orientation relative to an inertial reference frame. The passive control may allow the payload to capture data smoothly (e.g., if the payload is a camera the payload may capture smooth images) free of the movements of the base support. For example, jitters from the base support may be eliminated or reduced. Movements by the base support (e.g., if the base support if moving within the environment) may be counteracted so that the payload remains steady. Active controls may include instructions from a user to direct the payload to point in a particular direction relative to the inertial reference frame. For example, if the payload is pointed forward, and the user wishes to view something to the right, the user may instruct the payload to turn to the right. The user may provide instructions via a remote controller. In some instances, both active and passive controls may be employed. The controller of the base support may issue instructions for passive control only, active control only, or both passive and active control. In some instances, the instructions from the controller may be conveyed to the carrier via the interfaces. In other instances, commands may be provided directly to the carrier without going through the interface. For example, user commands to control the carriers may be transmitted wirelessly directly to the carriers. For instance, the controller may send instructions for passive controls via the interface to the carrier, while a remote controller may send instructions for active controls directly to the carrier via wireless transmission. Any combination of commands from the controller and/or directly to the carrier may be provided. The electrical connection may permit data to flow from the base support to the carriers to affect disposition of the payloads relative to the base support.

The electrical coupling may also enable commands (e.g., from the controller of the base support) to be provided to the payloads to affect operation of the payloads. As previously described, a state of the payload may be affected (e.g., power state, mode, zoom, focal length, filters, field of view, etc.). The interface may allow data to flow from the base support to the payload. The instructions to affect operation of the payload may directly flow to the payload via the interface, or may be conveyed to the payload through the corresponding carrier.

The electrical couplings may allow data to flow from the carriers and/or payload to the base support. As described elsewhere herein, information about a state of the carrier and/or payload may be conveyed to the base support (e.g., power state, spatial disposition, physical parts, error status, etc.). In some instances, information from sensors on-board the carrier and/or payload may be conveyed to the base support. The data may be conveyed from the carrier and/or payload through the interface to the base support. Any other information about the carrier and/or payload may be conveyed. For example, information about a carrier type (e.g., make, model, brand), carrier weight, number of carriers, carrier hardware, carrier configuration (e.g., number of axes, orientation of axes, order of axes), carrier dimensions, a payload type (e.g., make, model, brand, type of information collected by payload, type of emission by payload, type of interaction of payload), payload weight, payload hardware, payload dimensions, payload functions, or any other information may be conveyed to the base support via the interface. Each carrier may comprise a hardware component (e.g., field-programmable gate array (FPGA), chip, or integrated circuit) that may store information about the respective carrier, such as respective carrier type. In some examples data collected by the payload may be conveyed to the base support via the interface. For example, the payload may be a camera, and images captured by the camera may be conveyed to the base support. The data may be automatically pushed from the carriers and/or payloads to the base support. The data may be automatically pushed from the carriers and/or payloads to the base support upon forming the electrical couplings. The data may be sent from hardware components of the carriers and/or payloads to the base support. The data may be sent from the carriers and/or payloads to a movement controller of a movable object. For instance, information about a first gimbal type and a second gimbal type may be conveyed to a movement controller of the movable object.

In some embodiments, data may flow one-way from a base support to the carrier and/or payload, or from the carrier and/or payload to the base support. Two-way data flow may be provided. For instance, data may flow back and forth between the base support and the carrier and/or payload as needed. In some instances, certain directions of data flow may take priority over other directions of data flow. For example, data flow from the base support to the carrier and/or payload may be prioritized above data flow the carrier and/or payload to the base support or vice versa. Alternatively, there may not be prioritization. In some embodiments, time-division multiplexing may be employed to determine whether data flows in which direction. In some embodiments, multiple electrical connections may be made that may allow data to flow simultaneously in the same direction and/or in different directions.

Optionally, when a carrier is coupled to a platform, an initialization process may occur. In some instances, the initialization process may include power being provided from the base support to the carrier. When the carrier receives power, it may send information to the base support via the interface. The information may include information about a carrier identity or type, or payload identity and/or type. In some instances, a base support may send a query or other communication to the carrier, prior to the carrier sending information to the base support. The base support may send information to the carrier and/or payload. For instance, the base support may send information about a base support type or identity (e.g., whether the base support is a UAV, handheld support, etc.). When the carrier and/or payload undergoes an initialization process, they may automatically revert to a 'start' position. For instance, the payload may have a predisposed spatial disposition relative to the base support (e.g., facing forward, downward, backward, to the side, etc.). The payload may have 'start' settings (e.g., no zoom, no filter, etc.).

The electrical coupling may be provided in any manner known in the art. For example, electrical contacts may be provided at the interface. The electrical contacts may be provided at the carrier. The electrical contacts of the interface and electrical contacts of the carriers may be brought into contact with one another when the carrier is mechanically coupled to the interface. In one example, a plug may be brought into contact with a socket, which may form the electrical connection. When brought into contact with one another, the sets of contact may provide the electrical communication, which may enable power to flow from the base support to the carrier, or vice versa, and/or data communications to flow from the base support to the carrier, and vice versa.

Figure 10:
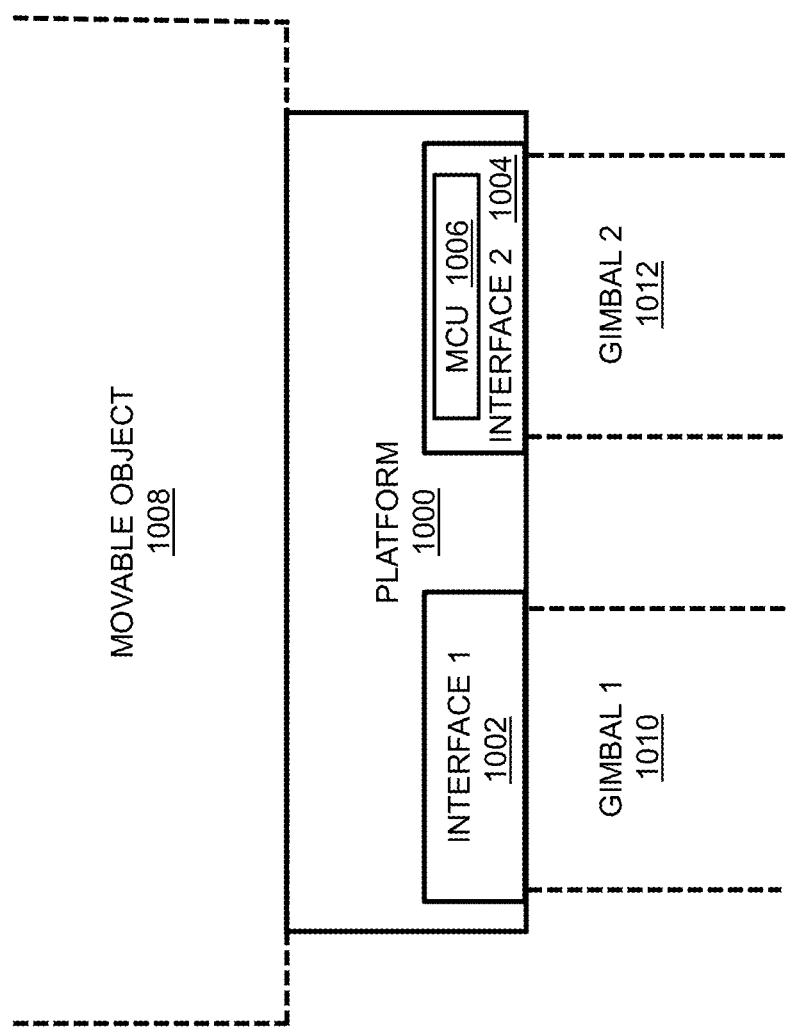
FIG. 10 shows a schematic of a platform for supporting a plurality of gimbals, in accordance with embodiments of the disclosure.

FIG. 10 shows a schematic of a platform for supporting a plurality of gimbals, in accordance with embodiments of the disclosure. A platform 1000 may be supported by or an integral part of a movable object 1008. The platform may comprise a plurality of interfaces 1002, 1004. A first gimbal 1010 may be connected to the movable object via the first interface 1002, and a second gimbal 1012 may be connected to the movable object via the second interface 1004. A second interface may comprise a microcontroller unit (MCU) 1006.

A platform 1000 may allow one or more gimbals 1010, 1012 to be coupled to a movable object 1008. The platform may be a part of the movable object. The platform may be integral to the movable object. Alternatively, the platform may be separate or separable from the movable object. The platform may be separate or movable relative to the central body. Optionally, the platform may have an additional interface that may permit removable attachment of the platform from the movable object.

The platform 1000 may be formed of a single continuous set of one or more pieces, or may be formed of multiple discontinuous sets of one or more pieces. In some instances, the platform may comprise interfaces 1002, 1004. In some embodiments, the platform may be formed of only the interfaces. Alternatively, separate housings or supporting structures may be provided.

A movable object may support any number of gimbals (and corresponding payloads). In some embodiments, scenarios with two gimbals are described. Any description herein of a dual-gimbal movable object may apply to any multi-gimbal movable object, such as movable objects supporting two or more, three or more, four or more, five or more, six or more, seven or more, or eight or more gimbals (and/or corresponding payloads). The platform may have any number of interfaces to accommodate any number of gimbals. In some instances, a one-to-one relationship may be provided between interfaces and corresponding gimbals. For example, a single interface may be configured to accept a single gimbal at a time. Alternatively, a single interface may accept multiple gimbals. A single gimbal may connect to a single interface. Alternatively, a single gimbal may connect to multiple interfaces. In some embodiments, the same number of interfaces may be provided as the number of gimbals that may be supported by the movable object. For example, if two gimbals are supported by the movable object, two interfaces may be provided.

The gimbals may connect to their respective interfaces. For example, a first gimbal 1010 may connect to a first interface 1002 and a second gimbal 1012 may connect to a second interface 1014. The first gimbal may be detached from the first interface and/or the second gimbal may be detached from the second interface. The gimbals may be swapped such that the first gimbal is attached to the second interface and the second gimbal is attached to the first interface. Or a third gimbal may be attached to the first interface and/or second interface.

The first interface may be configured to convey the one or more commands to the first gimbal via an electromechanical connection. The second interface may be configured to convey the one or more commands to the second gimbal via an electromechanical connection. The interfaces may convey the commands to the respective gimbals only when the gimbals are connected to the interfaces. A mechanical coupling may physically connect the gimbals to the interface. The gimbals may be securely locked to the interface so that they do not become separated from the interface unintentionally. The gimbals may be securely locked to the interfaces so that they do not become separated while the movable object is in operation. For example, the gimbals may remain secured to the corresponding interfaces while a UAV is in flight. An electrical coupling may permit power and/or data to be conveyed from the gimbal to the interface and/or vice versa.

The movable object may operate while each of the interfaces is occupied with a gimbal. The movable object may be capable of operating even if one or more of the interfaces is not occupied with a gimbal. For example, a UAV may be capable of flying around while one or more of the interfaces does not have a gimbal attached thereto. For instance, a first interface may have a first gimbal attached to it, while a second interface does not have a gimbal attached. The movable object may be capable of flying around even when neither the first interface nor the second interface is occupied with a gimbal. The movable object may have a separate on-board camera that may allow a user to see where the movable object is going. For instance, the movable object may have a first person view (FPV) camera on-board the movable object. The FPV camera may be built into the movable object.

In some embodiments, the platform may comprise a housing and the MCU may be within the housing. The MCU may be integrally formed at the second interface. The MCU may be separate or separable from the second interface. The MCU may be detachable from the second interface. The MCU may be operatively provided between a controller on-board the movable object and the gimbal connected to the second interface. In some embodiments, communications from the movable object may pass through the MCU to reach the second gimbal, and/or communications from the movable object may pass through the MCU to reach the first gimbal. In some embodiments, the MCU may be off-board the platform. The MCU may be on-board the movable object. The MCU may or may not be on-board the platform while on-board the movable object. The MCU may intercept communications from the controller to the second gimbal, and vice versa.

Optionally, the first interface and the second interface may be provided on a same side of the platform. The first interface and second interface are adjacent to one another and spaced apart such that control of the first gimbal and the second gimbal will not interfere with one another. The same side of the platform upon which the first and second interfaces are disposed may be opposite a side of the platform facing a central body of the movable object. The first and second interfaces may face away from the central body of the movable object. As described elsewhere herein, the first interface and/or second interface may comprise a quick release mechanism that permits the first gimbal to be attached or detached manually without the aid of tools in one or fewer, two or fewer, three or fewer, four or fewer, five or fewer, six or fewer, or ten or fewer motions.

The first and second interfaces may remain at fixed positions relative to one another. The first and second interfaces may remain at fixed positions relative to a central body of the movable object. The first and second interfaces may be movable relative to one another. The first and second interfaces may be movable relative to a central body of the movable object.

One or more commands may be sent from the movable object that may affect operation of the one or more gimbals. Any description herein of the gimbals may apply to the gimbals and/or corresponding payloads carried by the gimbals. Commands to the gimbals may include a header. In some embodiments, the various gimbals may use the same header. Alternatively, different gimbals or gimbals types may use different headers.

When the same header is used by the various gimbals, in order to differentiate which gimbal the command is intended for, the movable object may provide different headers. For example, if both Gimbal 1 and Gimbal 2 operate under a 0400 header, the movable object may need to distinguish which gimbal the commands are intended for. The movable object may encode the commands so that the commands intended for Gimbal 1 use a 0400 header, (i.e., the same header that the gimbal originally uses). The movable object may encode the commands intended for Gimbal 2 to use a 0402 header (i.e., a different header than the header that the gimbal originally uses). The first header of the one or more commands received at the first interface and a second header of the one or more commands received at the MCU may be different. The first interface may convey the commands with the original header to the first gimbal. The second interface may convey the command with the header that is different from the original header to the second gimbal. However, since the second gimbal operates under the same header, the MCU may convert the header prior to conveying the commands to the gimbal. For instance, the MCU may convert the 0402 headers to 0400 before conveying the commands to Gimbal 2. The MCU may update the one or more commands to the second gimbal by altering a header of the one or more commands that is compatible with the second gimbal. The first header received at a third interface and a third header of the one or more commands received by the second gimbal may be identical. The MCU may convert the second header to the third header.

In some embodiments, a platform configured to be carried by a movable object may comprise a first interface configured to accept a first gimbal, wherein the first interface is capable of conveying one or more commands to the first gimbal that affects operation of the first gimbal or a payload carried by the first gimbal; and a second interface configured to accept a second gimbal, wherein the second interface comprises a microcontroller unit (MCU) configured to update and convey one or more commands to the second gimbal that affects operation of the second gimbal or a payload carried by the second gimbal. A method of supporting a first gimbal and a second gimbal to be carried by a movable object may be provided, said method comprising: conveying, via a first interface configured to accept the first gimbal, one or more commands to the first gimbal that affects operation of the first gimbal or a payload carried by the first gimbal, when the first gimbal is accepted at the first interface; and conveying, via a microcontroller unit (MCU) of a second interface configured to accept the second gimbal, one or more commands to the second gimbal that affects operation of the second gimbal or a payload carried by the second gimbal, when the second gimbal is accepted at the second interface.

Any description herein of an update of the commands provided to the second gimbal may include any modification to the commands. The update may include changing a header of the commands. The update may include changing a format of the commands to make the commands compatible with the recipient gimbal. The update may include encrypting or decrypting the commands in a manner that is compatible with the recipient gimbal.

As mentioned elsewhere herein, the movable object may operate in a simultaneous mode, which may cause the first gimbal and the second gimbal to move in a synchronized manner. The first and second interfaces may receive from a controller on-board the movable object, commands that cause the first gimbal and the second gimbal to move in a synchronized manner, when operating in a simultaneous mode. In some embodiments, the controller may send the same controls to both the first and second interfaces. The commands to the first and second gimbals may be identical. The commands may be received at substantially the same time. The commands may be received at the exact same time, or within less than or equal to about 1 second, 0.5 seconds, 0.1 seconds, 0.05 seconds, 0.01 seconds, 0.005 seconds, or 0.001 seconds of one another.

In some instances, during a simultaneous mode, the second interface may receive, from a controller on-board the movable object, one or more commands that affects operation of the second gimbal. The MCU may optionally update the commands as they are sent to the second gimbal. For instance, the MCU may change a header of the commands as they are sent to the second gimbal. The second gimbal may operate in accordance with the commands. Data about activity of the second gimbal may be conveyed back to the MCU. For example, the spatial disposition and/or movement information about the second gimbal may be conveyed to the MCU. The MCU may communicate one or more commands that affects operation of the first gimbal to the first interface. The MCU may communicate the one or commands that affect operation of the first gimbal based on the commands that were sent to the second gimbal. The MCU may communicate the one or more commands that affects operation of the first gimbal based on the data about the activity of the second gimbal (e.g. status information from the second gimbal). The commands from the MCU may cause the first gimbal to move in a time-delayed synchronized manner with the second gimbal, when operating in a simultaneous mode. The time-delay may be imperceptible to the naked human eye. The time delay may be less than or equal to 3 seconds, 2 seconds, 1 second, 500 milliseconds, 300 milliseconds, 100 milliseconds, 75 milliseconds, 50 milliseconds, 40 milliseconds, 30 milliseconds, 25 milliseconds, 20 milliseconds, 15 milliseconds, 10 milliseconds, 5 milliseconds, 3 milliseconds, 1 millisecond, or less.

In some embodiments, using this feedback and following control may advantageously provide more synchronized action by the gimbals. For instance, a typical gimbal control command may be a command for angular speed rather than for angular value. However, when an angular speed command is digitized and sent to different types of gimbals, different gimbals may rotate at different angle values in response to the same digitized angular speed. For example, a first gimbal may rotate 10 degrees and a second gimbal may rotate 15 degrees in response to the same angular speed command. This may result in the gimbals not being well-synchronized. The feedback and following process as described herein may permit the control of a single gimbal, and the other gimbal may mirror that controlled gimbal by receiving a status of the controlled gimbal.

Additional advantages may be provided by sending the commands via an interface with an MCU, as opposed to an interface without the MCU. The MCU associated with the interface that receives the commands may encapsulate the controlled gimbal's status information into gimbal instructions, which may be sent to the other gimbal. The information may be sent to the other gimbal via a communication bus. The other gimbal may receive the encapsulated gimbal instructions and follow a rotation of the controlled gimbal.

The systems and methods provided here may be able to accommodate many types of gimbals. This may allow pre-existing gimbals to be supported by the movable object, since the movable object (e.g., platform) may be able to update the headers to be compatible with the existing gimbals. This may permit operation with gimbal firmware that does not distinguish gimbal identifiers, and allow targeted instructions to be sent to the respective gimbals. The systems and methods provided herein may operate without requiring a gimbal identifier.

Figure 11:
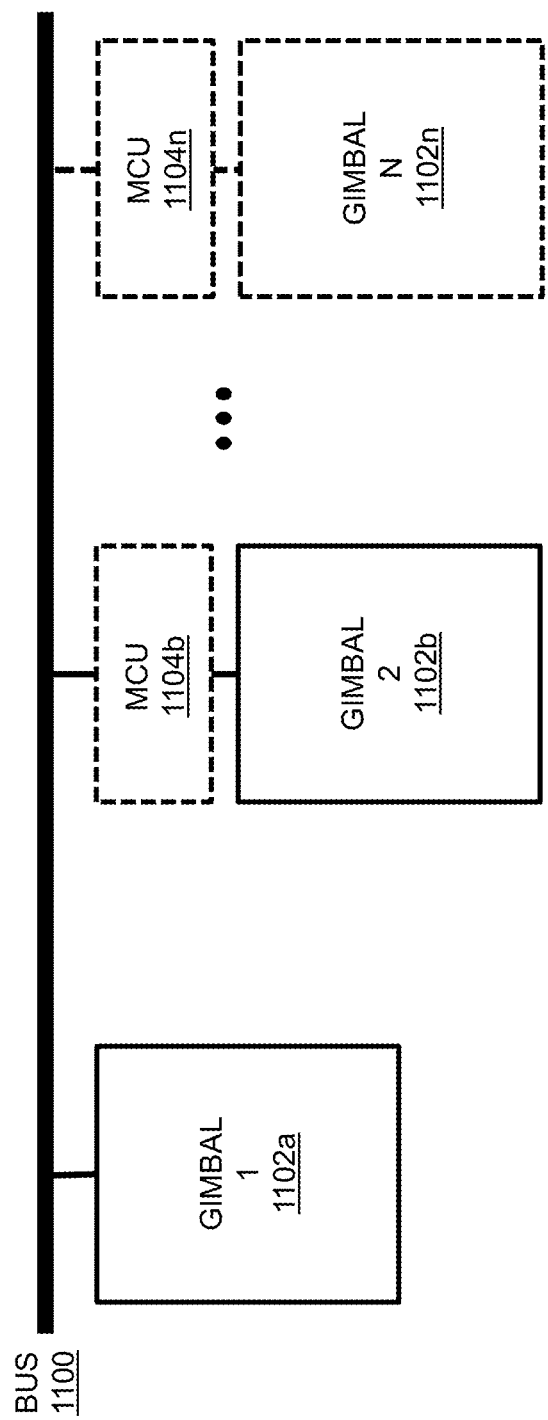
FIG. 11 illustrates an example of a communication infrastructure, in accordance with embodiments of the disclosure.

FIG. 11 illustrates an example of a communication infrastructure, in accordance with embodiments of the disclosure. A bus 1100 may be provided. A plurality of gimbals 1102a, 1102b may be connected to the bus. Optionally, an MCU 1104b may be operably between one or more of the gimbals and the bus. At least one of the gimbals need not have an MCU between the gimbal and the bus.

The bus 1100 may be a controller area network (CAN) bus. The bus may be a vehicle us. The bus may use a message-based protocol for communications. The bus may be provided within the platform. The bus may be provided within a movable object. The bus may or may not traverse both a platform and movable object.

One or more gimbals 1102a, 1102b may be connected to the bus. Although two gimbals are described in exemplary embodiments of the disclosure, any number of gimbals 1102n may be provided and connected to the bus. The gimbals may be connected to the bus in parallel. The gimbals may be connected to the bus when the gimbal is coupled to its corresponding interface. When the gimbal is separated from the corresponding interface, the gimbal may no longer be connected to the bus.

In one example, a first gimbal 1102a may be directly coupled to the bus 1100. When a gimbal is attached and/or detached from the interface, the gimbal may be attached and/or detached from the bus. A second gimbal 1102b may or may not be directly coupled to the bus. In some embodiments, a MCU 1104b may be provided between the second gimbal and the bus. The second gimbal may communicate with the bus via the MCU. When the gimbal may be attached and/or detached from the interface, the gimbal may be attached and/or detached from the MCU.

As described elsewhere herein, commands may be provided to the first gimbal and second gimbal. In some embodiments, the destination of the commands may depend on a header of the commands. For instance, if gimbals use a first header, then the commands with the first header may be directed to the first gimbal 1102a. Commands with a second header different from the first header may be directed to the MCU 1104b. The MCU may convert the second header to a third header identical to the first header, and the second gimbal may operate in accordance with the commands.

Information may be provided from the gimbals to the bus. For instance information about gimbal type, number of gimbals, or other information may be provided to the gimbal bus. The gimbals may provide information about a status of the gimbal. The gimbals may provide information about a spatial disposition of the gimbal and/or payload. For instance, gimbals may send their orientation information (e.g., axis information with respect to any of the axes) to the bus. The bus may send the information from the gimbals to a controller of a UAV. The controller of a UAV may be a flight controller of the UAV. The gimbals may send gimbal status data to the bus continuously, periodically, and/or in response to detected events. In some embodiments, the gimbal may send gimbal status data to the bus at regular intervals. The intervals may have any frequency (e.g., every minute or less, 30 seconds or less, 10 seconds or less, 5 seconds or less, 1 second or less, 0.5 seconds or less, 0.1 seconds or less, 0.05 seconds or less, 0.01 seconds or less, 0.005 seconds or less, or 0.001 seconds or less). The information may be conveyed by the gimbals to the bus in real-time.

The systems and methods provided herein may apply to any number of gimbals. As any additional gimbals 1102n are supported, additional corresponding MCUs 1104n may be provided. If commands to each gimbal have a unique header, the various MCU's may convert the headers as needed to a header compatible with the corresponding gimbals.

The commands may be generated using a controller. The controller may be on-board the movable object. The controller may be in communication with the bus 1100. The controller may send the commands to the bus, and the various headers of the commands may indicate which gimbal is the destination for the communication. This may allow the controller to send various commands to the various gimbals via the bus.

When operating in an independent mode, various commands may be sent to any of the gimbals. For instance, different commands may be sent to the first and second gimbals, and the first and second gimbals may operate those different commands. The commands sent to the first and second gimbals may be independent of one another.

When operating in a simultaneous mode, the same commands may be sent to each of the gimbals. For instance the same commands may be sent to both the first and second gimbals via the bus. Alternatively, a single set of commands may be sent to a gimbal (e.g., the second gimbal), and then based on a status of the gimbal in response to the commands, the corresponding commands may be sent to the other gimbal (e.g., the first gimbal).

The gimbals may be connected to a bus upon electromechanical coupling with a platform. Each interface may comprise a coupling assembly that may permit the electromechanical coupling with the corresponding gimbal.

Figure 12:
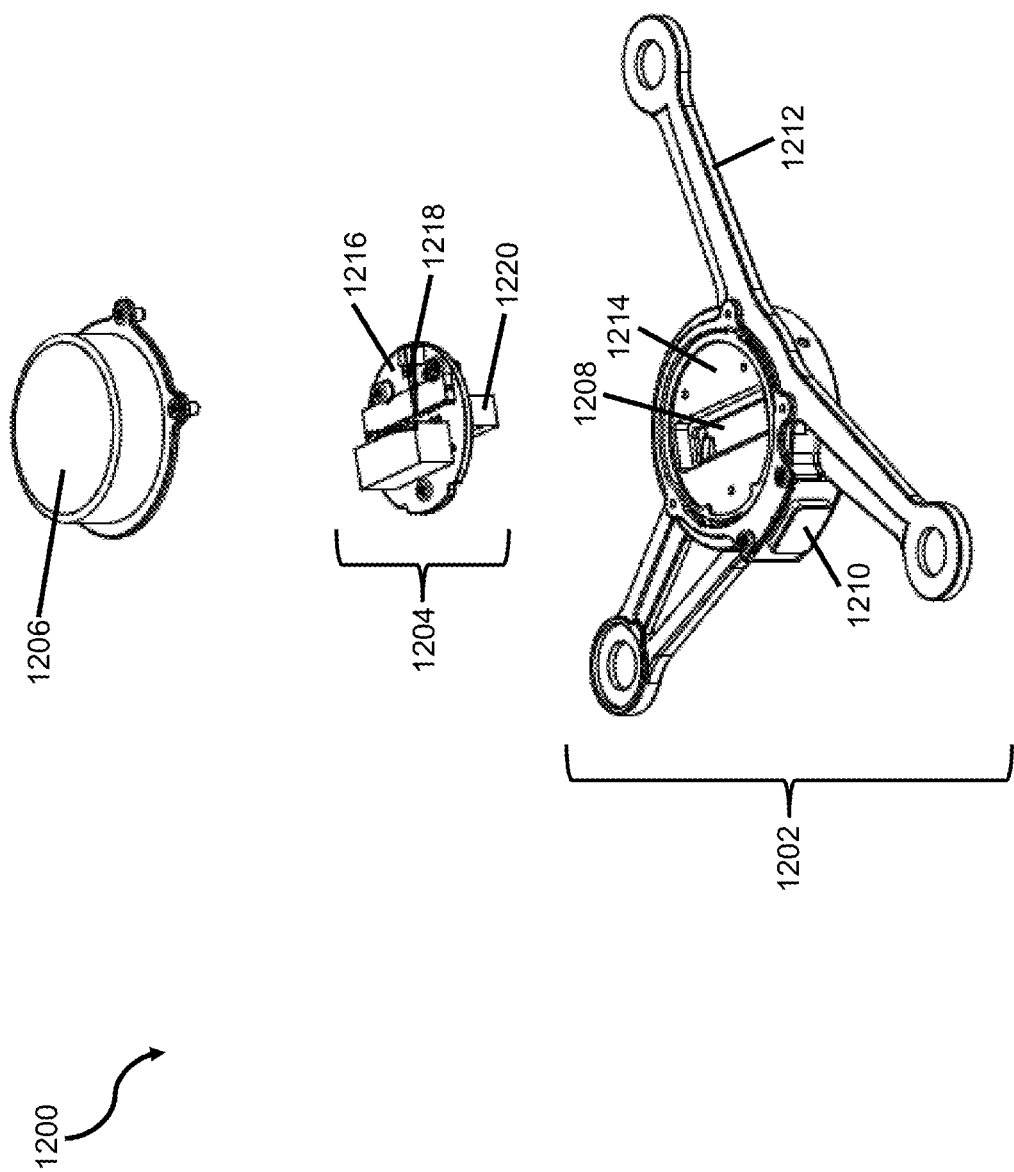
FIG. 12 shows an exploded view of an example of a coupling assembly, in accordance with embodiments of the disclosure.

FIG. 12 shows an exploded view of an example of a coupling assembly, in accordance with embodiments of the disclosure. The coupling assembly 1200 may comprise an attachment assembly 1202, an internal assembly 1204, and a cap 1206.

The attachment assembly 1202 may couple to the movable object. For instance, the attachment assembly may couple to a corresponding mounting support of the movable object. The mounting support may form an exterior surface of a housing of the movable object. The mounting support may be separate from the exterior surface of a housing of the movable object. The mountain support may be located such that a gap or space is provided between the mounting support and a central body of the movable object. The attachment assembly may comprise a support 1212. The support may have one or more legs extending from a central region. Any number of legs may be provided. In some instances, two or more, three or more, four or more, five or more, six or more, or eight or more legs may be provided. The support may extend to increase the cross-sectional area of the attachment assembly. This increase in area may allow more stable attachment of the attachment assembly to the mounting support. The distal ends of the support legs may be secured to the mounting support. For instance, the distal ends may be secured to the mounting support via a direct connection (e.g., screws).

In some instances, a shock absorbing member may be provided between the distal end of the support legs and the mounting support. The shock absorbing member may comprise one or more deformable balls that may reduce vibration. The shock absorbing member may include springs, elastics, deformable members (e.g., balls, cylinders, cones, or any other shapes), pneumatics, hydraulics, magnets, or any other member that may absorb or reduce vibrations. The shock absorbing members may be part of the attachment assembly and may be separable from the mounting support. In other instances, the shock absorbing members may be separate from the attachment assembly and separable from the attachment assembly. The shock absorbing members may be part of the mounting support.

The attachment assembly 1202 may also comprise a rotating member 1214. The rotating member may rotate relative to the support 1212. The rotating member may be located within a central region of the support. The rotating member may rotate about an axis perpendicular to the surface of the rotating member. The rotating member may be configured to rotate freely. Alternatively, the rotating member may be configured to rotate a freely within a limited range. The limited range may be any number of degrees—for instance, the limited range may be less than or equal to about 360 degrees, 270 degrees, 180 degrees, 90 degrees, 60 degrees, 45 degrees, 30 degrees, or 15 degrees.

The rotating member 1214 may comprise a slot 1208. The slot may be through-hole. The slot may or may not have a bottom surface. In some instance, the bottom may be open. The slot may have a shape that may be complementary to the shape of a socket 1220 of an internal assembly 1204.

The attachment assembly may comprise an opening 1210. One or more electrical connectors may pass through the opening. The electrical connectors may electrically connect a gimbal attached to the coupling assembly with the movable object. For example, wires may connect the gimbal to the movable object, and pass through the opening. The wires may be directly connected to the gimbal, or may be connected to the socket which may electrical connect to the gimbal.

The internal assembly 1204 may comprise a circuit board 1216. The circuit board may or may not be a printed circuit board (PCB). The circuit board may form a substrate or support for the internal assembly. The circuit board may be sized and/or shaped to match the shape of a rotating member 1214 of the attachment assembly. The circuit board may have the same cross-sectional shape as the rotating member. The circuit board may have a diameter, length, width, diagonal, or other dimension that matches or is less than the corresponding dimension of the rotating member. The circuit board may attach to the rotating member. In some instances, the circuit board may be attached to the rotating member with aid of one or more, two or more, three or more, four or more, five or more, or six or more screws. The circuit board may alternatively be attached to the rotating member with aid of a mechanical interlocking mechanism, adhesives, welding or soldering, or other attachment mechanisms.

The internal assembly may comprise a socket 1220. The socket may be inserted into the slot 1208 of the rotating member. The socket and slot member sized and/or shaped so that they complement one another. The socket may or may not extend through the slot. The socket may or may not protrude on the other side of the slot. The slot may have an open bottom. A gimbal may be connected to the socket. The gimbal may have a complementary connector that may connect to the socket. Connecting the gimbal to the socket may provide electrical connections between the gimbal and the coupling assembly. Connecting the gimbal to the socket may provide a first signal indicating that the gimbal is at least partially attached to the movable object. In some instances, the gimbal may receive electrical power as soon as it is attached to the socket. Alternatively, the gimbal may be attached to the socket but may not receive electrical power until the gimbal is locked. When the gimbal is sufficiently rotated and is locked, a second signal may be provided that may indicate that the gimbal is locked relative to the movable object. The circuit board may be contact the rotating member on a top surface of the rotating member. The gimbal may connect to the socket through the bottom side of the attachment assembly. The gimbal may connect to the socket on an opposite side of the attachment assembly that is in contact with the internal assembly. A portion of the attachment assembly may be sandwiched between the internal assembly and the gimbal.

The internal assembly may also comprise a slide switch 1218. The slide switch may indicate when the gimbal is in a locked position. The slide switch may default to an 'off' position. When the gimbal is secured and locked to the coupling assembly, the slide switch may be in an 'on' position. In some embodiments, power and/or communications may be permitted to flow to and/or from the gimbal when the slide switch is in an 'on' position.

A cap 1206 may be provided. The cap may cover the internal assembly 1204 when attached to the attachment assembly. The cap may have an internal region within which the internal assembly may be provided. The cap may cover at least a portion of a central region of the attachment assembly. In some instances, the cap may cover the attachment assembly so that the rotating member upper surface is not exposed. The internal assembly may be partially or completely enclosed by the cap and the attachment assembly. The cap may protect the internal assembly from the elements. The cap may not rotate with the internal assembly. In some instances a space or gap may be provided between the internal assembly and the cap so that the internal assembly does not rub against the cap when the internal assembly is rotating with the rotating member.

Figure 13:
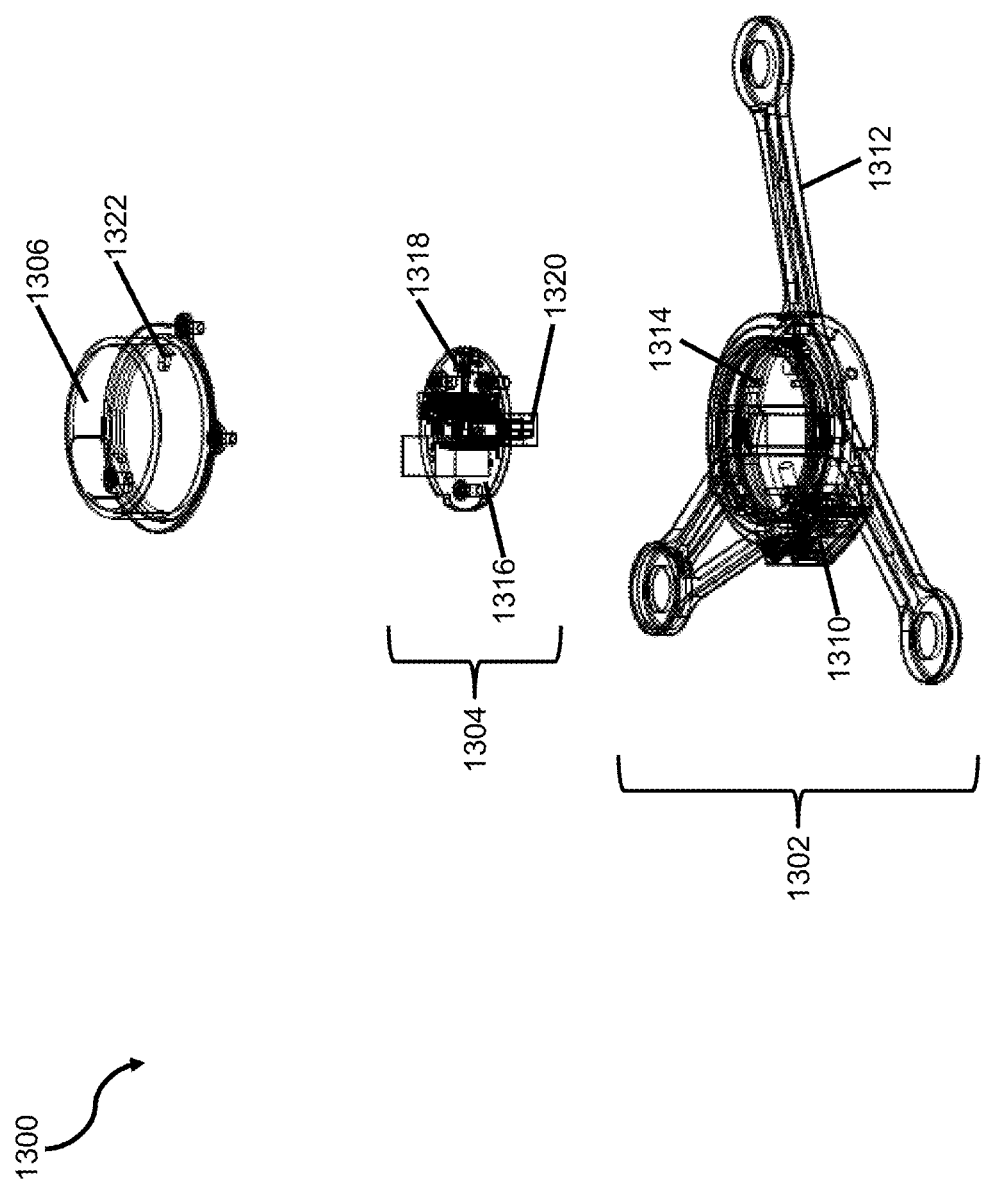
FIG. 13 shows a through view of an example of a coupling assembly, in accordance with embodiments of the disclosure.

FIG. 13 shows a through view of an example of a coupling assembly, in accordance with embodiments of the disclosure. The coupling assembly 1300 may comprise an attachment assembly 1302, an internal assembly 1304, and a cap 1306.

The attachment assembly 1302 may comprise a support 1312. The support may be configured to attach to a mounting support of a movable object. The support may comprise a central region and one or more legs extending from the central region. The attachment assembly may comprise a rotating member 1314. The rotating member may be within the central region of the support. The rotating member may rotate relative to the support. The rotating member may rotate about a yaw axis. The attachment assembly may comprise an opening 1310. The opening may serve as a passageway through which electrical connectors may pass. The electrical connectors may electrically connect the gimbal with the movable object.

The internal assembly 1304 may comprise a circuit board 1316. The circuit board may be support for the internal assembly. The circuit board may support one or more sockets 1320. The socket may be configured to fit into a slot of the rotating member 1314. The circuit board may support the socket on a lower surface of the circuit board. The lower surface of the circuit board may contact an upper surface of the rotating member. The circuit board may rotate with the rotating surface of the rotating member. The circuit board may support a slide switch 1318. The slide switch may indicate when the gimbal is securely locked to the coupling assembly.

The cap 1306 may comprise a slide knob 1322. The knob may be formed on an inner surface of the cap. The cap may have an interior surface. The knob may protrude from the inner surface. When the rotating member 1314 is rotated with the rotation of the gimbal, the rotating member may rotate relative to the cap. The sliding switch 1318 may rotate with the rotating member and come into contact with the knob on the interior surface of the cap. When the switch comes into contact with the knob, the state of the switch may be altered. For instance, if the switch is normally in an 'off' position prior to rotation, the switch may be moved to an 'on' position by the knob upon sufficient rotation of the rotating member.

Figure 14:
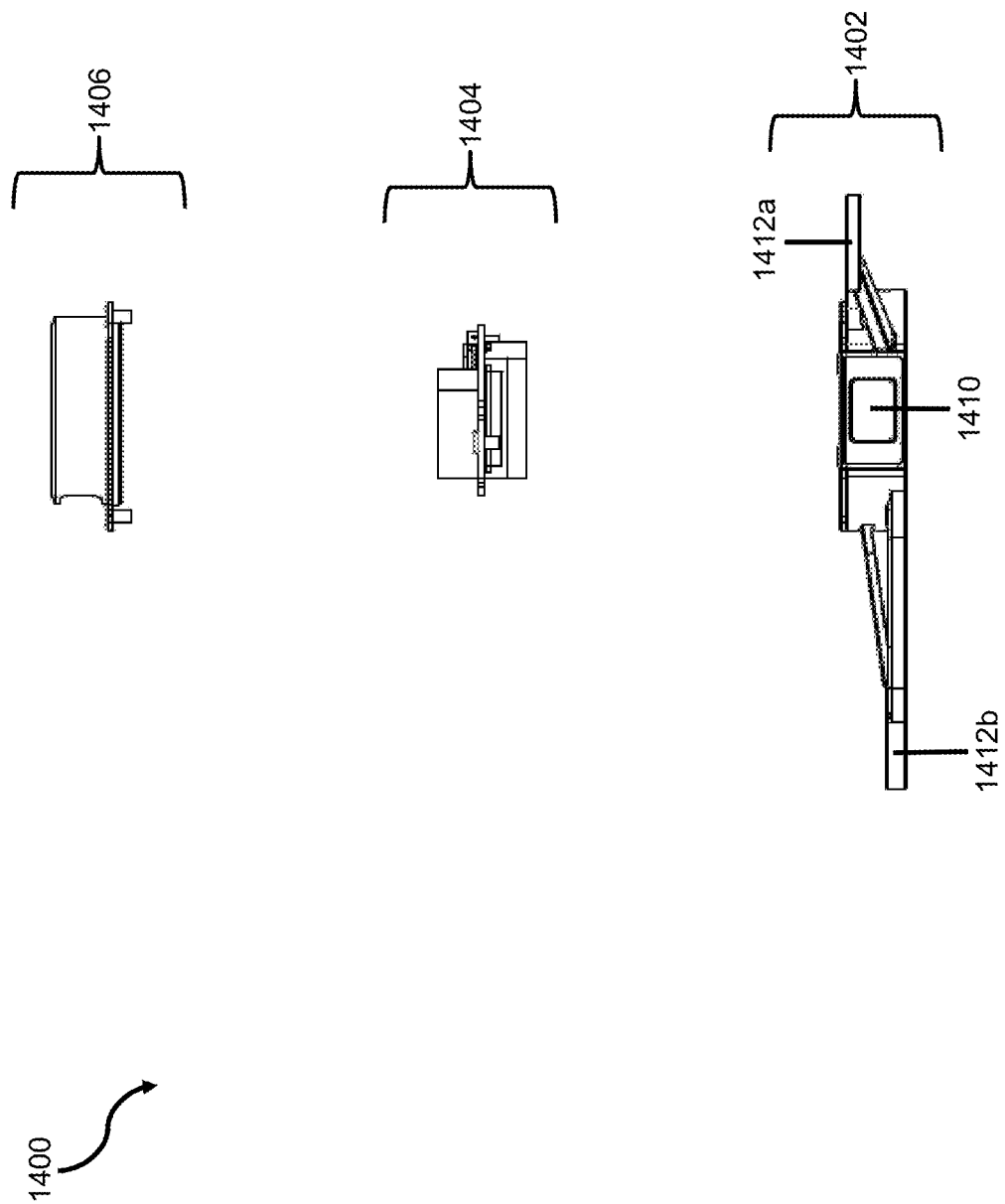
FIG. 14 shows an exploded side view of an example of a coupling assembly, in accordance with embodiments of the disclosure.

FIG. 14 shows an exploded side view of an example of a coupling assembly, in accordance with embodiments of the disclosure. As previously described, the coupling assembly 1400 may comprise an attachment assembly 1402, an internal assembly 1404, and a cap 1406.

The coupling assembly may comprise a support which may have a plurality of legs 1412a, 1412b. Any number of legs may be provided. The legs may be extending radially from a central region. The legs may have one or more contact surfaces that may or may not be coplanar. The legs may have contact surfaces that may be within the same plane, or that may be in different parallel planes. The legs may have any configuration which may allow the support to attach to a mounting support of the movable object. For instance, if the mounting support includes surfaces that are at different parallel planes, the legs may be provided to provide contacts at different parallel planes.

As previously described, the coupling may comprise an opening 1410 that may permit electrical connectors to pass through. The electrical connectors may allow the gimbal to be electrically connected to the movable object.

Figure 15:
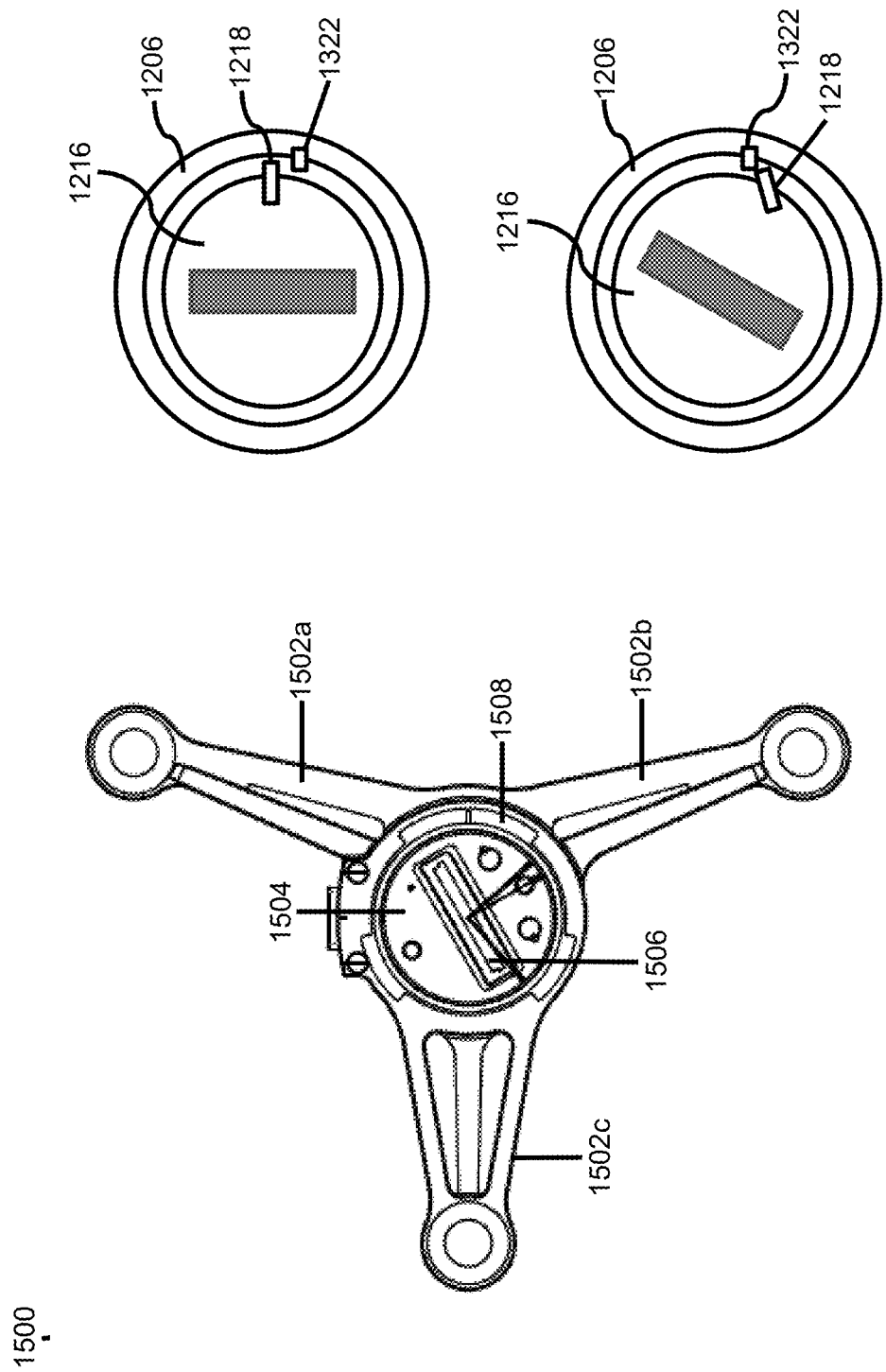
FIG. 15 shows a bottom view of an example of a coupling assembly, in accordance with embodiments of the disclosure.

FIG. 15 shows a bottom view of an example of a coupling assembly, in accordance with embodiments of the disclosure. Section A shows the coupling assembly 1500, which may include a support configured to contact and be connected to a mounting support. The support may comprise a plurality of legs 1502a, 1502b, 1502c. The legs may extend away from a central region. The distal end of the legs may be directly or indirectly attached to the mounting support. In some instances, an intermediary member, such as one or more shock absorbers, may be provided. The shock absorbers may be provided on an upper surface of the legs. The legs may connect to the mounting support directly or indirect via the upper surface of the legs.

A rotating member 1504 may be provided that may rotate relative to the support. The coupling member may rotate about an axis perpendicular to the upper and/or bottom surface of the rotating member. The rotating member may be supported relative to the central region of the support. In some instances, a groove or sliding mechanism may be used. In some instances, a set of ball bearings or other types of bearings may be employed to permit the rotating member to rotate relative to the support.

The rotating member may have a slot. The slot may be a passageway through which a socket 1506 of an internal assembly may pass. The socket may pass partially through the rotating member, or entirely through the rotating member. The socket may or may not protrude from the rotating member. The socket may rotate with the rotating member. The socket may be exposed when a gimbal is not attached to the coupling member.

The gimbal may have a complementary electrical connector to the socket. The complementary connector may be a plug. In some embodiments, the gimbal may comprise a socket and a plug may be provided as part of the coupling assembly, which may pass through the slot. The complementary electrical connector of the gimbal may connect to the socket. The gimbal may plug into the socket. The coupling assembly may comprise one or more tabs 1508. The tabs may protrude, or form a lip. The tabs may form flanges or portions of flanges. The gimbal may have complementary protrusions. The complementary protrusions may be flanges or portions of flanges. When the connector of the gimbal is attached to the socket, the gimbal may be pressed against the coupling assembly. The protrusions of the gimbal may pass between the gaps between the one or more tabs of the coupling assembly. The gimbal may be rotated to secure the gimbal to the coupling assembly. When the gimbal is rotated, the socket and rotating member may rotate with the gimbal. The protrusions of the gimbals may rotate so that they are no longer in the gaps between the tabs, and that they contact the upper surface of the tabs. This may lock the gimbal securely in place and prevent the gimbal from moving vertically relative to the coupling assembly.

Section B shows how a sensor may indicate that a gimbal is not yet securely locked into the coupling assembly. A sliding switch 1218 may be provided on a circuit board 1216. The slide switch may be in an 'off' position. A knob 1322 may be provided on an inner surface of the cap 1206.

The rotating member 1214 may then be rotated together with the rotation of the gimbal. The rotation may occur with respect to the cap 1206.

Section C shows how a sensor may indicate that a gimbal has been securely locked into the coupling assembly. When sufficient rotation occurs, the sliding switch 1218 may be switched to an 'on' position by the knob 1322, due to the rotation of the circuit board 1216 relative to the cap 1206. The 'on' signal of the switch may indicate that the gimbal is properly secured to the coupling assembly. In some embodiments, power and/or data communications between the gimbal and the movable object may occur after confirmation that the gimbal is properly secured to the coupling assembly. Power and/or data communications between the gimbal and the movable object may occur upon the switch being switch to an 'on' position.

In some embodiments, one or more sensors may be employed by the coupling assembly to detect when the gimbal is attached to the coupling assembly. In one example, a single sensor may be employed to detect when the gimbal is at least partially connected to the coupling assembly. In another example, a single sensor may be employed to detect when the gimbal is securely locked into the coupling assembly. In another example, multiple sensors may be employed. For example, a first sensor may detect when a gimbal is at least partially connected to the coupling assembly and a second sensor may detect when a gimbal is securely locked into the interface. The first and second sensors may be the same type of sensors or may be different types of sensors. Examples of sensors may include, but are not limited to switches, electrical contacts, buttons, knobs, light sensors, heat sensors, current sensors, voltage sensors, or other types of sensors.

In some embodiments, a method of supporting multiple gimbals on a movable object may be provided. The method may comprise providing a plurality of interfaces, each interface carried by the movable object and configured to accept a gimbal in a repeatable manner (e.g., allow the gimbal to be releasably coupled to the interface); detecting, with aid of a first sensor of an interface, that a gimbal is at least partially connected to the interface; detecting with aid of a second sensor of the interface, that a gimbal is securely locked into the interface; and providing (1) power to the gimbal via the interface, (2) data to the gimbal via the interface, or (3) data from the gimbal to the interface, in response to detecting that the gimbal is at least partially connected to the interface and detecting that the gimbal is securely locked into the interface. A platform configured to support multiple gimbals on a movable object may be provided. Such a platform may comprise: a plurality of interfaces, each interface carried by the movable object and configured to accept a gimbal in a repeatable manner; a first sensor of an interface of said plurality of interfaces, said first sensor configured to detect that a gimbal is at least partially connected to the interface; and a second sensor of the interface configured to detect that a gimbal is securely locked into the interface wherein (1) the interface is configured to provide power to the gimbal, (2) the interface is configured to provide data to the gimbal, or (3) the gimbal is configured to provide data to the interface, when the first sensor indicates that the gimbal is at least partially connected to the interface and the second sensor indicates that the gimbal is securely locked into the interface. The interfaces may comprise the coupling assembly as described.

The coupling assembly may comprise a quick release mechanism that permits the gimbal to be attached or detached manually without the aid of tools in two or fewer motions. For instance, the gimbal may be plugged into a socket to be at least partially connected, and then rotated to securely lock the gimbal into place. This may occur manually without requiring any tools. The gimbal is at least partially connected to the interface when the gimbal makes a first movement relative to the interface. The gimbal may be securely locked into the interface when the gimbal makes a second movement relative to the interface. The first movement and the second movements may be separate motions. The first movement and the second movement may be different types of motions relative to one another. For example, the first movement may be a translational movement while the second movement may be a rotational movement. In alternative embodiments, the first movement may be a rotational movement while the second movement may be a translational movement. In another example, the first movement may be a vertically translational movement while the second movement may be a horizontally translational movement. In another example, the first movement may be rotational movement about a first axis while a second movement may be a rotational movement about a second axis different from the first axis.

In some embodiments, the gimbal may be at least partially connected to the interface when the gimbal slides relative to the interface. The interface comprises a slot into which a connecting portion of the gimbal is configured to slide. A first sensor may be contacted when the gimbal slides into the slot. The first sensor may be an electrical contact that makes contact with an electrical contact of the gimbal when the gimbal slides into the interface. Alternatively, the first sensor may be a switch that is moved when the gimbal slides into the interface. The first sensor may be the socket that may detect when the connector of the gimbal makes the connection with the socket.

The gimbal may be securely locked into the interface when the gimbal is rotated relative to the interface. The interface may comprise a slide knob that permits the gimbal to rotate relative to the interface. The slide knob may be within an interior surface of a coupling assembly of the interface. The second sensor may be contacted when the gimbal is rotated relative to the interface. The second sensor may be an electrical contact that makes contact with an electrical contact of the gimbal when the gimbal is rotated relative to the interface. The second sensor may be a switch that is moved when the gimbal is rotated relative to the interface. The second sensor may be a slide switch of an internal assembly that is moved when a slide knob comes into contact with the switch, upon a threshold degree of rotation of the gimbal.

In alternative embodiments, an interface may have a connector that may extend out to a respective gimbal, and the connector may be a rotational lock connector. In such a scenario, a gimbal may rotate relative to the interface when becoming partially connected to the interface. Additional movements, such as sliding movements may be used to securely lock the gimbal relative to the interface.

In some embodiments, the interface may be configured to permit the gimbal to make a second movement only after the gimbal has completed making a first movement. For instance, the gimbal may only be securely locked after the gimbal is at least partially connected. In some embodiments, this may naturally occur due to mechanical configuration of the connections. In some instances, this may occur only upon confirmation by a first sensor that the first movement has been completed. Then the second movement may occur.

For instance, the interface may be configured to permit the gimbal to rotate only after the gimbal slides into the interface. Optionally, the interface is configured to permit the gimbal to rotate only after the first sensor detects that the gimbal is at least partially connected to the interface. Alternatively, the gimbal may rotate relative to the interface even before the gimbal has slid into the interface or detection occurs that the gimbal is at least partially connected to the interface.

In some embodiments, a method of supporting multiple gimbals on a movable object may be provided. The method may comprise providing a plurality of interfaces, each interface carried by the movable object and configured to releasably couple with a gimbal; detecting, with aid of a first sensor of an interface, that a gimbal is at least partially connected to the interface; detecting with aid of a second sensor of the interface, that a gimbal is securely locked into the interface; and providing (1) power to the gimbal via the interface, (2) data to the gimbal via the interface, or (3) data from the gimbal to the interface, in response to detecting that the gimbal is at least partially connected to the interface and/or detecting that the gimbal is securely locked into the interface. Embodiments of the disclosure may comprise a platform configured to support multiple gimbals on a movable object, said platform comprising: a plurality of interfaces, each interface carried by the movable object and configured to releasably couple with a gimbal; a first sensor of an interface of said plurality of interfaces, said first sensor configured to detect that a gimbal is at least partially connected to the interface; and a second sensor of the interface configured to detect that a gimbal is securely locked into the interface wherein (1) the interface is configured to provide power to the gimbal, (2) the interface is configured to provide data to the gimbal, or (3) the gimbal is configured to provide data to the interface, when the first sensor indicates that the gimbal is at least partially connected to the interface and/or the second sensor indicates that the gimbal is securely locked into the interface.

An interface of a platform may comprise a quick release mechanism that permits the gimbal to be attached or detached manually without the aid of tools in two or fewer motions. The coupling assembly as described herein may be an example of a quick release mechanism.

The gimbal may be at least partially connected to the interface when the gimbal makes a first movement relative to the interface. The first movement may be a translational motion. The translational motion may be a vertical translational motion relative to the movable object. In some instances the translational motion may be a horizontal translational motion and/or a motion with both vertical and horizontal components. Alternatively, the first movement may be a rotational movement or any other type of movement. The gimbal may be at least partially connected to the interface when the gimbal makes the first movement relative to the interface. For instance, the gimbal may be at least partially connected to the interface when the gimbal slides relative to the interface. The interface may comprise a slot into which a connecting portion of the gimbal is configured to slide. A first signal may be generated when the gimbal completes the first movement. This may comprise the gimbal plugging into a socket within the slot. For instance, a first sensor may be contacted when the gimbal slides into the interface. The first sensor may be an electrical contact that makes contact with an electrical contact of the gimbal when the gimbal slides into the interface. In some embodiments, the first sensor may be a switch that is moved when the gimbal slides into the interface. The first sensor may be a socket to which the gimbal is connected, may be integrated into the socket, may be on the socket, or may be in electrical communication with the socket.

The gimbal may be securely locked into the interface when the gimbal makes a second movement relative to the interface. The second movement and the first movement may be different. The second movement and the first movement may be different types of movements. For instance, a first movement may be a translational movement while the second movement may be a rotational movement. Or the first movement may be a rotational movement while the second movement may be a translational movement. The directions of movement may be different. For example, one direction may be a horizontal direction while another direction may be a vertical direction. One direction may be a left right motion while another motion may be a front back motion. In one example, the gimbal may be securely locked into the interface when the gimbal is rotated relative to the interface. The interface may comprise a slide knob that permits the gimbal to rotate relative to the interface. A second signal may be generated when the gimbal completes the second movement. For example, a second sensor may be contacted when the gimbal is rotated relative to the interface. The second sensor may be an electrical contact that makes contact with an electrical contact of the gimbal when the gimbal is rotated relative to the interface. The second sensor may be a switch that is moved when the gimbal is rotated relative to the interface. For instance, a knob on a cap may move a sliding switch on an internal assembly of the interface.

In some embodiments, the interface may be configured to permit the gimbal to rotate only after the gimbal slides into the interface. The interface may be configured to permit the gimbal to rotate only after the first sensor detects that the gimbal is at least partially connected to the interface. The interface may permit the gimbal to make the second movement only after the first movement is completed. Although two movements are provided by way of example, any other number of movements may be provided to connect the gimbal to an interface.

Figure 33:
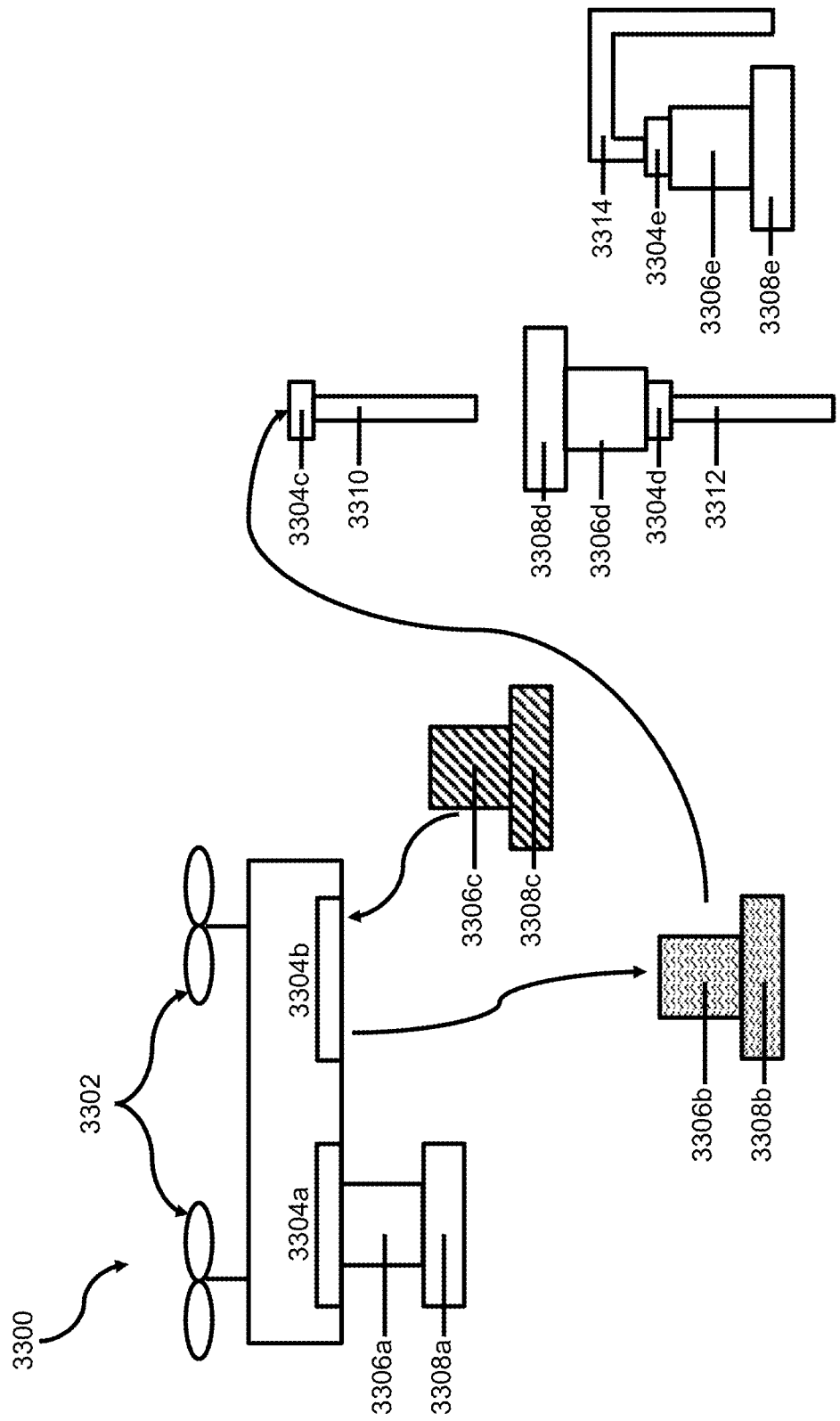
FIG. 33 shows examples of how gimbals may be attached and detached from a multi-gimbal UAV and used with various types of base supports, in accordance with embodiments of the disclosure.

FIG. 33 shows examples of how gimbals may be attached and detached from a multi-gimbal UAV and used with various types of base supports, in accordance with embodiments of the disclosure. For example, a UAV 3300 may comprise a plurality of interfaces 3304*a*, 3304*b* which may permit the UAV to accept multiple gimbals. The UAV may comprise one or more propulsion units 3302 that may permit flight of the UAV. In some embodiments, the interfaces may have any of the characteristics as described elsewhere herein. The interfaces may form a platform having any of the characteristics as described elsewhere herein.

A first gimbal 3306*a* and associated payload 3308*a* may be coupled with a first interface 3304*a*. The first gimbal may be releasably coupled with the first interface. In some instances, a second gimbal 3306*b* and associated payload 3308*b* may be coupled with a second interface 3304*b*. The second gimbal may be releasably coupled with the second interface. When both interfaces have gimbals coupled thereto, the UAV may be carrying multiple gimbals. The second gimbal may be detached from the second interface as illustrated. The UAV may have any number of interfaces configured to couple with one or more gimbals. Each interface may be configured to releasably couple with a corresponding gimbal, which may support a corresponding payload. The interfaces may be disposed anywhere on the UAV. In some embodiments, the interfaces for the gimbals may be disposed on the same side of the UAV as one another.

A third gimbal 3306*c* which may be associated with a third payload 3308*c* may be attached to the second interface. The second gimbal may be swapped out for the third gimbal. The second gimbal and third gimbals may be of the same type or may be of different types. The first and second gimbals may be of the same type or may be of different types. The first and third gimbals may be of the same type or may be of different types. In one example, the second and third gimbals may be of different types. They may be swapped out to provide different functionality for the UAV. For instance, if the second gimbal supports a visible light camera, but a need arises for thermal imaging, a third gimbal supporting an infrared camera may be swapped in for the second gimbal. By supporting multiple gimbals, the UAV may advantageously provide a higher degree of flexibility. Having a single gimbal that may be swappable may provide some flexibility to the functionality of the UAV. Having multiple gimbals that may each be swappable may provide additional degrees of flexibility to the functionality of the UAV. Various combinations of different gimbals may be employed to meet different situations. Sometimes, the combination of gimbals may be selected to complement one another. For instance, the functioning of a payload of a first gimbal may improve or enhance the performance of a payload of a second gimbal. For example, if a second gimbal carries a visible light camera, the payload of the first gimbal may include a light source that may extend the visual range of the visible light camera.

The gimbals that may be attached and/or detached from the UAV interfaces may also couple to other types of base supports. Other types of base supports may include, but are not limited to, various types of handheld supports, other types of vehicles, wearable objects, and/or objects carried by vehicles. For example various handheld supports 3310, 3312, 3314 may be illustrated. The various handheld supports may have corresponding interfaces 3304c, 3304d, 3304e. The interfaces of the handheld supports or any other type of base supports may have any characteristics of the coupling assemblies as described elsewhere herein. The interfaces of the handheld supports or any other type of base supports may have any characteristics of the interfaces of the UAV as described elsewhere herein. In one example, a gimbal 3306b may be detached from an interface 3304b of a UAV and may be attached to an interface 3304c of a handheld support. A gimbal may be detached from a handheld support and attached to an interface of the UAV. A gimbal may be detached from an interface of a first UAV and may be attached to an interface of a second UAV. A gimbal may be detached from a first interface of a UAV and may be attached to a second interface of the same UAV. A gimbal may be detached from a first handheld support member and may be attached to a second handheld support member. The first and second handheld support members may be of different types. A gimbal may be detached from a first type of base support and may be attached to a second type of base support.

Different types of base supports may have different characteristics. For example, different types of base supports may have different functionalities and/or different modes of propulsion, if any. For instance, a first type of base support may be self-propelled while a second type of base support may require human handling, or movement by a separate vehicle. In another example, the different types of base supports may be operated in different parts of the environment. For instance, a first type of base support may be primarily used in the air, while a second type of base support may be primarily used on land, while another type of base support may be primarily used in or under the water. Different types of base supports may be used for primarily different functions. For instance, a first type of base support may be used for aerial surveillance and/or photography while a second type of base support may be used for land-bound data collection.

When a gimbal is initially attached to an interface of a base support, a mechanical and/or electrical connection may be formed. In some embodiments, an initialization process may occur. The initialization process may include the conveyance of power from the base support to the gimbal and/or from the gimbal to the base support. In one example, when the gimbal is physically attached to the base support, power may automatically flow from the base support to the gimbal. In some instances, the power may flow from the base support to the gimbal upon confirmation that the gimbal is securely locked to the base support. In some instances, power may not flow, even if there is a partial connection, until confirmation is received that the gimbal is securely locked.

The initialization process may also include initial communications between the gimbal and the base support. For example, the gimbal may provide initial information about the gimbal to the base support. The initial information about the gimbal may include an indication of the gimbal type. An indication of a gimbal type may include, but is not limited to, a gimbal brand, model, gimbal specs (size, weight, number of axes, orientation of axes, power consumption), and/or payload specs (payload type (e.g., visible light camera, thermal camera, microphone, light emitter, sound emitter, robotic arm, etc.), payload size, payload weight, payload functions and characteristics—i.e., zoom, filters, modes, focus). Initial information about the gimbals may include a number of gimbals. The gimbal may send information about the gimbal identity. Gimbals may or may not have a unique identity independent of gimbal type. In some instances, gimbals may have a hardware encoded with information about the gimbal, such as gimbal type. For example, a gimbal may comprise a field-programmable gate array (FPGA) that may be encoded with information about the gimbal, such as gimbal type (e.g., brand, model). The hardware may be a chip or integrated circuit (IC) that may be encoded with information about the gimbal. The gimbal may provide initial information about the gimbal automatically when power is conveyed between the base support and the gimbal. For instance, in response to receiving power from the base support, the gimbal may provide initial information about the gimbal to the base support. The gimbal may automatically push the information. In other examples, the gimbal may provide the initial information about the gimbal in response to a query from the base support. The base support may automatically send a query to the gimbal when power is provided between the base support and gimbal. For instance, in response to providing power to the gimbal, the base support may provide a query to the gimbal. The gimbal may respond to the query by providing initial information about the gimbal. The base support may use information provided by the gimbal to generate instructions for operation of the gimbal and/or payload. The base support may use information provided by the gimbal to generate instructions for operation of the base support (e.g., instructions sent to propulsion units of a UAV may depend on the information about the gimbal).

Any description herein of the gimbal providing initial information may also apply to a payload providing initial information. Any description herein of the gimbal may refer to the gimbal alone, payload alone, or the combination of the gimbal and payload. The payload may be considered to be part of the gimbal. The payload may receive power from the base support. The payload may receive power directly from the base support or indirectly through the gimbal. For instance, the base support may provide power to the gimbal which may provide power to the payload. The payload may provide initial information about the payload to the base support. The payload may provide initial information about the payload directly to the base support or indirectly through the gimbal. The initial information about the payload may include payload type. The payload may optionally comprise hardware encoded with information about the payload type. For instance, the payload may comprise an FPGA encoded with information about the payload type (e.g., brand, model). The payload may provide initial information about the payload automatically when power is conveyed between the base support and the payload (optionally via the gimbal).

For instance, in response to receiving power from the base support, the payload may provide initial information about the payload to the base support. In other examples, the payload may provide the initial information about the payload in response to a query from the base support. The base support may automatically send a query to the payload when power is provided between the base support and payload. For instance, in response to providing power to the payload, the base support may provide a query to the payload. The payload may respond to the query by providing initial information about the payload. The base support may use information provided by the payload to generate instructions for operation of the payload. The base support may use information provided by the payload to generate instructions for operation of the base support (e.g., instructions sent to propulsion units of a UAV may depend on the information about the payload).

Initial information about the gimbal and/or payload may remain on-board the base support or may be transmitted to one or more remote controllers. The initial information about the gimbal and/or payload may be displayed. The display may be on-board the base support or may be remote to the base support. The display may be on-board one or more remote controllers. For instance, a gimbal type (e.g., gimbal model, brand, etc.) may be displayed on a screen that may be viewable by a user. Thus, the user may receive confirmation about the type of gimbal or gimbals that are employed by the base support. The user may receive confirmation that the gimbal or gimbals are securely coupled with the base support.

In another example, the initial communications may include communications from the base support. The initial information about the base support may include an indication of the base support type. An indication of a base support type may include, but is not limited to, a base support brand, model, mode of propulsion if any, environment of operation, base support specs (size, weight, power consumption, available power level). The base support may send information about the base support identity. Base supports may or may not have a unique identity independent of base support type. In some instances, base supports may have a hardware encoded with information about the base support, such as base support type. For example, a base support may comprise a field-programmable gate array (FPGA) that may be encoded with information about the base support, such as base support type (e.g., brand, model). The base support may provide initial information about the base support automatically when power is conveyed between the base support and the gimbal (e.g., gimbal alone, payload alone, or both gimbal and the payload together). For instance, in response to sending power to the gimbal, the base support may provide initial information about the base support to the gimbal. In other examples, the base support may provide the initial information about the base support in response to a query from the gimbal. The gimbal may automatically send a query to the base support when power is provided between the base support and gimbal. For instance, in response to receiving power from the base support, the gimbal may provide a query to the base support. The base support may respond to the query by providing initial information about the base support. The gimbal may use information provided by the gimbal to generate and/or modify instructions for operation of the gimbal and/or payload.

During initialization, the gimbals may move to a 'start' position. The gimbals may automatically move to a start position upon power being conveyed between the base support and the gimbal. For instance, in response to receiving power from the base support, the gimbals may automatically move to the start position, regardless of what position they were in beforehand. In the start position, the gimbals may be facing the same direction. For instance, the payloads may be facing the same direction. The primary axes of the payloads may be parallel in the start position. In one example, the gimbals and/or payloads may face forward in the start position. The primary axes may be parallel to a roll direction of the base support in the start position. The gimbals may move directly to the start position. Alternatively, they may move in various directions before settling at the start position. In some embodiments, during initialization, a calibration process may occur. The gimbals may move in various directions to allow the system to automatically calibrate motions of the gimbals with the base support.

During initialization and/or throughout operation of the gimbals, positional information may be exchanged between the base support and/or gimbal. For instance, the base support may move relative to an environment. Information about how the base support is moving relative to the environment may include geo-spatial information (e.g., along one, two or three axes) relative to the environment, orientation (e.g., about one, two, or three axes) relative to the environment, linear velocity relative to the environment, angular velocity relative to the environment, linear acceleration relative to the environment, angular acceleration relative to the environment, and/or heading.

Information about how the base support is moving relative to the environment may optionally be transmitted to gimbal. The gimbal may include one or more on-board processors that may analyze the information about how the base support is moving in the environment. The one or more gimbal processors may generate instructions that control operation of the gimbal and/or modify instructions from the base support based on the information about how the base support is moving. Alternatively, the information about how the base support is moving may be analyzed using a controller on-board the base support. The controller may then generate instructions to control operation of the base support based on the information of how the base support is moving. In one example, passive control may be provided which may allow the gimbal to stabilize the payload with respect to the environment. The gimbal may counteract motions by the movable object with respect to the environment. Alternatively or in addition, active controls may be provided directly to the gimbal from a remote controller or from the base support that may adjust a desired orientation of the payload.

The positional information may include how the payload is oriented relative to the environment or relative to the base support. The positional information may include information of how each frame component of the gimbal is oriented relative to one another, relative to the base support, and/or relative to the environment. Movement information (e.g., linear velocity, angular velocity, linear acceleration, and/or angular acceleration) may also be provided. The gimbal/payload positional information may be provided to the base support.

In some embodiments, the base support and the gimbal/payload may move in accordance with their respective coordinate systems. In some instances, a base support may have a coordinate system relative to the base support. The gimbal/payload may have a coordinate system relative to the payload. The payload coordinate system may move relative to the base support. An environmental coordinate system may be provided. The environment may provide an inertial reference frame. The base support coordinate system and/or the payload coordinate systems may move relative to the environmental coordinate systems. The positional information of the base support may be provided relative to the base support coordinate system and/or may be converted to a reference coordinate system, such as the environmental coordinate system. The positional information of the payload may be provided relative to the coordinate system and/or the support coordinate system. The payload coordinate system may be converted to the base support coordinate system. The positional information of the payload may be provided relative to a reference coordinate system, such as the environmental coordinate system. The use of the various coordinate systems may aid in the stabilization of the payload, even when the base support is moving about an environment. The use of the various coordinate systems may aid in active control of the orientation of the payload relative to the environment.

In some embodiments, when a gimbal is transferred from one type of base support to another type of base support, different types of controls may be provided to the gimbal. Different base supports may make different movements, which may cause the gimbals to employ various controls to respond to the different movements. For example, some base supports may tend to vibrate more than others. Some base supports have motions of higher frequency while other base supports may have motions of lower frequency. Some base supports may tend to move more vertically than others. Some base supports may tend to adjust positions more quickly than others. Some base supports may engage more in roll motions than others. The different types of motions by the base supports may affect how the payloads are stabilized. Different controls may be provided by different types of base supports that may take into account the types of motions performed by the base support. In some instances, the same types of controls may be provided, but the gimbal may maintain or modify the commands from the base support depending on the base support type. In some embodiments, depending on the base support type communicated by the base support to the gimbal, the gimbal may maintain or modify controls to the gimbal and/or payload to produce a desired effect. In some embodiments, gimbals supported by a UAV flying within an environment may use different controls than gimbals on a handheld support carried by a human.

Different base supports may have interfaces that may provide different orientations of the gimbals. For example, for a UAV 3300, the interfaces 3304a, 3304b may be positioned to cause the gimbals to be hanging downward from the body of the UAV. Handheld base supports may have interfaces 3304e that can cause the gimbal to also hang downward, similar to the UAV, or may have interfaces 3304c, 3304d that may cause the gimbal to be supported upward. The different orientation of the gimbal relative to the base support may affect how the payloads are stabilized. Different controls may be provided by different types of base supports that may take into account the gimbal orientation relative to the base support. In some instances, the same types of controls may be provided, but the gimbal may maintain or modify the commands from the base support depending on the base support type. In some embodiments, depending on the base support type communicated by the base support to the gimbal, the gimbal may maintain or modify controls to the gimbal and/or payload to produce a desired effect. In some embodiments, gimbals hanging down from a base support may use different controls compared to gimbals supported upwards from the base support.

In some instances, different base supports may be primarily used for different functions, which may result in different preferred types of gimbal controls. For instance, UAVs may use gimbals with their payloads for aerial operations. Handheld supports may use gimbals with their payloads for land-based operations. Different controls may be desirable for land-based versus aerial operations. A typical target to be detected by the payloads may have a different relationship relative to the base supports for the different types of base supports. For instance, a base support in the air may view a target from a different angle than a base support on land. A base support in the air may be typically further from the target than a base support on land, although the distances may vary. A base support on a vehicle may cover larger distances more quickly than a base support held by a human. In some embodiments, some base supports may be used more for tracking a target and may be controlled with respect to the target (e.g., target coordinate system), while other base supports are not used to track specific targets but are used for general data collection and may be controlled with respect to the environment (e.g., environmental coordinate system). A target may optionally be a moving target. The target may move with respect to the environment. These differences may affect how the payloads are stabilized. Different controls may be provided by different types of base supports that may take into account the various functions of the base supports. In some instances, the same types of controls may be provided, but the gimbal may maintain or modify the commands from the base support depending on the base support type. In some embodiments, depending on the base support type communicated by the base support to the gimbal, the gimbal may maintain or modify controls to the gimbal and/or payload to produce a desired effect. In some embodiments, gimbals on different types of base supports with different functions may have different sets of controls.

As previously described, a movable object, such as a UAV, may support multiple gimbals. Multiple gimbal interfaces may be provided. As each gimbal is attached, initialization processes may occur and/or information may be exchanged between the movable object and the gimbal (e.g., gimbal and/or payload). Depending on the gimbal identity and/or type, the UAV may make different accommodations. For instance, a controller of a UAV may generate a first set of controls to be sent to a first gimbal and a second set of controls to be sent to a second gimbal. The first set of controls and second set of controls may be different when the first gimbal and second gimbal are different. This may be true in the independent mode and/or in the simultaneous mode. Different accommodations may be made for different gimbal types. The controller of the UAV may be able to generate instructions that are specific to the gimbal types. Thus, when multiple gimbals are attached, the UAV may tailor the instructions to each gimbal based on gimbal type.

Figure 16:
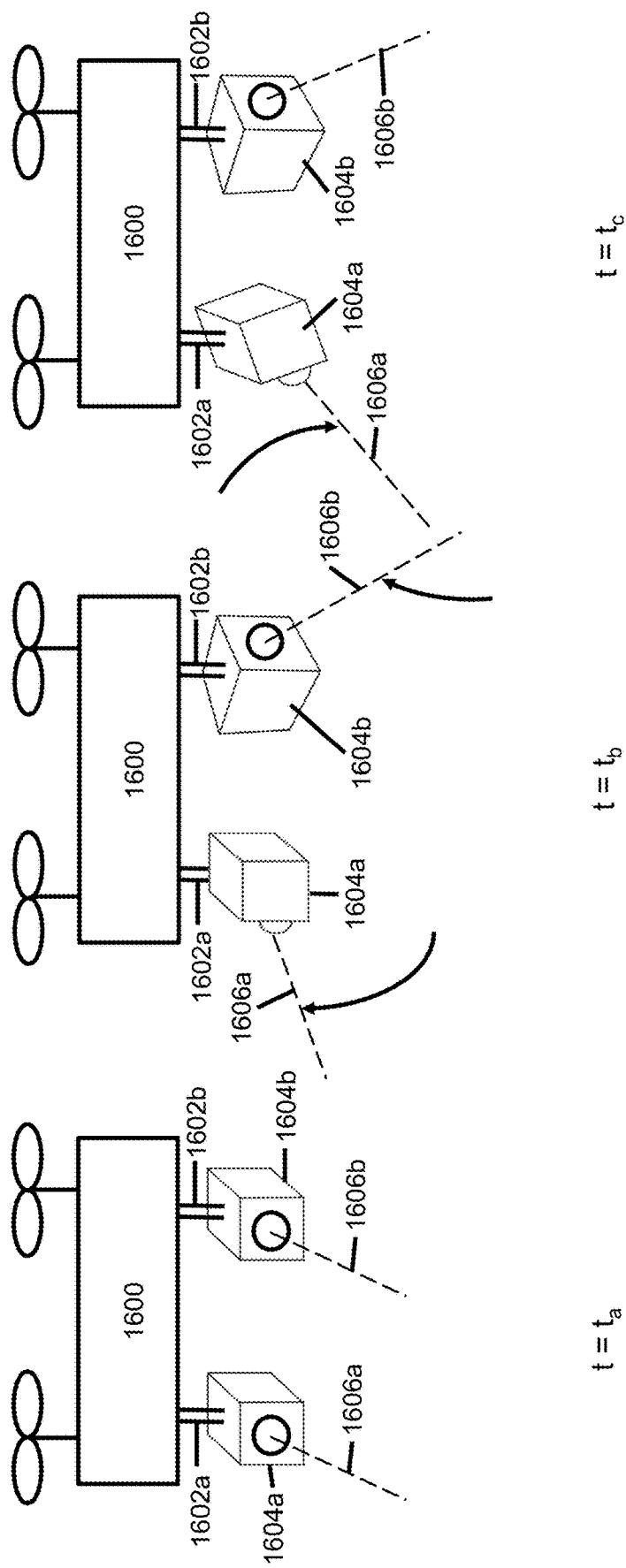
FIG. 16 shows an illustration of operating in an independent mode, in accordance with embodiments of the disclosure.

FIG. 16 shows an illustration of operating in an independent mode, in accordance with embodiments of the disclosure. A movable object 1600 may comprise a plurality of gimbals 1602a, 1602b which support a plurality of payloads 1604a, 1604b. The payloads may have a primary axis 1606a, 1606b.

A movable object 1600, such as a UAV, may carry a plurality of gimbals 1602a, 1602b. Each gimbal may support one or more payloads 1604a, 1604b. Each gimbal may support a respective payload. The gimbal may control spatial disposition of the payload. The spatial disposition of the payload may be controlled with respect to one axis, two axes, or three axes. The payload may be moved or stabilized with respect to one axis, two axes, or three axes. Each gimbal may control spatial disposition of its respective payload with respect to the same number of axes or same types of axes, or different gimbals may control spatial disposition with respect to different numbers of axes or different types of axes. The spatial disposition of the payload may be controlled by varying or maintaining its orientation about one, two, or three axes. The spatial disposition of the payload may be controlled by varying or maintaining its orientation relative to the movable object.

Each payload 1604a, 1604b may have a primary axis 1606a, 1606b. When the payload is a sensor, the primary axis may be a primary axis through which the payload may sense the environment. The primary axis may represent a center of a data collection region for the payload. In one example, the payload may be an imaging device (e.g., visible light imaging device, thermal imaging device, ultraviolet imaging device, night-vision imaging device, lidar imaging device, radar imaging device, ultrasonic imaging device) that may generate images of the environment based on detected signals in the environment. The primary axis may be an optical axis of the imaging device. If the payload has a lens, the primary axis may be the optical axis of the lens.

When the movable object comprises gimbals operating in an independent mode, the gimbals may be independently controlled. For example, the first gimbal may be moved without moving the second gimbal, or the second gimbal may be moved without moving the first gimbal. The first and second gimbals may be moved simultaneously. The gimbals may be moved simultaneously without being required to move in the same manner. The gimbals may be moved at the same time in different manners. In some instances, for a portion the time, the gimbals may happen to be controlled in the same manner by chance, but are not required to move in the same manner.

At $t=t_a$, the gimbals 1602a, 1602b may happen to be directed in the same direction. The primary axis 1606a of the first payload 1604a and the primary axis 1606b of the second payload 1604b, may happen to be parallel to one another. The primary axes of the respective payloads may be parallel to one another when the respective payloads are facing the same direction. When the payloads are facing the same direction, the gimbals may have the same position. The gimbals may be described as facing the same direction when the payloads are facing the same direction.

At $t=t_b$, the illustrations show how both gimbals 1602a, 1602b may move. They may move independently of one another. They may move in different manners. They may move to face in different direction. For example, the primary axis 1606a of the first payload 1604a and the primary axis 1606b of the second payload 1604b, may no longer be parallel to one another. The first payload may rotate so that the primary axis is facing toward the right of the movable object. The second payload may rotate so that the primary axis is facing toward the left of the movable object. As shown, the gimbals may move at the same time. The first gimbal may be in motion while the second gimbal is moving, and vice versa.

At $t=t_c$, the illustrations show how one of the gimbals 1602a may move. The gimbals may move independently of one another. In some instances, one of the gimbals may be moving while another gimbal is stationary. Over time, both gimbals may be moving, neither gimbal may be moving, and/or one of the gimbals may be moving while another gimbal is stationary. The primary axis 1606a of the first payload 1604a may rotate as depicted downwards, while the primary axis 1606b of the second payload 1604b may remain in the same direction.

During an independent control mode, instructions may be received by the movable object for the control of any of the plurality of gimbals. For instance, a communication unit of the movable object may receive commands to control one or more selected gimbals from the plurality of gimbals. The movable object may make a determination as to which gimbal or gimbals of the plurality of gimbals is to receive the commands. The movable object may comprise one or more processors that generate commands that are delivered to the selected one or more gimbals. The commands may include a designation of the selected gimbal or gimbals, and instructions for controlling operation of the selected gimbal. The designation may be a header, as described elsewhere herein. The commands may be conveyed to the selected gimbal or gimbals and not to other gimbals. The commands may be conveyed with aid of the designation of the selected gimbal or gimbals. The commands may be conveyed with aid of a communication bus, such as a CAN bus.

While operating in an independent mode, the movable object may not restrict which gimbals receive commands or when the commands are conveyed. The movable object may freely receive commands for any of the plurality of gimbals. The movable object may receive commands for the gimbals while in operation (e.g., in flight). The instructions for operating each of the gimbals may be conveyed in substantially real-time of receipt (e.g., within less than 3 seconds, 2 seconds, 1 second, 0.5 seconds, 0.1 seconds, 0.05 seconds, 0.01 seconds, 0.005 seconds, or 0.001 seconds of receipt). The commands for each of the gimbals need not be the same.

Figure 17:
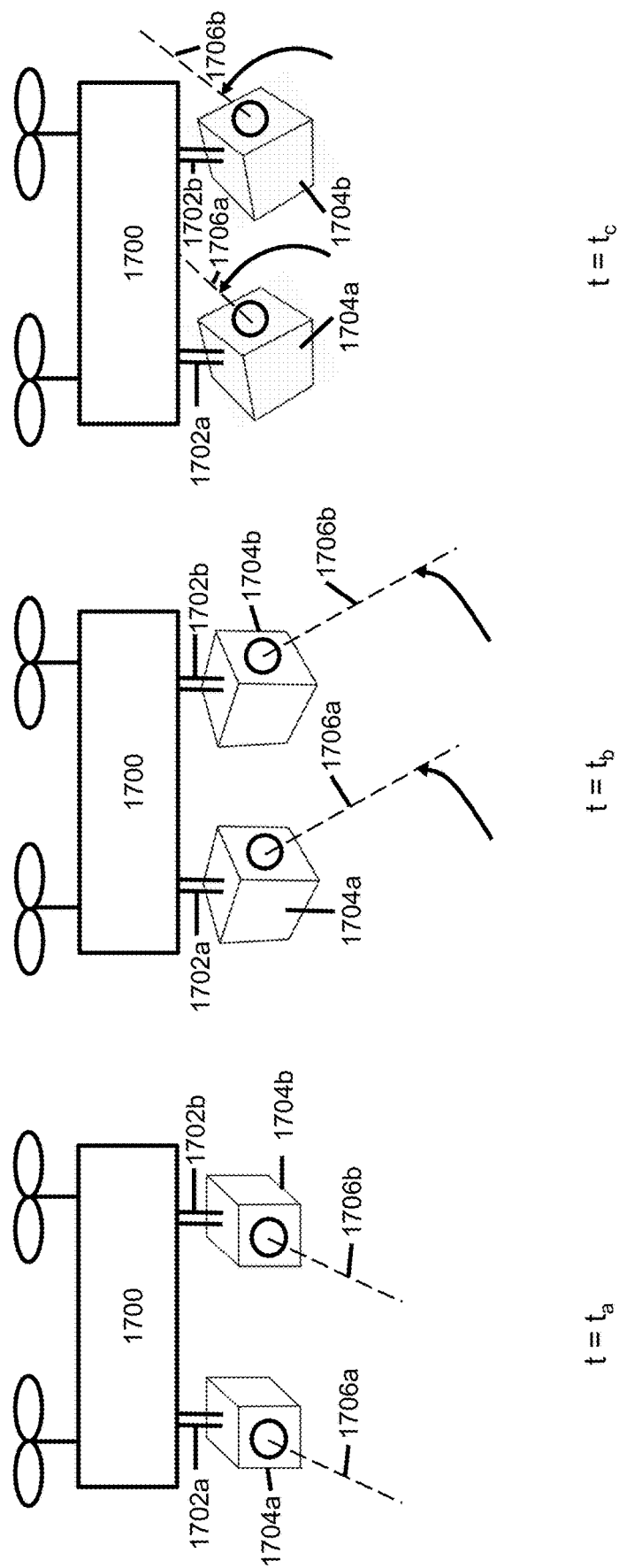
FIG. 17 shows an illustration of operating in a simultaneous mode, in accordance with embodiments of the disclosure.

FIG. 17 shows an illustration of operating in a simultaneous mode, in accordance with embodiments of the disclosure. A movable object 1700 may comprise a plurality of gimbals 1702a, 1702b which support a plurality of payloads 1704a, 1704b. The payloads may have a primary axis 1706a, 1706b.

A movable object 1700, such as a UAV, may carry a plurality of gimbals 1702a, 1702b. Each gimbal may support one or more payloads 1704a, 1704b. Each gimbal may support a respective payload. The gimbal may control spatial disposition of the payload. The spatial disposition of the payload may be controlled with respect to one axis, two axes, or three axes. The payload may be moved or stabilized with respect to one axis, two axes, or three axes. Each gimbal may control spatial disposition of its respective payload with respect to the same number of axes or same types of axes, or different gimbals may control spatial disposition with respect to different numbers of axes or different types of axes. The spatial disposition of the payload may be controlled by varying or maintaining its orientation about one, two, or three axes. The spatial disposition of the payload may be controlled by varying or maintaining its orientation relative to the movable object.

Each payload 1704a, 1704b may have a primary axis 1706a, 1706b. When the payload is a sensor, the primary axis may be a primary axis through which the payload may sense the environment. The primary axis may represent a center of a data collection region for the payload. In one example, the payload may be an imaging device (e.g., visible light imaging device, thermal imaging device, ultraviolet imaging device, night-vision imaging device, lidar imaging device, radar imaging device, ultrasonic imaging device) that may generate images of the environment based on detected signals in the environment. The primary axis may be an optical axis of the imaging device. If the payload has a lens, the primary axis may be the optical axis of the lens.

When the movable object comprises gimbals operating in a simultaneous mode, the gimbals may move together in a synchronized manner. For example, each of the gimbals may rotate along the same axes by the same amount. Each of the gimbals may rotate at the same angular speed and/or acceleration. The primary axes of the payloads may be parallel to one another. The primary axes of the payloads may remain parallel to one another as the plurality of gimbals move. The primary axes of the payloads may be parallel to one another when the gimbals are not moving. The payloads may remain facing in the same direction when moving or not moving. Each of the gimbals may be moving, or none of the gimbals may be moving. When operating in simultaneous mode, there may be no activity by a single gimbal that is not substantially mirrored by another gimbal.

At $t=t_a$, the gimbals 1702a, 1702b may be directed in the same direction. The primary axis 1706a of the first payload 1704a and the primary axis 1706b of the second payload 1704b, may be parallel to one another. The primary axes of the respective payloads may be parallel to one another when the respective payloads are facing the same direction. When the payloads are facing the same direction, the gimbals may have the same position. The gimbals may be described as facing the same direction when the payloads are facing the same direction. In some embodiments, when the movable object enters a simultaneous mode, the gimbals may be initialized so that they are facing in the same direction. In some instances, the gimbals may be initialized so that they are facing toward the front of the UAV. Even if the gimbals were previously operating in independent mode and not necessarily facing in the same direction, the gimbals may be brought to face the same direction when transitioned to operating in a simultaneous mode.

At $t=t_b$, the illustrations show how both gimbals 1702a, 1702b may move together. For example, the primary axis 1706a of the first payload 1704a and the primary axis 1706b of the second payload 1704b, may remain parallel to one another while the gimbals are moving. The first payload may rotate so that the primary axis is facing toward the left of the movable object. The second payload may rotate so that the primary axis is also facing toward the left of the movable object. The movement of the second payload may substantially mirror the movement of the first payload and vice versa. As shown, the gimbals may move at the same time. The first gimbal may be in motion while the second gimbal is moving, and vice versa.

At $t=t_c$, the illustrations further show how both gimbals 1702a, 1702b may move together. For example, the primary axis 1706a of the first payload 1704a and the primary axis 1706b of the second payload 1704b, may remain parallel to one another while the gimbals are moving. The first payload may rotate upwards so that the primary axis is facing upwards. The second payload may rotate upwards so that the primary axis is also facing upwards. The movement of the second payload may substantially mirror the movement of the first payload and vice versa. As shown, the gimbals may move at the same time. The first gimbal may be in motion while the second gimbal is moving, and vice versa.

Any description herein of the synchronized disposition and/or motion of the gimbals, payloads, and/or primary axes may include disposition and/or motion that appears to be synchronized to the naked eye. For instance, the primary axes may be substantially parallel to one another. The primary axes may be substantially parallel when they do not deviate from one another by more than 5 degrees, 3 degrees, 2 degrees, 1 degree, 0.5 degrees, 0.1 degrees, 0.05 degrees, or 0.01 degrees relative to one another. They may be described as being parallel to one another when they do not deviate from one another by any more than any of the degrees mentioned with respect to one axis, two axes, or three axes. In some instances, the deviation may be zero degrees.

The gimbals, payloads, and/or primary axes may move in a substantially synchronized manner. The movement may be substantially synchronized when there is a time delay that is less than or equal to 2 seconds, 1 second, 0.5 seconds, 0.1 seconds, 0.05 seconds, 0.01 seconds, 0.005 seconds, 0.001 seconds, or any other time measurement as described elsewhere herein. The movement may be described as being synchronized when the time delay is less than any of the time measure described herein. In some instances, the time delay may be zero seconds.

When a mode is switched from an independent mode to a simultaneous mode, the plurality of gimbals may be automatically aligned to face in the same direction. In some embodiments, when a simultaneous mode is turned on, the gimbals may default to a 'start' position. When a mode is switched from a simultaneous mode to the independent mode, the plurality of gimbals may or may not automatically align to the face the same direction. When a simultaneous mode is turned off, the gimbals may or may not default to a start position. When gimbals enter an independent mode, the gimbals need not be aligned and may be independently control from their previous orientation.

During a simultaneous control mode, instructions may be received by the movable object for the control of a gimbal. In some instances, the instructions may be received for control of only a single gimbal. In some instances, the single gimbal may be pre-assigned. For instance, the first gimbal (or any gimbal attached to a first interface) may be designated as the master gimbal. The other gimbals of the plurality of gimbals may be slave gimbals. Regardless of the types of controls that are provided from a remote controller, the first gimbal may be the master gimbal and the other gimbals may mirror the activities of the master gimbal.

In other instances, the single gimbal need not be pre-assigned. The movable object may be capable of receiving commands that may be directed to either gimbal. A user may select, at a remote controller, a gimbal to control. The movable object may receive the commands and cause the selected gimbal to execute the commands. The movable object may cause the other gimbals to follow the activities of the selected gimbal. The user may update or alter the user's selection of the selected gimbal. For example, a user may initially select a first gimbal as the selected gimbal. The commands from the user may affect operation of the first gimbal. A second gimbal may automatically mirror the motions of the first gimbal. The user may then select a second gimbal as the second gimbal. The commands from the user may affect operation of the second gimbal. The first gimbal may automatically mirror the motions of the second gimbal. Any non-selected gimbal may automatically mirror the motions of the selected gimbal. Allowing the user to select the selected gimbal may advantageously permit the user to intuitively target the direction of the payloads depending on the data collected by the payloads. For example, As described, the selected gimbal may or may not be pre-assigned. A pre-assigned selected gimbal may be designated by the manufacturer. In some instances, the pre-assigned selected gimbal may not be alterable by the user.

Alternatively, the user may alter the pre-assigned selected gimbal. In some instances, the user may determine a gimbal that may be pre-assigned as a selected gimbal. For instance, a user may wish a default selected gimbal to be the first gimbal. The user may or may not alter the selected gimbal while the movable object is in operation. For instance, while a UAV is in flight, a user may or may not change a designation of a selected gimbal.

In some embodiments, the movable object may be capable of receiving commands that may affect operation of the gimbals simultaneously. However, only the commands to the designated selected gimbal may be executed. The commands to the other gimbals may not be executed. The other gimbals may automatically follow the same actions as the selected gimbal.

In some instances, a communication unit of the movable object may receive commands to control a selected gimbal from the plurality of gimbals. The movable object may automatically designate the selected gimbal to receive the commands. Alternatively, the movable object may make a determination as to which gimbal is the selected gimbal and is to receive the commands. The movable object may comprise one or more processors that generate commands that are delivered to the selected gimbal. The commands may or may not include a designation of the selected gimbal, and may include instructions for controlling operation of the selected gimbal. The designation may be a header, as described elsewhere herein.

The commands may be conveyed to the selected gimbal and to the other gimbals of the plurality of gimbals. Each of the gimbals of the plurality of gimbals may receive the same set of instructions for operating the gimbals. The gimbals may all execute the same set of instructions together to produce synchronized activity. In some instances, the remote controller may just send a single set of instructions with a designation that the simultaneous mode is turned on. The movable object may make the determination that the commands need to be conveyed to each of the gimbals. The movable object may make the determination based on the designation that the simultaneous mode is turned on. In other instances, the remote controller may make the determination that the simultaneous mode is turned on. The remote controller may send sets of parallel commands for each of the gimbals. The movable object need not be aware of which mode that the movable object is operating, and may just automatically convey the same instructions to each of the gimbals, similar to how it would convey instructions during an independent mode.

Alternatively, the commands may be conveyed to the selected gimbal and not to the other gimbals of the plurality of gimbals. As previously described, the selected gimbal may be pre-assigned and may be a default. For example, the second gimbal may always be the selected gimbal. A designation of the identity of the selected gimbal may or may not be required in this case. Alternatively or in addition, as described, the selected gimbal may change or be updated during operation of the movable object. A designation of the identity of the selected gimbal may be used in this case.

The commands may be conveyed to the selected gimbal. The commands may be conveyed with aid of a communication bus, such as a CAN bus. The selected gimbal may perform in accordance with the commands. In some instances, feedback may be provided about the activity of the selected gimbal. Based on the activity of the gimbal, commands may be generated and sent to the other non-selected gimbals. The commands sent to the non-selected gimbals may be to mirror the detected activity of the selected gimbal.

While operating in a simultaneous mode, the movable object may or may not restrict which gimbals receive commands or when the commands are conveyed. The movable object may freely receive commands for any of the plurality of gimbals. Alternatively, the movable object may receive commands only for a pre-designated selected gimbal. The movable object may receive commands for the gimbals while in operation (e.g., in flight). The instructions for operating each of the gimbals may be conveyed in substantially real-time of receipt (e.g., within less than 3 seconds, 2 seconds, 1 second, 0.5 seconds, 0.1 seconds, 0.05 seconds, 0.01 seconds, 0.005 seconds, or 0.001 seconds of receipt). The commands for each of the gimbals need not be the same.

A UAV may be controlled with aid of one or more remote controllers. In some embodiments, a single remote controller may control flight of the UAV and operation of the plurality of gimbals of the UAV. In some embodiments, multiple remote controllers (e.g., two remote controllers, three remote controllers, four remote controllers, or more) may collectively control flight of the UAV and operation of the plurality of gimbals. In one example, a first remote controller may control flight of the UAV while a second remote controller controls operation of the plurality of gimbals. In another example, a first remote controller may control flight of the UAV and operation of a first gimbal while a second remote controller controls operation of a second gimbal. In some embodiments, a first remote controller may control flight of the UAV while a second remote controller controls operation of at least one of the plurality of gimbals. The first remote controller may or may not control operation of any of the plurality of gimbals.

Any description herein of controlling operation of the gimbals may also apply to controlling operation of the payloads of the gimbals, and vice versa. For instance, when operating in simultaneous mode, the payloads may also operate in a synchronized manner. For instance, both payloads may zoom by the same amount or may change lighting settings in the same manner. When operating in an independent mode, the payloads may operate independently. For instance, one payload may zoom by a first amount while another payload may not zoom. Any description herein of a control of a gimbal may include control of the gimbal itself and/or control of the payload supported by the gimbal.

Figure 18:
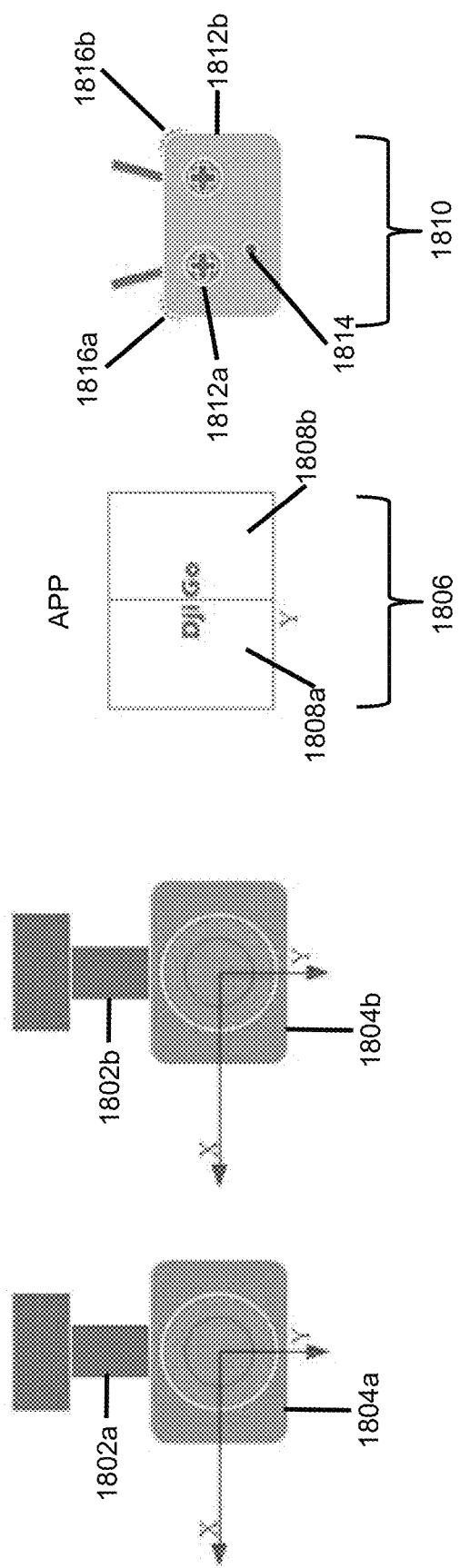
FIG. 18 shows a single remote controller controlling operation of a movable object and/or multiple gimbals, in accordance with embodiments of the disclosure.

FIG. 18 shows a single remote controller controlling operation of a movable object and/or multiple gimbals, in accordance with embodiments of the disclosure. A movable object may carry a first gimbal 1802a supporting a first payload 1804a and a second gimbal 1802b supporting a second payload 1804b. A remote controller 1810 may be used to control operation of the first and second gimbals. The remote controller may also be used to control movement of the movable object (e.g., flight). The remote controller may be used to control any operation of the movable object (e.g., movement, communications, power, flight modes, auto-returns, etc.).

The remote controller 1810 may comprise any number of user interactive devices that may aid in the control of the multiple gimbals and/or operation of the movable object. For instance, remote controller may comprise one or more of the following: joysticks or d-pads 1812a, 1812b, buttons 1814, dials 1816a, 1816b, keys, touchpads, touchscreens, trackballs, inertial sensors, thermal sensors, microphones, cameras or any other interactive device that may allow a user to interact with the remote controller. The user may touch a user interactive device to control the multiple gimbals and/or operation of the movable object. The user may speak to the user interactive device to control the multiple gimbals and/or operation of the movable object. The user may shake or tilt the user interactive device to control the multiple gimbals and/or operation of the movable object. The user may make any gestures or facial expressions to control the multiple gimbals and/or operation of the movable object.

In one example, a user may interact with a user interactive device of the remote controller to indicate an operational mode for gimbal control. For instance, the user may provide an input to indicate whether the movable object is operating in an independent mode or a simultaneous mode for control of the gimbals. A user may switch between an independent mode and a simultaneous mode by providing a user input via a control interface that is remote to the movable object. The control interface may be on a single remote controller or may be provided on multiple remote controllers. The control interface may be provided on a device that is running an application. In some instances, only one of the remote controllers may accept an instruction to switch modes. Alternatively, any of multiple remote controllers may accept an instruction to switch modes. In some instances, a control interface may be on-board a first remote controller or on-board a second remote controller. A user may interact with the remote controller in any manner to indicate the mode. For instance, the user may press a button to switch between an independent mode and simultaneous mode. In another example, the user may toggle a joystick or turn a dial or knob to switch between an independent mode and a simultaneous mode. The user may touch a portion of a touchscreen to switch between an independent mode and a simultaneous mode. The user may touch an icon or other visual representation on the touchscreen to switch between an independent mode and a simultaneous mode. A user may interact with a control interface to control the modes. A user may interact with an operating member to switch modes. The operating member may be a button, wheel, dial, joystick, rod, key, slider, trackball, touchpad, or any other type of user interactive interface that may allow the user to switch between the modes. In some instances, a control interface may be a portion of a touchscreen on a remote controller or other device.

A user may interact with a user interactive device of the remote controller to control operation of the multiple gimbals. For example, a user may use one or more controls (e.g., joysticks, d-pad, dials, etc.) 1812*a*, 1812*b*, 1816*a*, 1816*b* to control operation of a first gimbal. The user may toggle to another setting by interacting with another user interactive device (e.g., pressing a functional key 1814). For instance, the user may select a functional key to use the one or more controls to control operation of the second gimbal. The same controls may be used to control operation of the first gimbal and the second gimbal at different times. The user may toggle between controlling the first gimbal and controlling the second gimbal by pressing the functional key.

In some embodiments, if the user presses the functional key again, the controls may control both the first gimbal and the second gimbal. This may bring the gimbals into simultaneous operation mode. The same set of controls that may have been used to independently the first gimbal and the second gimbal, may be used to control the first and second gimbal together in a simultaneous mode.

Optionally, if the user presses the functional key again, the controls may be used to control operation of the movable object. For instance, the controls may be used to control flight of the movable object. The same set of controls that may be used to control the gimbals may be used to control movement of the movable object. Alternatively, different controls may be used to control the gimbals and the movement of the movable object. In some embodiments, pressing the functional key may allow changing between controlling the gimbals and controlling the movable object. Alternatively, different user interactive devices may be used to change between controlling the movable object and the gimbals.

Any description herein of a functional key may be employed by any other user interactive device. For example, a binary or multi-way switch may be provided that may be provided to allow a user to select which gimbal and/or how many gimbals to control using the controller and/or whether to control operation of the movable object.

In some embodiments, the single remote controller may be capable of controlling the movable object and gimbals at the same time. Alternatively, the single remote controller may be capable of controlling only one of the movable object or the gimbals at the same time.

Optionally, an application 1806 may be used to control operation of the gimbals and/or the movable object. The application may be integral to the remote controller 1810. For instances, the remote controller may include a display, such as a touchscreen, that may show a user interface for the application. In another example, the application may be operating on a device separate from the remote controller. The separate device may be physically connected to the remote controller, in electrical communication with the remote controller, physically and electrically from the remote controller, or capable of performing the functions of the remote controller without requiring the presence of a remote controller. In some embodiments, a device running the application may control the movable object and/or gimbals alone. Alternatively a device running the application and a remote controller may collectively control the movable objects and/or gimbals. In some instances, a device running the application may control the gimbals while the remote controller may control movement of the movable object. The device running the application may be a remote controller.

The application may split a display (e.g., screen, such as touchscreen) into a plurality of regions 1808*a*, 1808*b*. Each region may display data associated with a respective gimbal (which may include the gimbal alone or the gimbal and/or payload). For example, a first region 1808*a* may display data associated with a first gimbal 1802*a*, 1804*a*, and a second region 1808*b* may display data associated with a second gimbal 1802*b*, 1804*b*. Data associated with a gimbal may comprise data collected by a payload supported by the gimbal. Data collected by a payload of the gimbal may comprise image data. For instance, the payload may be capable of capturing image data of the environment—the image may be a visual representation of the environment captured by the respective payload. For example, the image may be a visual image of the environment captured by a visible light camera. In another example, the image may be a thermal image of the environment captured by an infrared camera. In other embodiments, data associated with the gimbal may comprise state data of the gimbal and/or payload. For instance, orientation of the gimbal and/or payload, information about the gimbal and/or payload type (e.g., model, brand, number, dimensions, axes, type of data collected, etc.), power state of the gimbal and/or payload, and/or error status of the gimbal and/or payload may be displayed.

A user may interact with a region to control a respective gimbal. For example, a user may interact with a first region to control operation of a first gimbal, and a user may interact with a second region to control operation of a second gimbal. Controlling operation of a first gimbal may comprise adjusting an orientation of the first gimbal relative to the movable object. Controlling operation of a second gimbal may comprise adjusting orientation of the second gimbal relative to the movable object. A user can touch the first region to control rotation of a first gimbal and a user can touch the second region to control rotation of a second gimbal. A user can tap and drag the first region to control rotation of a first gimbal and a user can touch and drag the second region to control rotation of the second gimbal.

In some embodiments, the data shown in the regions may be updated as the gimbals are being controlled. The data shown in the regions may be updated in real-time while the payload orientations are changing. The data shown may be reflective of the updated payload orientations while they are changing. For instance, if the payloads are collecting image data, the data may show image data captured by the payloads in real-time while they are changing.

In some embodiments, the direction of rotation by the gimbal may depend on a direction of the dragging motion by a user. The direction of rotation by the gimbal may correlate to a direction of motion by a user. For example, a horizontal dragging motion of the region may cause a corresponding payload to pan left and right. For instance, a user making a dragging motion on a screen right/left may result in controlling an orientation of the gimbal/payload relative to the yaw axis. A vertical dragging motion of the region may cause a corresponding payload to pitch up and down. For instance, a user making a dragging motion on a screen up/down may result in controlling an orientation of the gimbal/payload relative to the pitch axis. A curved motion, or two fingers that rotate around, may cause the payload to rotate about a roll axis. In some embodiments, the speed of rotation by the gimbal may correlate to a speed of motion by a user. For example, a quick motion of the region may cause a corresponding payload to move quickly. A slower motion of the region may cause the corresponding payload to move more slowly. A degree of dragging may correlate to a rotation angle at which an orientation of a corresponding gimbal may be adjusted.

Touching and dragging may be presented as an example of a way for a user to interact with the various regions and user interface to control the gimbals and/or payloads. In some instances, a virtual joystick or other visual representations on a screen may be manipulated for a user to control the joysticks and/or payloads. The user may touch or slide a virtual joystick or track ball, or touch different virtual buttons. The user may manipulate one or more sliders in various directions. The user may interact with the touchscreen as described. The user may interact with other physical user interactive devices as described elsewhere herein. For instance, the user may manipulate one or more physical joysticks, knobs, dials, buttons, keys, sliders, touchpads, trackballs, or any other type of user interactive device.

In some embodiments, data shown in the regions may be swappable in response to user input. For example, if a first image from a first payload is originally shown in the first region, and a second image from a second payload is originally shown in the second region, the data may be swapped in response to the user input so that the second image is shown in the first region and the first image is shown in the second region. In some embodiments, the user input that may initiate the swapping may be touching the second region. In another embodiment the user input that may initiate the swapping may be tapping and dragging an image from one region to another region.

The multiple regions may have any configuration relative to one another. For instance, a first region and a second region may be adjacent to one another. The first region may be horizontally adjacent to the second region. For instance, the first region may be on a left side and a second region may be on a right side. The first region may be vertically adjacent to the second region. The first region may be above the second region. The first region and the second region may be of the same size or may be of different sizes. In one example, the second region may be smaller than the first region and may be within the first region. In another example, the first region may be smaller than the second region and may be within the second region. The first region and second region may or may not partially or completely overlap one another.

In some embodiments, the application may show additional regions. The additional regions may show other types of data. In one example, a third region may show a map. Further embodiments with geographical maps are provided in greater detail elsewhere herein.

Figure 19:
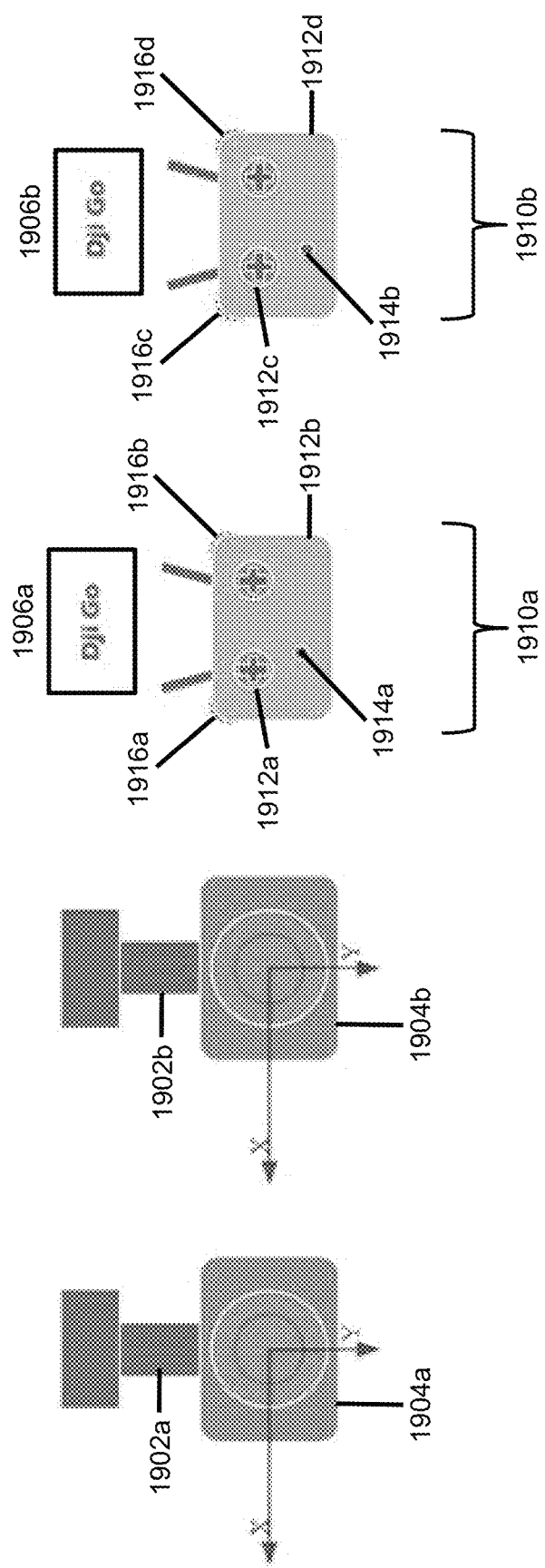
FIG. 19 shows an example of multiple remote controllers collectively controlling operation of a movable object and/or multiple gimbals, in accordance with embodiments of the disclosure.

FIG. 19 shows an example of multiple remote controllers collectively controlling operation of a movable object and/or multiple gimbals, in accordance with embodiments of the disclosure. A movable object may carry a first gimbal 1902a supporting a first payload 1904a and a second gimbal 1902b supporting a second payload 1904b. A plurality of remote controllers 1910a, 1910b may be used to collectively control operation of the first and second gimbals. The remote controllers may also be used to control movement of the movable object (e.g., flight). The remote controllers may be used to control any operation of the movable object (e.g., movement, communications, power, flight modes, auto-returns, etc.).

A plurality of remote controllers may be capable of operating independently of one another. The plurality of remote controllers may or may not communicate with one another. In one example, a first remote controller and a second remote controller may communicate with one another. The first and second remote controllers may communicate over a wired connection. For example, a cable may connect the first and second remote controllers. In another example, the first and second remote controllers may be plugged into a common support. The first and second remote controllers may communicate wirelessly. In some instances, direct wireless communications may be employed. For instance, a Bluetooth, infrared, radio, optical, WiFi, WiMax or other type of communication may occur between remote controllers. A first remote controller may be configured to be operated by a first user and a second remote controller may be configured to be operated by a second user. The first user and second users may or may not be within a close proximity of one another. One or more of the remote controllers may be configured to transmit commands that affect operation of respective gimbals. One or more of the remote controllers may be configured to transmit commands that affect operation of multiple gimbals. The commands that affect operation of the plurality of gimbals may be transmitted sequentially from a remote controller, or may be transmitted simultaneously.

Each remote controller 1910a, 1910b may comprise any number of user interactive devices that may aid in the control of the multiple gimbals and/or operation of the movable object. For instance, remote controller may comprise one or more of the following: joysticks or d-pads

1912*a*, 1912*b*, 1912*c*, 1912*d*, buttons 1914*a*, 1914*b*, dials 1916*a*, 1916*b*, 1916*c*, 1916*d*, keys, touchpads, touchscreens, trackballs, inertial sensors, thermal sensors, microphones, cameras or any other interactive device that may allow a user to interact with the remote controller. The user may touch a user interactive device to control the multiple gimbals and/or operation of the movable object. The user may speak to the user interactive device to control the multiple gimbals and/or operation of the movable object. The user may shake or tilt the user interactive device to control the multiple gimbals and/or operation of the movable object. The user may make any gestures or facial expressions to control the multiple gimbals and/or operation of the movable object.

In one example, a user may interact with a user interactive device of the remote controller to indicate an operational mode for gimbal control. For instance, the user may provide an input to indicate whether the movable object is operating in an independent mode or a simultaneous mode for control of the gimbals. A user may interact with the remote controller in any manner to indicate the mode. For instance, the user may press a button to switch between an independent mode and simultaneous mode. In another example, the user may toggle a joystick or turn a dial or knob to switch between an independent mode and a simultaneous mode. The user may touch a portion of a touchscreen to switch between an independent mode and a simultaneous mode. The user may touch an icon or other visual representation on the touchscreen to switch between an independent mode and a simultaneous mode.

In some embodiments, a first remote controller 1910*a* may be used to control operation (e.g., movement) of a movable object while a second remote controller 1910*b* may be used to control the plurality of gimbals.

A user may interact with a user interactive device of a remote controller 1910*b* to control operation of the multiple gimbals. For example, a user may use one or more controls (e.g., joysticks, d-pad, dials, etc.) 1916*c*, 1916*d* to control operation of a first gimbal. The user may toggle to another setting by interacting with another user interactive device (e.g., pressing a functional key 1914*b*). For instance, the user may select a functional key to use the one or more controls to control operation of the second gimbal. The same controls may be used to control operation of the first gimbal and the second gimbal at different times. The user may toggle between controlling the first gimbal and controlling the second gimbal by pressing the functional key.

Optionally, if the user presses the functional key again, the controls may control both the first gimbal and the second gimbal. This may bring the gimbals into simultaneous operation mode. The same set of controls that may have been used to independently the first gimbal and the second gimbal, may be used to control the first and second gimbal together in a simultaneous mode.

Any description herein of a functional key may be employed by any other user interactive device. For example, a binary or multi-way switch may be provided that may be provided to allow a user to select which gimbal and/or how many gimbals to control using the controller and/or whether to control operation of the movable object.

The controls of another remote controller 1910*a* may be used to control operation of the movable object. For instance, the controls may be used to control flight of the movable object. The same type of controls that may be used to control the gimbals may be used to control movement of the movable object.

In some embodiments, a first remote controller 1910*a* may be used to control operation (e.g., movement) of a movable object and operation of a first gimbal 1902*a*, 1904*a* while a second remote controller 1910*b* may be used to control operation of a second gimbal 1902*b*, 1904*b*.

A controlling relation may be set from an application may be running on the first and/or second remote controllers themselves or may be running on a separate device. The user may provide an input to an application to determine which remote controller controls which gimbal or gimbals. The user may provide an input to the application to determine which remote controllers controls operation of the movable object. In some instances, the remote controllers may be treated equally. The remote controllers may have the same priority. In other instances, a first remote controller may be a master remote controller and a second remote controller may be slave remote controller. A master remote controller may control a first gimbal and a slave remote controller may control a second gimbal. A master remote controller may control a movable object. When contrary instructions are given by a master remote controller and a slave remote controller, instructions by the master remote controller may override instructions given by a slave remote controller. When operating in a simultaneous mode, gimbal controls may be controlled by both the master and slave controllers, or may be controlled by only the master controller. The designation of which remote controllers are the master controller and/or slave controller may be updated by the user.

A user may interact with a user interactive device of a remote controller 1910*a* to control operation of a movable object and at least one gimbal. For example, a user may use one or more controls (e.g., joysticks, d-pad, dials, etc.) 1916*a*, 1916*b* to control operation of a first gimbal. The user may toggle to another setting by interacting with another user interactive device (e.g., pressing a functional key 1914*a*). For instance, the user may select a functional key to use the one or more controls to control operation of the movable object. The same controls may be used to control operation of the first gimbal and operation of a movable object at different times. The user may toggle between controlling the first gimbal and controlling operation of the movable object by pressing the functional key.

Any description herein of a functional key may be employed by any other user interactive device. For example, a binary or multi-way switch may be provided that may be provided to allow a user to select which gimbal and/or how many gimbals to control using the controller and/or whether to control operation of the movable object.

The controls of another remote controller 1910*b* may be used to control operation of the second gimbal. For instance, the controls may be used to control orientation of the second payload. The same type of controls that may be used to control the second gimbal may be used to control movement of the movable object and movement of the first gimbal.

Optionally, one or more applications 1906, 1906*b* may be used to control operation of the gimbals and/or the movable object. The applications may be integral to the multiple remote controllers 1910*a*, 1910*b*. For instances, one or more of the remote controllers may include a display, such as a touchscreen, that may show a user interface for a respective application. In another example, one or more applications may be operating on one or more devices separate from the respective remote controller. The separate device may be physically connected to the remote controller, in electrical communication with the remote controller, physically and electrically from the remote controller, or capable of performing the functions of the remote controller without requiring the presence of a remote controller. In some embodiments, one or more devices running the application may control the movable object and/or gimbals without use of additional remote controllers. Alternatively one or more devices running the application and the plurality of remote controllers may collectively control the movable objects and/or gimbals. In some instances, a first device running the application may control the gimbals while a second device running the application may control movement of the movable object. The device running the application may be a remote controller.

The application may or may not split a display (e.g., screen, such as touchscreen) into a plurality of regions. In some instances, when a device running the application controls the plurality of gimbals the display may be split into multiple regions. Each region may display data associated with a respective gimbal (which may include the gimbal alone or the gimbal and/or payload). For example, a first region may display data associated with a first gimbal 1902a, 1904a, and a second region may display data associated with a second gimbal 1902b, 1904b. Any type of data may be depicted as described elsewhere herein. The data may be updated in real-time as the gimbals are controlled.

In some instances, a first device running the application controls a first gimbal and a second device running the application controls a second gimbal. In some embodiments, each display need not be split. For example, a first display associated with the first device may display data associated with a first gimbal, and a second display associated with the second device may display data associated with the second gimbal. A first display on a first device may collectively be a first region and a second display on a second device may collectively be a second region. Thus, multiple regions may be displayed across the multiple devices.

Either the first device or the second device may control operation of the movable object. In some instances, one of the devices (e.g., the first device) may be designated as controlling operation of the movable object. This may be useful when it is desirable to be clear which user has control of the movable object so there is not any confusion.

In some instances, both devices (e.g., the first device and the second device) may interchangeably control operation of the movable object. This may be useful in a scenario where two users are controlling the movable object and gimbal, and it may be desirable to provide flexibility as to which user is controlling the movable object. For instance, during some operations, a first user may be performing a more complex control of the first gimbal, and the second user may pick up the control of the movable object, while later in the operation the second user may be performing a more complex control of the second gimbal and the first user may pick up the control of the movable object.

A user may interact with a region to control a respective gimbal. For example, a user may interact with a first region to control operation of a first gimbal, and a user may interact with a second region to control operation of a second gimbal. A user can touch the first region to control rotation of a first gimbal and a user can touch the second region to control rotation of a second gimbal. A user can tap and drag the first region to control rotation of a first gimbal and a user can touch and drag the second region to control rotation of the second gimbal. The first and second regions may be shown on a display on the same device, or may be shown on multiple displays associated with different devices. Any of the controls as described elsewhere herein may apply. For instance, direction and/or speed of gimbal operation may depend on the direction and/or speed of the user input.

In some embodiments, the data shown on the regions may be updated as the gimbals are being controlled. The data shown on the regions may be updated in real-time while the payload orientations are changing. The data shown may be reflective of the updated payload orientations while they are changing. For instance, if the payloads are collecting image data, the data may show image data captured by the payloads in real-time while they are changing.

Figure 20:
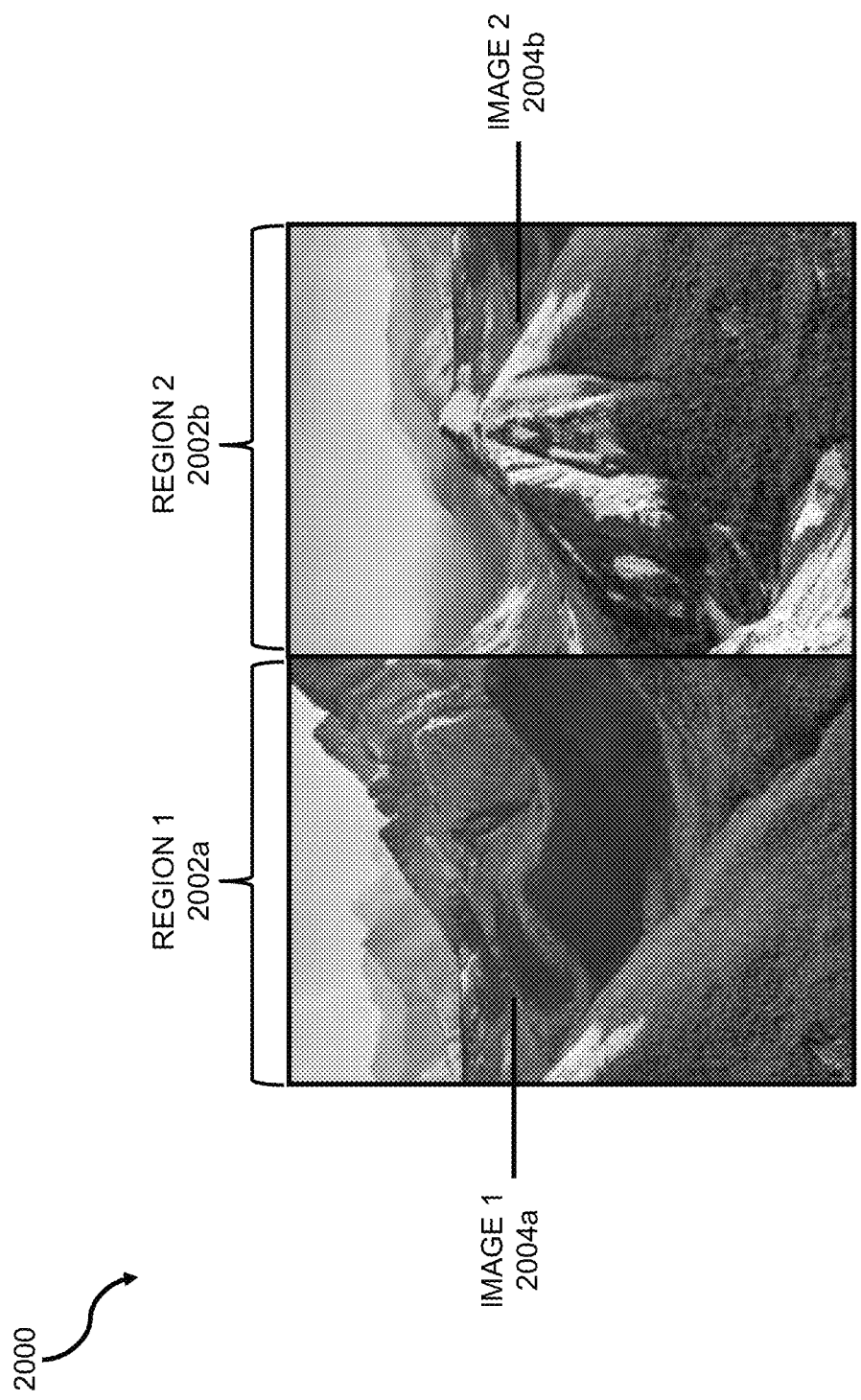
FIG. 20 shows an example of a user interface showing images captured by multiple cameras on-board a movable object, in accordance with embodiments of the disclosure.

FIG. 20 shows an example of a user interface showing images captured by multiple cameras on-board a movable object, in accordance with embodiments of the disclosure. The user interface 2000 may comprise a first region 2002a and a second region 2002b. Data associated with a first gimbal and/or payload 2004a may be shown in the first region and data associated with a second gimbal and/or payload 2004b may be shown in the second region. The first and second gimbals may be supported by the same movable object.

A user interface may be divided into multiple regions when a device displaying the user interface is used to control multiple gimbals. The device may also be used to control operation of a movable object that carries the gimbals, or a separate device may be used to control operation of the movable object.

As previously described the first and second regions 2002a, 2002b may have any visual relationship relative to one another. The first and second regions may be adjacent to one another. The first and second regions may be horizontally adjacent to one another. For instance, the first region may be on the left and the second region may be on the right. The first and second regions may be vertically adjacent to one another. For instance, the first region may be on the top and the second region may be on the bottom. In some instances, the first and second regions may have a diagonal relationship relative to one another. For instance, the first region may be an upper left corner and a second region may be in a lower bottom corner, or the first region may be in a lower left corner and a second region may be in an upper right corner.

The first region and the second region may be the same size. Alternatively, the first and second regions may be different sizes. For instance the first region may be larger than the second region or the second region may be larger than the first region. The first and second regions may be of the same shape or different shapes. For instance, the first and second regions may both be rectangles. Examples of region shapes may include, but are not limited to triangles, quadrilaterals (e.g., squares, rectangles, diamonds, parallelograms, trapezoids), pentagons, hexagons, octagons, circles, ellipses, etc.). The first and second regions may or may not have the same aspect ratios.

The first and second regions may or may not overlap. For instance, the first and second regions may not overlap with one another. The first and second regions may be adjacent to one another without overlapping. In some instances, the first and second regions may overlap. For instance, a first region may be within an area of the second region, or the second region may be within an area of the first region. The first region may be completely within the area of the second region, or vice versa. A first region and a second region may partially overlap. For instance, a first region may be partially within an area of a second region, or vice versa.

The regions may remain substantially static during operation of the movable object. Alternatively, the regions may change during operation of the movable object.

Data may be shown within the various regions. For example, data associated with a first gimbal and/or payload 2004a may be shown within a first region and data associated with a second gimbal and/or payload 2004b may be shown within a second region. The data may be any type of data as described elsewhere herein. In some instances, the data may be image data collected by the respective payloads. For example, a first image collected using a first payload may be shown within a first region and a second image collected using a second payload may be shown within a second region. In some embodiments, an image/video capture operation at an application may be switched by a gimbal switch.

In some embodiments, the gimbals associated with the various regions may be fixed. For instance, the first gimbal may remain associated with the first region and the second gimbal may remain associated with the second region. The data associated with the first gimbal may remain depicted within the first region and the data associated with the second gimbal may remain depicted within the second region. The first image may remain displayed in the first region and the second image may remain displayed in the second region.

Alternatively, the gimbals associated with the various regions may be changed. For instance, the first gimbal may swap between being associated with the first region and the second region. Similarly, the second gimbal may swap between being associated with the second region and the first region. The data associated with the first gimbal may be depicted in the first region and the data associated with the second gimbal may be depicted in the second regions at times. In some instances, the associations may be switched so that the data associated with the first gimbal may be depicted in the second region and the data associated with the second gimbal may be depicted in the first region. The first image may be depicted in the first region and the second image may be depicted in the second region at times. In some instances, the associations may be switched so that the first image may be depicted in the second region and the second image may be depicted in the first region.

In some embodiments, the gimbals may operate in an independent mode. The data depicted in the various regions may be different. The data associated with the various gimbals may be different. For example, a first payload supported by a first gimbal may capture a first image. A second payload supported by a second gimbal may capture a second image. The first and second images need not be the same when the gimbals are operating in an independent mode. Since the gimbals may be pointed at any direction relative to one another, different parts of the environment may be captured by the respective payloads, which may allow the images to be different.

FIG. 21 shows an example of a user interface when operating in a simultaneous mode, in accordance with embodiments of the disclosure. As previously described, a user interface 2100 may comprise a first region 2102a and a second region 2102b.

Data associated with a first gimbal and/or payload may be shown initially shown in the first region and data associated with a second gimbal and/or payload may be initially shown in the second region. The first and second gimbals may be supported by the same movable object. During a simultaneous mode, the first and second gimbals may be operated together in a synchronized manner.

A user may interact with any of the regions to cause the first and second gimbals to be operated in a synchronized manner. For example, when a user interacts with the first region, both the first and second gimbals may respond to the user interaction with the first region. For example, if the user taps and drags the first region, both the first and second regions may be updated to reflect that both the first and second gimbals move in accordance with the dragging motion in the first region. If the user then taps and drags the second region, both the first and second regions may be updated to reflect that both the first and second gimbals move in accordance with the dragging motion in the second region. In some instances, no particular selection of region is required and both gimbals may be equally responsive to inputs to the first and second regions. In some instances, if contrary inputs are provided to both regions when in the simultaneous mode, one of the regions may have a higher priority than the other region and both gimbals may respond to the input to the region with the higher priority.

Alternatively, a user may interact with a selected region to cause the first and second gimbals to be operated in a synchronized manner. If a user interacts with a non-selected region, neither the first gimbal nor the second gimbal may respond to the user input. For example, when a first region is a selected region and a user interacts with the first region, both the first and second gimbals may respond to the user interaction with the first region. For example, if the user taps and drags the first region, both the first and second regions may be updated to reflect that both the first and second gimbals move in accordance with the dragging motion in the first region. If the second region is a non-selected region and a user then taps and drags the second region, neither the first gimbal nor the second regions may respond.

In some embodiments, as illustrated in FIG. 21, the selected region may remain the same. For instance, a first region 2102a may remain as the selected region 2106 and a second region 2102b may be a non-selected region. The selected region may remain the same, but the gimbal associated with the selected region may be updated as desired.

A user may wish to interact with data associated with a first gimbal to control the first gimbal. When data associated with the first gimbal (e.g., Image 1) is within a selected region 2106, the first gimbal may be controlled by interacting with the first region 2102a. In the simultaneous mode, the second gimbal may mirror activities of the first gimbal. A user may wish to interact with data associated with a second gimbal to control the second gimbal. The user may tap the data in the non-selected region (e.g., Image 2). The data in the non-selected region may be moved to the selected region (e.g., Image 2 2104a may move to the first region 2102a, which is the selected region 2106). The data that was in the selected region may move to the non-selected region (e.g., Image 1 2104b may move to the second region 2104b). A user may interact with the data about the selected region to control operation of both gimbals. For instance, the user may interact with Image 2 to control operation of the second gimbal and/or payload. The first gimbal may mirror the activities of the second gimbal when in the simultaneous mode.

In a simultaneous mode, the payloads may be facing in substantially the same direction. The same area of the environment may be detected by the payloads. When both payloads are of the same type, the same image may be capture. For instance, a first image 2104b and a second image 2104a may be substantially the same.

FIG. 22 shows another example of a user interface when operating in a simultaneous mode, in accordance with embodiments of the disclosure. As previously described, a user interface 2200 may comprise a first region 2202a and a second region 2202b.

Data associated with a first gimbal and/or payload may be shown initially shown in the first region and data associated with a second gimbal and/or payload may be initially shown in the second region. The first and second gimbals may be supported by the same movable object. During a simultaneous mode, the first and second gimbals may be operated together in a synchronized manner.

As previously described, a user may interact with a selected region to cause the first and second gimbals to be operated in a synchronized manner. If a user interacts with a non-selected region, neither the first gimbal nor the second gimbal may respond to the user input. For example, when a second region is a selected region and a user interacts with the second region, both the first and second gimbals may respond to the user interaction with the second region. For example, if the user taps and drags the second region, both the first and second regions may be updated to reflect that both the first and second gimbals move in accordance with the dragging motion in the second region. If the first region is a non-selected region and a user then taps and drags the first region, neither the first gimbal nor the second regions may respond.

In some embodiments, as illustrated in FIG. 22, the selected region may be updated as desired. For instance, data associated with a first gimbal may remain associated with a first region and data associated with a second gimbal may be associated with a second region. A first region 2202a initially may be a selected region and a second region 2202b may initially be a non-selected region. The selected region may be updated. The second region may become the selected region 2206 in response to a user input.

A user may wish to interact with data associated with a first gimbal to control the first gimbal. When a first region is a selected region, data associated with the first gimbal (e.g., Image 1) is within the selected region. The first gimbal may be controlled by interacting with the first region 2202a. In the simultaneous mode, the second gimbal may mirror activities of the first gimbal. A user may wish to interact with data associated with a second gimbal to control the second gimbal. The user may provide an input to switch the selected regions. For example, the user may tap (or do a long hold of) the second region. The second region 2202b may become the selected region 2206. The second gimbal may be controlled by interacting with the second region. The first gimbal may mirror activities of the second gimbal when in the simultaneous mode.

In a simultaneous mode, the payloads may be facing in substantially the same direction. The same area of the environment may be detected by the payloads. When both payloads are of the same type, the same image may be capture. For instance, a first image 2204a and a second image 2204b may be substantially the same.

Figure 23:
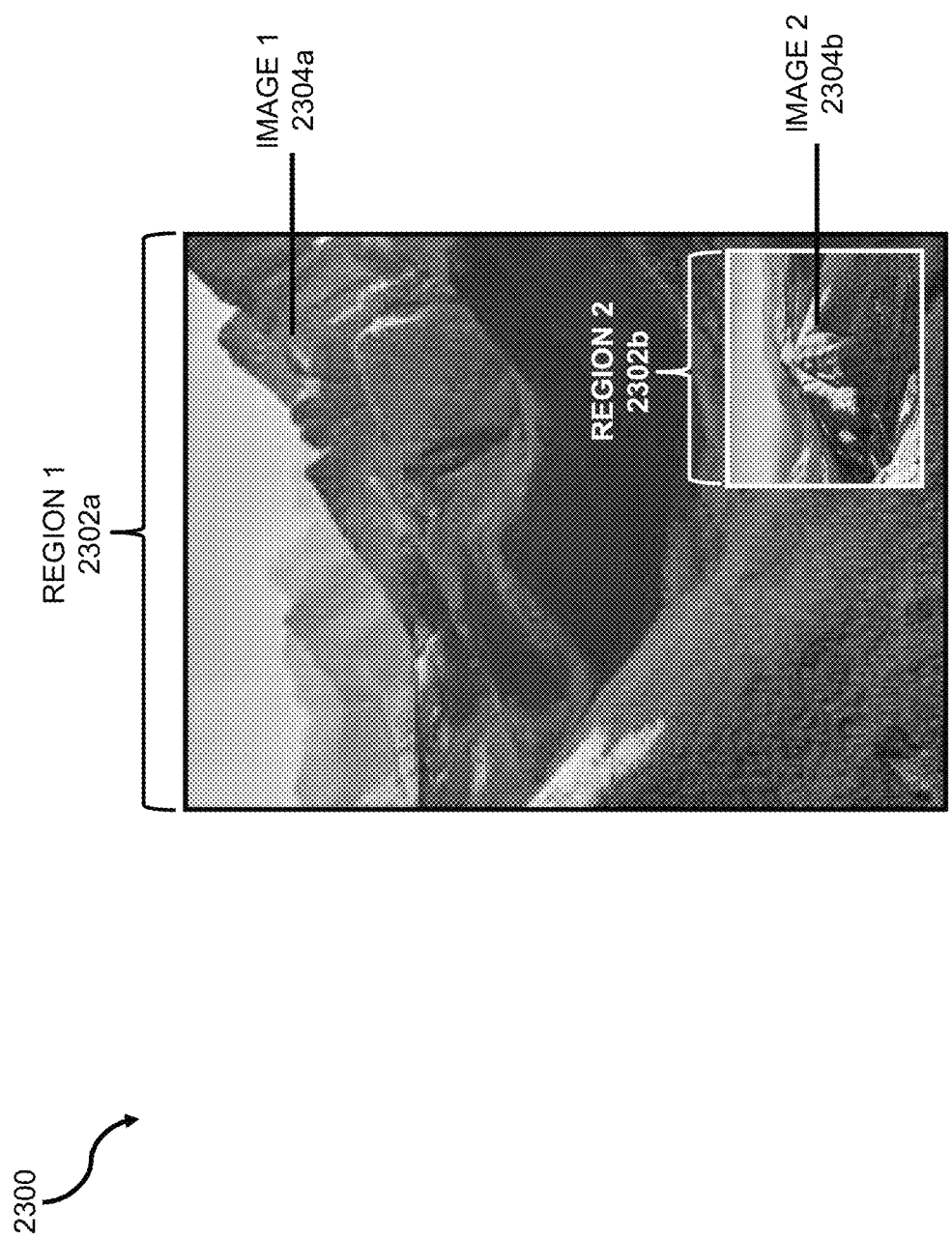
FIG. 23 shows another example of a user interface showing images captured by multiple cameras on-board a movable object, in accordance with embodiments of the disclosure.

FIG. 23 shows another example of a user interface showing images captured by multiple cameras on-board a movable object, in accordance with embodiments of the disclosure. The user interface 2300 may comprise a first region 2302a and a second region 2302b. Data associated with a first gimbal and/or payload 2304a may be shown in the first region and data associated with a second gimbal and/or payload 2304b may be shown in the second region. The first and second gimbals may be supported by the same movable object.

A user interface may be divided into multiple regions when a device displaying the user interface is used to control multiple gimbals. The device may also be used to control operation of a movable object that carries the gimbals, or a separate device may be used to control operation of the movable object.

As previously described the first and second regions 2302a, 2302b may have any visual relationship relative to one another. For example, the second region may be smaller than the first region and may be provided within the first region. The second region may be provided within a corner of the first region (e.g., lower right corner, lower left corner, upper left corner, or upper right corner). A picture-in-picture visual relationship may be provided. A second region may show a picture that is within a picture of a first region.

Data may be shown within the various regions. For example, data associated with a first gimbal and/or payload 2304a may be shown within a first region and data associated with a second gimbal and/or payload 2304b may be shown within a second region. The data may be any type of data as described elsewhere herein. In some instances, the data may be image data collected by the respective payloads. For example, a first image collected using a first payload may be shown within a first region and a second image collected using a second payload may be shown within a second region.

In some embodiments, the gimbals associated with the various regions may be fixed. For instance, the first gimbal may remain associated with the first region and the second gimbal may remain associated with the second region. The data associated with the first gimbal may remain depicted within the first region and the data associated with the second gimbal may remain depicted within the second region. The first image may remain displayed in the first region and the second image may remain displayed in the second region.

Alternatively, the gimbals associated with the various regions may be changed. For instance, the first gimbal may swap between being associated with the first region and the second region. Similarly, the second gimbal may swap between being associated with the second region and the first region. The data associated with the first gimbal may be depicted in the first region and the data associated with the second gimbal may be depicted in the second regions at times. In some instances, the associations may be switched so that the data associated with the first gimbal may be depicted in the second region and the data associated with the second gimbal may be depicted in the first region. The first image may be depicted in the first region and the second image may be depicted in the second region at times. In some instances, the associations may be switched so that the first image may be depicted in the second region and the second image may be depicted in the first region.

In some embodiments, the gimbals may operate in an independent mode. The data depicted in the various regions may be different. The data associated with the various gimbals may be different. For example, a first payload supported by a first gimbal may capture a first image. A second payload supported by a second gimbal may capture a second image. The first and second images need not be the same when the gimbals are operating in an independent mode. Since the gimbals may be pointed at any direction relative to one another, different parts of the environment may be captured by the respective payloads, which may allow the images to be different.

Optionally the gimbals may operate in a simultaneous mode. Optionally, when operating in a simultaneous mode, a user may interact with a selected region to control multiple gimbals simultaneously. User interaction with a non-selected region may result in no reaction by the gimbals. In some instances, a larger region 2302a may be a selected region while a smaller region 2302b may be a non-selected region. In some embodiments, the user interface depicted in FIG. 23 may be used during both the independent mode and the simultaneous mode. In some embodiments, the user interface depicted in FIG. 20 may be used during the independent mode while the user interface depicted in FIG. 23 may be used during the simultaneous mode. When operating in the independent mode the regions may be substantially the same size. This may be visually representative of how inputs to either region may be treated equally to control each gimbal independently. When operating in the simultaneous mode the selected region may be of a greater size than the non-selected region. This may be visually representative of how inputs to only the selected regions may be used to control the multiple gimbals. This may allow greater visual emphasis on the region where the user may be interacting to control the gimbals. The larger area may allow the user to view the data associated with the respective gimbal, which may make it easier for the user to determine how to control the respective gimbal.

FIG. 24 shows another example of a user interface when operating in a simultaneous mode, in accordance with embodiments of the disclosure. As previously described, a user interface 2400 may comprise a first region 2402a and a second region 2402b.

Data associated with a first gimbal and/or payload may be shown initially shown in the first region and data associated with a second gimbal and/or payload may be initially shown in the second region. The first and second gimbals may be supported by the same movable object. During a simultaneous mode, the first and second gimbals may be operated together in a synchronized manner.

A user may interact with any of the regions to cause the first and second gimbals to be operated in a synchronized manner. For example, when a user interacts with the first region, both the first and second gimbals may respond to the user interaction with the first region. For example, if the user taps and drags the first region, both the first and second regions may be updated to reflect that both the first and second gimbals move in accordance with the dragging motion in the first region. If the user then taps and drags the second region, both the first and second regions may be updated to reflect that both the first and second gimbals move in accordance with the dragging motion in the second region. In some instances, no particular selection of region is required and both gimbals may be equally responsive to inputs to the first and second regions. In some instances, if contrary inputs are provided to both regions when in the simultaneous mode, one of the regions may have a higher priority than the other region and both gimbals may respond to the input to the region with the higher priority.

Alternatively, a user may interact with a selected region to cause the first and second gimbals to be operated in a synchronized manner. If a user interacts with a non-selected region, neither the first gimbal nor the second gimbal may respond to the user input. For example, when a first region is a selected region and a user interacts with the first region, both the first and second gimbals may respond to the user interaction with the first region. For example, if the user taps and drags the first region, both the first and second regions may be updated to reflect that both the first and second gimbals move in accordance with the dragging motion in the first region. If the second region is a non-selected region and a user then taps and drags the second region, neither the first gimbal nor the second regions may respond.

In some embodiments, as illustrated in FIG. 24, the selected region may remain the same. For instance, a first region 2402a may remain as the selected region 2406 and a second region 2402b may be a non-selected region. The selected region may remain the same, but the gimbal associated with the selected region may be updated as desired.

A user may wish to interact with data associated with a first gimbal to control the first gimbal. When data associated with the first gimbal (e.g., Image 1) is within a selected region 2406, the first gimbal may be controlled by interacting with the first region 2402a. In the simultaneous mode, the second gimbal may mirror activities of the first gimbal. A user may wish to interact with data associated with a second gimbal to control the second gimbal. The user may tap the data in the non-selected region (e.g., Image 2). The data in the non-selected region may be moved to the selected region (e.g., Image 2 2404b may move to the first region 2402a, which is the selected region 2406). The data that was in the selected region may move to the non-selected region (e.g., Image 1 2404a may move to the second region 2404b). A user may interact with the data about the selected region to control operation of both gimbals. For instance, the user may interact with Image 2 to control operation of the second gimbal and/or payload. The first gimbal may mirror the activities of the second gimbal when in the simultaneous mode.

In a simultaneous mode, the payloads may be facing in substantially the same direction. The same area of the environment may be detected by the payloads. When both payloads are of the same type, the same image may be capture. For instance, a first image 2404a and a second image 2404b may be substantially the same.

FIG. 25 shows another example of a user interface when operating in a simultaneous mode, in accordance with embodiments of the disclosure. As previously described, a user interface 2500 may comprise a first region 2502a and a second region 2502b.

Data associated with a first gimbal and/or payload may be shown initially shown in the first region and data associated with a second gimbal and/or payload may be initially shown in the second region. The first and second gimbals may be supported by the same movable object. During a simultaneous mode, the first and second gimbals may be operated together in a synchronized manner.

As previously described, a user may interact with a selected region to cause the first and second gimbals to be operated in a synchronized manner. If a user interacts with a non-selected region, neither the first gimbal nor the second gimbal may respond to the user input. For example, when a second region is a selected region and a user interacts with the second region, both the first and second gimbals may respond to the user interaction with the second region. For example, if the user taps and drags the second region, both the first and second regions may be updated to reflect that both the first and second gimbals move in accordance with the dragging motion in the second region. If the first region is a non-selected region and a user then taps and drags the first region, neither the first gimbal nor the second regions may respond.

In some embodiments, as illustrated in FIG. 25, the selected region may be updated as desired. For instance, data associated with a first gimbal may remain associated with a first region and data associated with a second gimbal may be associated with a second region. A first region 2502a initially may be a selected region and a second region 2502b may initially be a non-selected region. The selected region may be updated. The second region may become the selected region 2506 in response to a user input.

A user may wish to interact with data associated with a first gimbal to control the first gimbal. When a first region is a selected region, data associated with the first gimbal (e.g., Image 1) is within the selected region. The first gimbal may be controlled by interacting with the first region 2502a. In the simultaneous mode, the second gimbal may mirror activities of the first gimbal. A user may wish to interact with data associated with a second gimbal to control the second gimbal. The user may provide an input to switch the selected regions. For example, the user may tap (or do a long hold of) the second region. The second region 2502b may become the selected region 2506. The second gimbal may be controlled by interacting with the second region. The first gimbal may mirror activities of the second gimbal when in the simultaneous mode.

In a simultaneous mode, the payloads may be facing in substantially the same direction. The same area of the environment may be detected by the payloads. When both payloads are of the same type, the same image may be capture. For instance, a first image 2504a and a second image 2504b may be substantially the same.

As described elsewhere herein, a split screen (e.g., FIG. 20) arrangement and a picture-in-picture arrangement (e.g., FIG. 23) may each be capable of operating in an independent mode and in a simultaneous mode. In another example, a split screen arrangement may be used for independent mode only and a switch may occur to a picture-in-picture arrangement when operating in a simultaneous mode, or vice versa.

Figure 26:
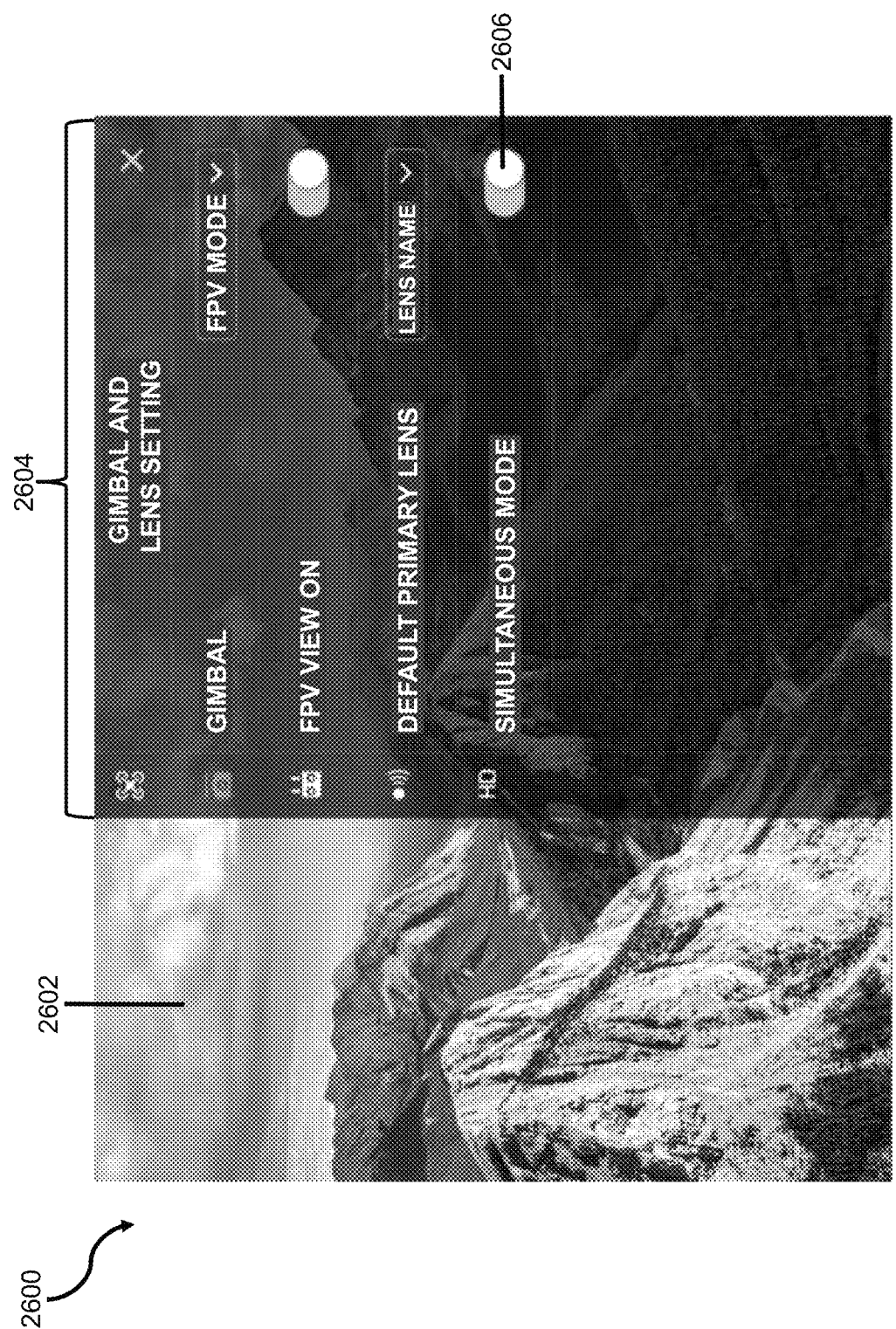
FIG. 26 shows an example of a user interface that permits switching between an independent mode and a simultaneous mode, in accordance with embodiments of the disclosure.

FIG. 26 shows an example of a user interface that permits switching between an independent mode and a simultaneous mode, in accordance with embodiments of the disclosure. A user interface 2600 may comprise a visual representation that allows a mode of operation to be selected 2606. Optionally, data associated with one or more of the gimbals 2602 may be displayed. In some embodiments, a menu 2604 of controls may be displayed.

The user interface 2600 may be displayed on a remote controller. The user interface may be shown on a device running an application as described. The user interface may show data associated with one or more gimbals 2602. For instance, data collected by one or more gimbals may be displayed. For instance, an image captured by an image capturing device may be shown. In some embodiments, multiple images captured by multiple respective gimbals may be shown. Any other type of data useful for control of the multiple gimbals and/or movable object may be shown.

A menu 2604 of controls may be provided. The menu may optionally overlay the data associated with the one or more gimbals. The menu may optionally overlay any information useful for the operation of the movable object. The menu may be adjacent to the data associated with the one or more gimbals. The menu may be transparent and may show underlying information. Alternatively, the menu may be opaque. The menu may be adjacent to the information useful for operation of the movable object.

The menu 2604 may show any settings options for operation of the movable object and/or the gimbals. For instance, the menu may include gimbal and lens settings. For example, options for a mode may be provided. For instance, first person view (FPV) mode may be turned on or off. The modes may pertain to the type of stabilization provided by the gimbals. The modes may pertain to type of data that may be collected with aid of the payloads or any other sensors of the movable object. An option may be provided to turn first person view on and off.

An option may be provided for a default primary lens. A lens name may be selected. The lens name may be selected from a drop down menu or using any other user interface tool. The lens name may or may not be indicative of lens type.

An option may be provided to select a gimbal mode (e.g., independent mode or simultaneous mode). In some embodiments, a default mode may be presented, and the default mode may be turned on or off. For instance, the default may be to operate in simultaneous mode and the simultaneous mode may be turned on or off. When the simultaneous mode is turned off, the movable object may automatically operate in independent mode. When the default is to operate in an independent mode the independent mode may be turned on or off. When the independent mode is turned off, the movable may automatically operate in simultaneous mode. In some instances, a default may not be provided, and a user may select between an independent mode and a simultaneous mode. The user may touch the user interface to select the gimbal mode. The user may switch between different gimbal modes with a single touch on the screen.

Figure 27:
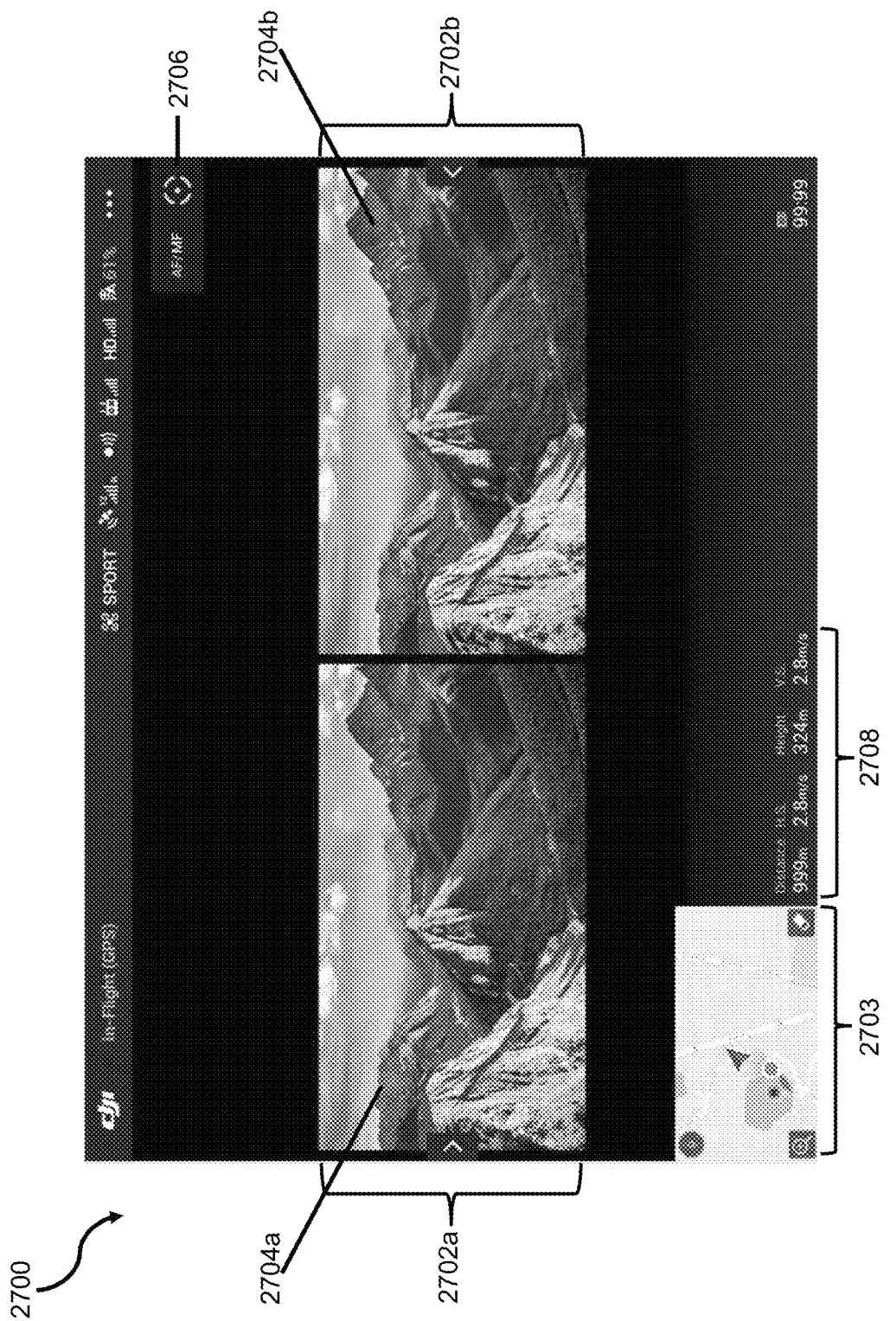
FIG. 27 shows an example of a user interface, in accordance with embodiments of the disclosure.

FIG. 27 shows an example of a user interface, in accordance with embodiments of the disclosure. A user interface 2700 may comprise a first region 2702a and a second region 2702b. Each region may show data associated with a respective gimbal 2704a, 2704b. In some embodiments, a third region 2703 showing a geographical map may be provided. Additional information such as automatic focusing/manual focusing (AF/MF) 2706, or position/movement data 2708 may be provided.

In some embodiments, the user interface 2700 may comprise a first region 2702a and a second region 2702b. Any number of regions may be provided. The number of regions may correspond to the number of gimbals. For instance, when two gimbals are carried by a movable object, two regions may be provided. The regions may have any visual characteristic or relationship to one another. In some embodiments, the regions may be the same side and may be adjacent to one another.

Each region 2702a, 2702b may show data 2704a, 2704b associated with a respective gimbal. For example, a first region may show image data from a first payload of a first gimbal, and a second region may show image data from a second payload of a second gimbal.

The user interface as depicted may be used for independent mode and simultaneous mode. The arrangement of regions as depicted may be used for both independent mode and simultaneous mode. Alternatively, the user interface as depicted may be used for independent mode only or simultaneous mode only. For instance, the arrangement of regions depicted may be used for independent mode but not for simultaneous mode, or for simultaneous mode but not for independent mode.

As previously described, when in an independent mode, a user may interact with the first region or the second region. The user may interact with both the first region and the second region. The user may interact with the first region and the second region at different times. The user may interact with the first region and the second region at the same time. A user interaction with a single region may cause control of a single corresponding gimbal. Non-corresponding gimbals may not react to the user interaction with the region. Interacting with the first region may affect the data shown in the first region. For example, the user may drag a first image in the first region. This may also affect operation of the first gimbal and/or first payload. Interacting with the second region may affect the data shown in the second region. For example, the user may drag a second image in the second region. This may also affect operation of the second gimbal and/or second payload. The user may be able to independently interact with the first region without affecting the data shown in the second region, and/or interact with the second region without affecting the data shown in the first region, when in the independent mode.

When in a simultaneous mode, a user may interact with both the first region and the second region, or with only a single selected region of the first and second regions. A user interaction with a single region may cause control of multiple gimbals. In some embodiments, all supported gimbals may respond to the user interaction with the single region. In some embodiments, the user may interact with both the first region and the second region. The user may interact with the first region and the second region at different times. Interacting with the first region may affect the data shown in the first region and the second region. For example, the user may drag a first image in the first region. This may also affect operation of the first gimbal and/or first payload, as well as the second gimbal and/or second payload. The first gimbal and/or first payload, and the second gimbal and/or second payload may operate in a duplicate fashion. Interacting with the second region may affect the data shown in the second region and the first region. For example, the user may drag a second image in the second region. This may also affect operation of the second gimbal and/or second payload, as well as the first gimbal and/or first payload. The second gimbal and/or second payload, and the first gimbal and/or first payload may operate in a duplicate fashion.

In some embodiments, a user may interact with only a single selected region of the first and second regions. When interacting with the selected region, both the first and second gimbals and/or respective payloads may be affected. When interacting with the selected region, data shown in the selected region and the non-selected region may both be affected. The data shown in the selected and non-selected regions may be affected in the same way. When interacting with the non-selected region, data shown in neither the non-selected region nor the selected region may be affected. For example, if the first region is the selected region, interacting with the first region may cause the first and second gimbals and/or associated first and second payloads to operate in a duplicative fashion. Interacting with the second region may cause no reaction by the first and second gimbals and/or associated first and second payloads. The selected region may remain fixed (e.g., if the first region is the selected region, the first region may remain the selected region for the duration of the operation of the movable object). The gimbals associated with the various regions may be fixed, or may be changed. For instance, a first gimbal may be associated with a first region, which may be a selected region. A user may make an adjustment so that a second gimbal becomes associated with the first region, and data associated with the second gimbal is depicted in the first region. Alternatively, the selected region may change (e.g., if a first region is initially the selected region, a user may select a second region as the selected region, which will cause the first region to become a non-selected region).

The user interface 2700 may also show an additional region, such as a third region 2703. The third region may show a geographic map. The geographic map may show a location within the movable object is located. The movable object may be visually depicted on the map. For instance, an icon may be provided on the map, representative of the location of the movable object within the geographic area. As the movable object moves through the area, the location of the movable object may be updated to correspond to the actual geographic location of the movable object. A visual representation of the movable object may or may not show a heading of the movable object. For example, an icon, such as an arrow, may be used for the movable object. An arrow may point in a direction that the movable object is heading. The map may be useful so that a user can simultaneously view the data associated with the gimbals, such as the image data, and the map data. Thus, the user may get a sense of how the data collected by the multiple gimbals relates to a movable object's location within an environment. In some embodiments, the map may be expanded as described in greater detail elsewhere herein.

As previously mentioned, other information or controls may be provided. An indication of automatic focus/manual focus (AF/MF) 2706 may be provided. In some embodiments, a user may select an automatic focus or manual focus using controls. Additional information 2708 such as positional and/or movement may information may be provided. For instance, a distance, horizontal speed (HS), height, and/or vertical speed (VS) may be provided.

Figure 28:
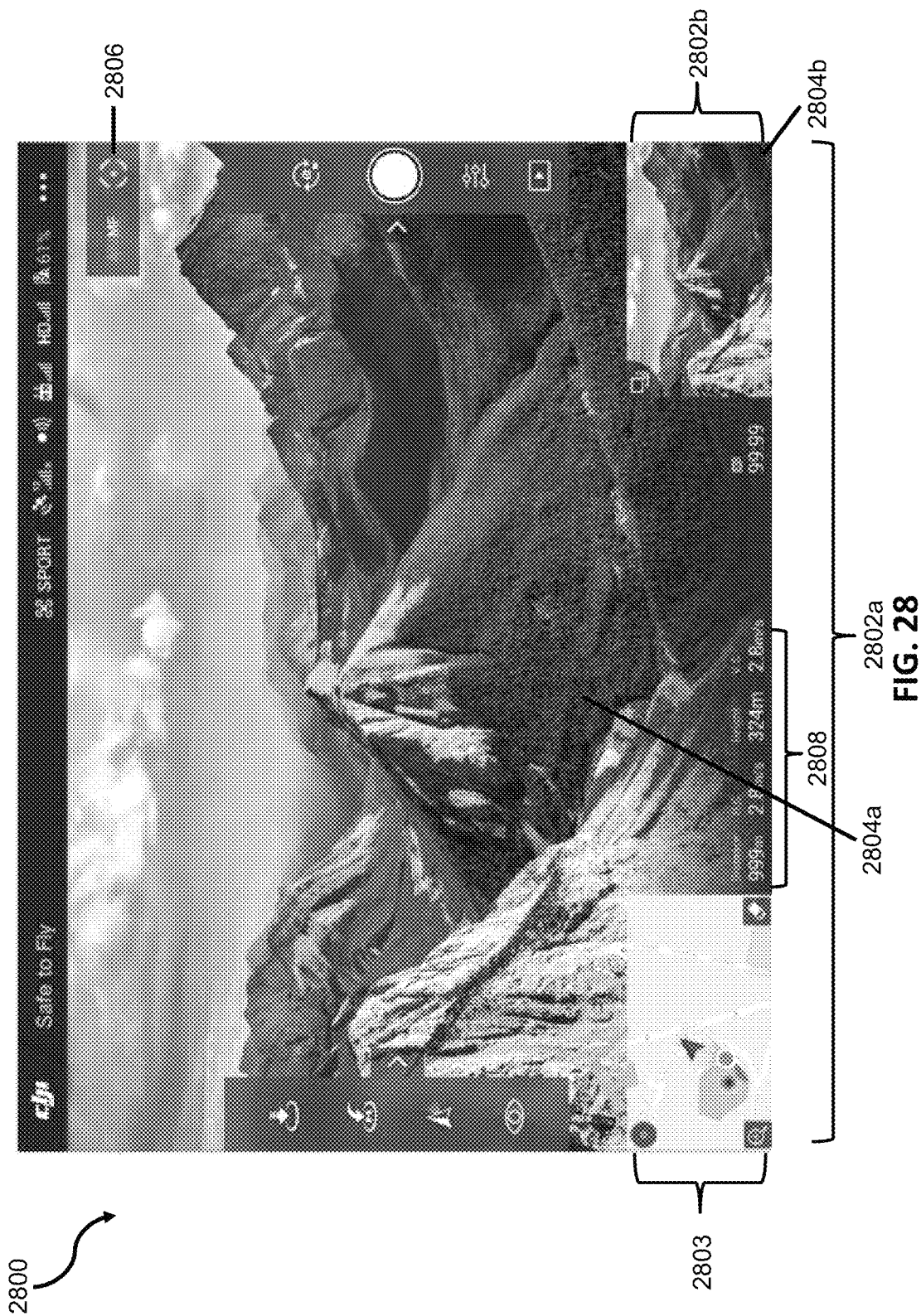
FIG. 28 shows another example of a user interface, in accordance with embodiments of the disclosure.

FIG. 28 shows another example of a user interface, in accordance with embodiments of the disclosure. A user interface 2800 may comprise a first region 2802a and a second region 2802b. Each region may show data associated with a respective gimbal 2804a, 2804b. In some embodiments, a third region 2803 showing a geographical map may be provided. Additional information such as automatic focusing/manual focusing (AF/MF) 2806, or position/movement data 2808 may be provided.

In some embodiments, the user interface 2800 may comprise a first region 2802a and a second region 2802b. Any number of regions may be provided. The number of regions may correspond to the number of gimbals. For instance, when two gimbals are carried by a movable object, two regions may be provided. The regions may have any visual characteristic or relationship to one another. In some embodiments, the regions may be different sizes and one of the regions may be within another region. For instance, a second region may be smaller than a first region and may be shown within the first region. For example, the second region may be shown in a corner of the first region (e.g., lower right corner, lower left corner, upper left corner, or upper right corner).

Each region 2802a, 2802b may show data 2804a, 2804b associated with a respective gimbal. For example, a first region may show image data from a first payload of a first gimbal, and a second region may show image data from a second payload of a second gimbal.

The user interface as depicted may be used for independent mode and simultaneous mode. The arrangement of regions as depicted may be used for both independent mode and simultaneous mode. Alternatively, the user interface as depicted may be used for independent mode only or simultaneous mode only. For instance, the arrangement of regions depicted may be used for independent mode but not for simultaneous mode, or for simultaneous mode but not for independent mode.

In some embodiments, the user interface depicted in FIG. 27 may be used for independent mode, and the user interface depicted in FIG. 28 may be used for simultaneous mode.

As previously described, when in an independent mode, a user may interact with the first region or the second region. The user may interact with both the first region and the second region. The user may interact with the first region and the second region at different times. The user may interact with the first region and the second region at the same time. A user interaction with a single region may cause control of a single corresponding gimbal. Non-corresponding gimbals may not react to the user interaction with the region. Interacting with the first region may affect the data shown in the first region. For example, the user may drag a first image in the first region. This may also affect operation of the first gimbal and/or first payload. Interacting with the second region may affect the data shown in the second region. For example, the user may drag a second image in the second region. This may also affect operation of the second gimbal and/or second payload. The user may be able to independently interact with the first region without affecting the data shown in the second region, and/or interact with the second region without affecting the data shown in the first region, when in the independent mode.

When in a simultaneous mode, a user may interact with both the first region and the second region, or with only a single selected region of the first and second regions. A user interaction with a single region may cause control of multiple gimbals. In some embodiments, all supported gimbals may respond to the user interaction with the single region. In some embodiments, the user may interact with both the first region and the second region. The user may interact with the first region and the second region at different times. Interacting with the first region may affect the data shown in the first region and the second region. For example, the user may drag a first image in the first region. This may cause a corresponding movement by the second image in the second region. This may also affect operation of the first gimbal and/or first payload, as well as the second gimbal and/or second payload. The first gimbal and/or first payload, and the second gimbal and/or second payload may operate in a duplicate fashion. Interacting with the second region may affect the data shown in the second region and the first region. For example, the user may drag a second image in the second region. This may also affect operation of the second gimbal and/or second payload, as well as the first gimbal and/or first payload. The second gimbal and/or second payload, and the first gimbal and/or first payload may operate in a duplicate fashion.

In some embodiments, a user may interact with only a single selected region of the first and second regions. When interacting with the selected region, both the first and second gimbals and/or respective payloads may be affected. When interacting with the selected region, data shown in the selected region and the non-selected region may both be affected. The data shown in the selected and non-selected regions may be affected in the same way. When interacting with the non-selected region, data shown in neither the non-selected region nor the selected region may be affected. For example, if the first region is the selected region, interacting with the first region may cause the first and second gimbals and/or associated first and second payloads to operate in a duplicative fashion. Interacting with the second region may cause no reaction by the first and second gimbals and/or associated first and second payloads. The selected region may remain fixed (e.g., if the first region is the selected region, the first region may remain the selected region for the duration of the operation of the movable object). The gimbals associated with the various regions may be fixed, or may be changed. For instance, a first gimbal may be associated with a first region, which may be a selected region. A user may make an adjustment so that a second gimbal becomes associated with the first region, and data associated with the second gimbal is depicted in the first region. The user may select a smaller image (e.g., second region) to toggle so that the data in the second region is moved to the larger first region. Alternatively, the selected region may change (e.g., if a first region is initially the selected region, a user may select a second region as the selected region, which will cause the first region to become a non-selected region).

The user interface 2800 may also show an additional region, such as a third region 2803. The third region may show a geographic map. The geographic map may show a location within the movable object is located. The movable object may be visually depicted on the map. For instance, an icon may be provided on the map, representative of the location of the movable object within the geographic area. As the movable object moves through the area, the location of the movable object may be updated to correspond to the actual geographic location of the movable object. A visual representation of the movable object may or may not show a heading of the movable object. For example, an icon, such as an arrow, may be used for the movable object. An arrow may point in a direction that the movable object is heading. The map may be useful so that a user can simultaneously view the data associated with the gimbals, such as the image data, and the map data. Thus, the user may get a sense of how the data collected by the multiple gimbals relates to a movable object's location within an environment. In some embodiments, the map may be expanded as described in greater detail elsewhere herein.

As previously mentioned, other information or controls may be provided. An indication of automatic focus/manual focus (AF/MF) 2806 may be provided. In some embodiments, a user may select an automatic focus or manual focus using controls. Additional information 2808 such as positional and/or movement may information may be provided. For instance, a distance, horizontal speed (HS), height, and/or vertical speed (VS) may be provided.

As described elsewhere herein, a split screen (e.g., FIG. 27) arrangement and a picture-in-picture arrangement (e.g., FIG. 28) may each be capable of operating in an independent mode and in a simultaneous mode. In another example, a split screen arrangement may be used for independent mode only and a switch may occur to a picture-in-picture arrangement when operating in a simultaneous mode, or vice versa.

Figure 29:
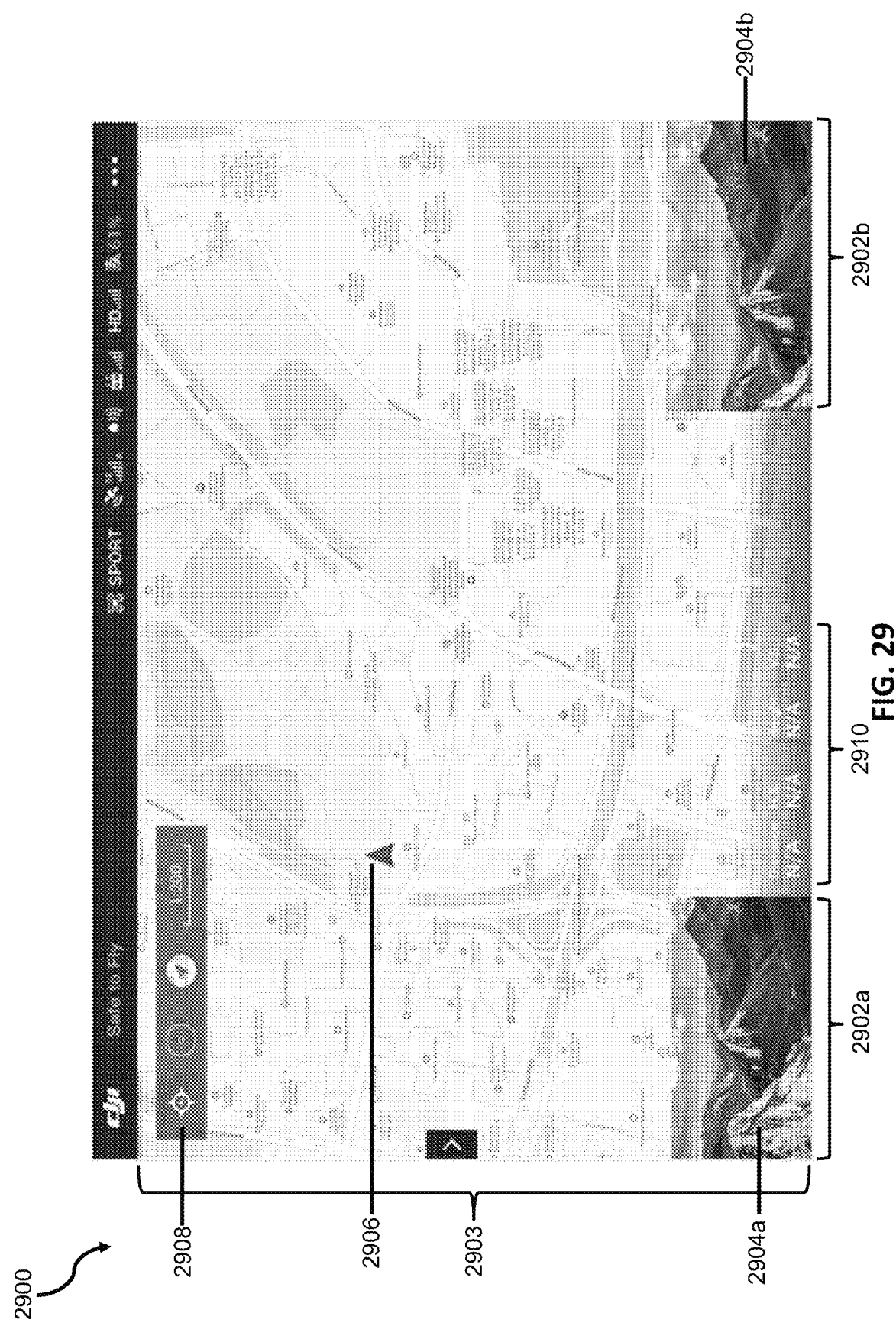
FIG. 29 shows an example of a user interface when operating in a map mode, in accordance with embodiments of the disclosure.

FIG. 29 shows an example of a user interface when operating in a map mode, in accordance with embodiments of the disclosure. A user interface 2900 may include an expanded map region 2903 and one or more condensed gimbal regions 2902a, 2902b. The gimbal regions may show data 2904a, 2904b associated with corresponding gimbals. In the expanded map mode, additional details about the map may be shown. A marker 2906 may show a location of the movable object on the map. Various controls 2908 and/or position/movement information 2910 may be provided.

A user may enter a map mode from a gimbal control mode. The user may tap or touch a reduce map when in the gimbal control mode. This may cause the map to expand into the map mode and for the gimbal regions to be reduced. The user may still directly interact with the gimbals while in the map mode. Alternatively, the user may tap or press the gimbal regions to return to the gimbal control mode to show the larger images corresponding to the gimbals.

The expanded map region 2903 may show a larger map view. In some instances, additional details may be shown on the expanded map view, such as street names, building names, business names, landmarks, and/or additional details about streets building, or other features. The expanded map may cover a larger geographic area compared to a collapsed map.

A visual marker 2906 may show a location of the movable object in the map. The location of the visual marker for the movable object in the map may correspond to a location of the movable object in the corresponding geographic location. The location of the movable object on the map may be updated as the movable object traverses the geographic area.

In some instances, the area shown on the map may be updated as the movable object moves, so that the movable object remains on the map, even as it traverses different locations.

The visual marker may be any visual representation of the movable object. The visual marker may show a location of the movable object. The visual marker may also show a heading of the movable object. The visual marker may show a direction in which the movable object is traveling. For instance, the visual marker may be an arrow that is pointing in a direction that the movable object is traveling.

One or more map controls 2908 may be provided which may allow the user to interact with the map. For example, the map controls may include return to current position, compass, map switch, and/or scale. When a user selects a return to current position option, a movable object may return to a selected location. The selected location may be a location of a remote controller. The selected location may be a pre-defined 'home' location. The selected location may be a location at which the movable object took off. The selected location may or may not be shown on the map. If the selected location is outside the range of the map, it may not be shown on the map. As the movable object returns to the selected location, the map may be updated so that the selected location comes into view. A compass may show directions, such as north, south, east, and/or west relative to the map. A map switch may allow a user to switch views between a satellite map and a plain street map. The scale may allow a user to adjust the scale (e.g., zoom in and/or out). A user may or may not directly interact with the map. For example, a user may touch and drag a map. A user may pinch in and/or out to zoom in and/or out, respectively.

The map may show positional and/or movement information 2910. For example, information such as distance, horizontal speed, height, and/or vertical speed may be shown.

In some embodiments, gimbal regions 2902a, 2902b may be shown. The gimbal regions may be smaller than the map region when the user interface is in a map mode. The gimbal regions may be provided at corners of the map region (e.g., lower left and right corners, or upper left and right corners) when the user interface is in a map mode. Each gimbal region may show data associated with a corresponding gimbal 2904a, 2904b. For example, each gimbal region may show image data captured by a payload supported by the corresponding gimbal. For example, a first region 2902a may show image data 2904a captured by a payload of the first gimbal, and a second region 2902b may show image data 2904b captured by a payload of the second gimbal.

The user interface 2900 as depicted may be used in independent mode and/or simultaneous mode. In some embodiments, a user may interact with the gimbal regions 2902a, 2902b while the user interface is in a map mode to control the corresponding gimbals. When in an independent mode, the user may interact with a first region to control operation of a first gimbal and/or first payload without controlling operation of a second gimbal and/or second payload. When in the independent mode, the user may interact with a second region to control operation of a second gimbal and/or second payload without controlling operation of a first gimbal and/or first payload. The user may interact with the first and second regions at different times, or at the same time.

When in a simultaneous mode, the user may interact with a first region to control operation of a first gimbal and/or first payload and to provide duplicate control of a second gimbal and/or second payload. When in the simultaneous mode, the user may interact with a second region to control operation of a second gimbal and/or second payload and to provide duplicate control of a first gimbal and/or first payload. In some instances, the user may only interact with one of the first or second region to control both the first and second gimbals and/or payloads in a synchronized manner. This may be the selected region.

Figure 30:
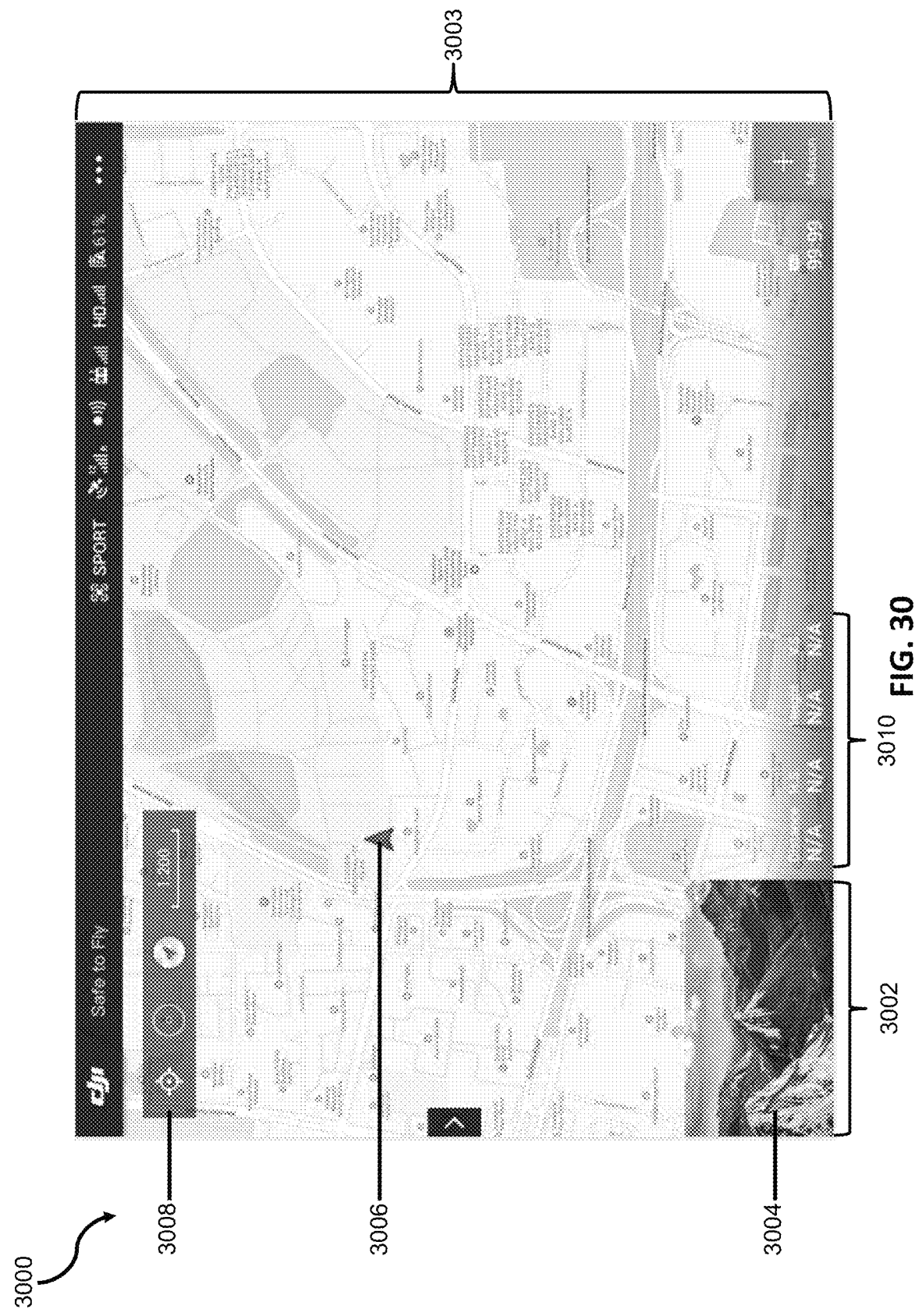
FIG. 30 shows another example of a user interface when operating in a map mode, in accordance with embodiments of the disclosure.

FIG. 30 shows another example of a user interface when operating in a map mode, in accordance with embodiments of the disclosure. A user interface 3000 may include an expanded map region 3003 and a condensed gimbal region 3002. The gimbal region may show data 3004 associated with corresponding gimbals. In the expanded map mode, additional details about the map may be shown. A marker 3006 may show a location of the movable object on the map. Various controls 3008 and/or position/movement information 3010 may be provided.

The expanded map region 3003 may show a larger map view. In some instances, additional details may be shown on the expanded map view, such as street names, building names, business names, landmarks, and/or additional details about streets building, or other features. The expanded map may cover a larger geographic area compared to a collapsed map.

A visual marker 3006 may show a location of the movable object in the map. The location of the visual marker for the movable object in the map may correspond to a location of the movable object in the corresponding geographic location. The location of the movable object on the map may be updated as the movable object traverses the geographic area. In some instances, the area shown on the map may be updated as the movable object moves, so that the movable object remains on the map, even as it traverses different locations.

The visual marker may be any visual representation of the movable object. The visual marker may show a location of the movable object. The visual marker may also show a heading of the movable object. The visual marker may show a direction in which the movable object is traveling. For instance, the visual marker may be an arrow that is pointing in a direction that the movable object is traveling.

One or more map controls 3008 may be provided which may allow the user to interact with the map. For example, the map controls may include return to current position, compass, map switch, and/or scale. When a user selects a return to current position option, a movable object may return to a selected location. The selected location may be a location of a remote controller. The selected location may be a pre-defined 'home' location. The selected location may be a location at which the movable object took off. The selected location may or may not be shown on the map. If the selected location is outside the range of the map, it may not be shown on the map. As the movable object returns to the selected location, the map may be updated so that the selected location comes into view. A compass may show directions, such as north, south, east, and/or west relative to the map. A map switch may allow a user to switch views between a satellite map and a plain street map. The scale may allow a user to adjust the scale (e.g., zoom in and/or out). A user may or may not directly interact with the map. For example, a user may touch and drag a map. A user may pinch in and/or out to zoom in and/or out, respectively.

The map may show positional and/or movement information 3010. For example, information such as distance, horizontal speed, height, and/or vertical speed may be shown.

In some embodiments, a gimbal region 3002 may be shown. The gimbal region may be smaller than the map region when the user interface is in a map mode. The gimbal region may be provided at a corner of the map region (e.g., lower left corner, lower right corner, upper left corner, or upper right corner) when the user interface is in a map mode. The gimbal region may show data associated with a corresponding gimbal 3004. For example, the gimbal region may show image data captured by a payload supported by the corresponding gimbal.

The user interface 3000 as depicted may be used in independent mode and/or simultaneous mode. In some embodiments, a user may interact with the gimbal region 3002 while the user interface is in a map mode to control the corresponding gimbals. When in an independent mode, the user may interact with a region to control operation of a first gimbal and/or first payload without controlling operation of a second gimbal and/or second payload. If the user wishes to control a second gimbal and/or second payload, the user may select a function to toggle the image shown in the gimbal region to be a second image captured by a second payload, the user may then interact with the region to control operation of a second gimbal and/or second payload without controlling operation of a first gimbal and/or first payload. The user may toggle between controlling the first gimbal and the second gimbal, through the same region.

When in a simultaneous mode, the user may interact with the region to control operation of both the first and second gimbals, and/or associated payloads. The data shown in the region may be data associated with the first gimbal and/or payload, or data associated with the second gimbal and/or payload. The user may optionally toggle or select which gimbal and/or payload data is being displayed in the gimbal region. Alternatively, there may be a pre-assigned gimbal and/or payload that may not be changed (e.g., the first gimbal and/or payload is always shown).

In some embodiments, the user interface depicted in FIG. 29 may be used for independent mode, and the user interface depicted in FIG. 30 may be used for simultaneous mode.

As previously described a variety of controls may be used to select and/or control the activities of the gimbals. One or more technique may be used to select a gimbal to be controlled. A single gimbal may be selected at a time to be controlled or multiple gimbals may be controlled simultaneously. For example, a gimbal may be selected by clicking or touching data associated with the gimbal in a region. For instance, a user may touch image data from a particular gimbal. The user may touch the data in either region. Alternatively, the user may touch the data in a non-selected region to cause the region to be selected or to move the data into a selected region. In another example, a user may select a gimbal by dragging the corresponding data (e.g., image) into a selected region. In another example, a user may select a gimbal by operating mechanical controls mounted onto a remote controller. For instance, a user may flip a switch, press a button, turn a dial or knob, move a slider, toggle a joystick, or perform any other action to select a gimbal.

Once one or more gimbals have been selected, the gimbal may be controlled in any manner. For example, a user may control operations of a gimbal (e.g., gimbal angle) by touching the data and dragging the data on a touchscreen. For instance, a user may touch an image on a touchscreen and drag the image. The gimbal may make motions corresponding to the user dragging action. A user may make use of one or more virtual interactive tools on a touchscreen. For instance, a user may use a floating virtual joystick to control operation of the gimbals. Other virtual tools, such as virtual switches, sliders, buttons, keys, knobs, or dials may be used. In another example, a user may operate a gimbal by operating mechanical controls mounted on a remote controller. For instance, a user may move a joystick, flip a switch, press a button, turn a dial or knob, move a slider, or perform any other action to control a gimbal.

FIG. 34, illustrates examples of a remote controller 3400 that may be used to control a gimbal, in accordance with embodiments of the disclosure. For example, as described, mechanical control may be used to control a gimbal. A toggle switch may be used to control an axis of gimbal control. For instance, the toggle switch may be formed of functional buttons 3402. The functional buttons may be used to switch between different axes to control. In one example, pressing a first button may allow for control of orientation of the gimbal about a pitch axis, while pressing a second button may allow for control of orientation of the gimbal about a yaw axis. In some instances a roll axis may be automatically adjusted without requiring a user to provide any input for the roll axis. A dial wheel 3404 may bused to control the angle of the gimbal. For instance, a user may select a pitch axis using a functional button, and then adjust the degree of angular pitch rotation using the dial. The user may select a yaw axis using a functional button, and then adjust the degree of angular yaw rotation using the dial.

As described elsewhere herein, one or more carriers, such as gimbals, may be attached and/or detached from the movable object at corresponding interfaces. Also, as described elsewhere herein, the payloads may or may not be attached and/or detached from the gimbals. In some embodiments, the gimbals may be fixed to the movable object, but the payloads may be releasably coupled the gimbals. The gimbals may be permanently affixed to the movable object or may require tools to remove the gimbals from the movable object. In some instances, the gimbals may be releasably coupled with the movable object, but the payloads may also be releasably coupled with the gimbals.

Any description herein of gimbal attachment and/or detachment may be applied to payload attachment and/or detachment from the gimbals. Any description herein of interfaces between a gimbal and movable object (or platform) may be applied for interfaces between the gimbal and payload. For example, any of the coupling assemblies described herein may apply to interfaces between the gimbal and payload. A quick-release mechanism may be employed to attach the payload to the gimbal. For instance, a payload may undergo a first motion to be partially connected to the gimbal, and may undergo a second motion to be securely locked to the gimbal. Any description herein of power and/or communications that may be provided between the gimbal and/or base support may also apply to power and/or communications that may be provided between the payload and the gimbal, or the payload and the base support. For instance, power may be provided to the payload through the gimbal upon attachment of the payload to the gimbal. Communications between the payload and the gimbal may be provided upon attachment of the payload to the gimbal. For instance, the power and/or communications may be provided upon confirmation that the payload is securely locked to the gimbal. The communications between the payload and gimbal may include instructions to the payload to control operation of the payload, and information from the payload about the payload (e.g., payload type, payload specs, payload status, etc.). The payload may automatically provide information about the payload upon being attached to the gimbal. For instance, the payload may push information about a payload type upon being attached to the gimbal.

Any other power and/or communication variations as described for the gimbal may also be applied to the payload.

Further advantages of using a multi-gimbal (e.g., dual gimbal) configuration may be that work efficiency of the UAV may be multiplied. For example, on a single pass, the UAV may be able to collect an amount of data that is increase by a multiplier factor based on the number of gimbals in the multi-gimbal system. For instance, the work efficiency may be doubled when two gimbals are employed. The work efficiency may be tripled three gimbals are employed. On a single pass the UAV may be able to collect as much data that may otherwise require two or more passes. This may be advantageous to save time. This may also be advantageous when it is desired to use the same vantage point to collect multiple sets of data. For instance, if it desired for the UAV to collect two sets of data from the same vantage point, the UAV can do this simultaneously using the two gimbals, without having to worry about flying a second pass that needs to be identical to the first pass. This may also be advantageous to save battery life. By reducing the number of passes, the UAV may be able to get more work done using a fewer number of battery charges.

Additional advantages of using a multi-gimbal (e.g., dual gimbal) configuration may be that different types of gimbals may be employed. The user may be able to switch between gimbals for each of the multiple gimbal interfaces. This may provide an exponential level of security. For example, if a UAV had only a single gimbal interface, the user may only be able to switch a single gimbal (e.g., between gimbal type 1 and gimbal type 2). When the UAV has dual gimbal interfaces, the user may be make different combinations of gimbals. For example, if the user switches between gimbal type 1 and gimbal type 2 in the first interface and gimbal type 3 and gimbal type 4 in the second interface, any combination of gimbals may be used—e.g., gimbal type 1+ gimbal type 3, gimbal type 1+ gimbal type 4, gimbal type 2+ gimbal type 3, gimbal type 2+ gimbal type 4, etc. This may provide vastly increase flexibility on the type of data that may be collected during a single pass of the movable object. As mentioned, different types of gimbals may be used. For instance, a user may employ a visible light and an infrared camera. A user may be able to view both visible images and an infrared image while the movable object is in motion, without having to stop the movable object and change the gimbal. Using these different types of gimbals may be useful in both independent and simultaneous mode.

Allowing flexibility of various types of gimbals may also provide the synergistic effect of allowing combinations of gimbals that may enable or enhance the operation of one another. In some instances, an operation of a first gimbal may be improved or enabled by the coupled use of the second gimbal. For example, if the first gimbal is a visible light camera and the environment is dim, the second gimbal may be a light source, that may help the first gimbal capture images. In another example, a first gimbal may be a robotic arm and a second gimbal may be a visible light camera, that may allow the user to see from the perspective of the movable object, what the robotic arm is doing and aid the user in manipulating the robotic arm.

In some embodiments, each gimbal may be of the same type or different types. Even when the gimbals are of the same type, the ability to change between independent and simultaneous modes may provide increased functionality. For example, if both a first and second gimbal are useful for visible light imaging, the gimbals may be independently controlled so that one of the gimbals can track a moving object while another gimbal can rotate to inspect an environment. In some embodiments, one or more of the gimbals may be able to engage in autotracking. The gimbals may automatically adjust the orientation of the payload to track a selected target. Auto-tracking may occur without requiring manual user intervention to track the target. Auto-tracking may occur while a user manually controls movement of the movable object but not motions of the gimbals. Any tracking mechanism may be used, including but not limited to tracking systems and methods described in U.S. Pat. No. 9,164,506, which is hereby incorporated by reference in its entirety. The use of multiple gimbals may allow auto-tracking of a first target with one gimbal while the user actively controls the second gimbal to scan an environment. In another instance, the use of multiple gimbals may allow auto-tracking of multiple targets independently. This may advantageously allow the automated tracking of multiple targets even when the targets move separately from one another and/or diverge. The ability to switch to a simultaneous mode may be advantageous when the separated motion is not required and the user does not wish to expend as much effort in controlling both gimbals. For instance, the user may wish to focus on flying the movable object and not wish to worry about controlling both gimbals. The user may select a simultaneous mode to control both gimbals together. In some instances, it may be advantageous for the gimbals to be oriented and moving together. For instance, if different types of gimbals are used, it may be desirable to capture different types of information about a particular target or portions of the environment from the same vantage point.

In some embodiments, the range of motion by each of the gimbals may be side. This may advantageously allow a user to experience the full range of motion for each of the gimbals, which would allow greater range of detection and activity, compared to a single gimbal, or a single gimbal and a FPV camera of a movable object. The detachability of each of the multiple gimbals may also provide an increased flexibility.

The systems and methods provided herein may also advantageously provide a simplified plug-and-play arrangement. A user may easily attach and detach the various gimbals to the movable object. The user need not perform any specialized steps for the different gimbals. The movable object and gimbals may automatically communicate with one another to accommodate the different gimbal types. This may advantageously make the arrangement easy to use and allow relatively novice users to operate the movable object with the various gimbals, and exchange various gimbals.

The systems and methods described herein can be implemented by and/or applied to a wide variety of movable objects. The systems, devices, and methods described herein can be applied to a wide variety of movable objects. As previously mentioned, any description herein of an aerial vehicle may apply to and be used for any movable object. A movable object of the present disclosure can be configured to move within any suitable environment, such as in air (e.g., a fixed-wing aircraft, a rotary-wing aircraft, or an aircraft having neither fixed wings nor rotary wings), in water (e.g., a ship or a submarine), on ground (e.g., a motor vehicle, such as a car, truck, bus, van, motorcycle; a movable structure or frame such as a stick, fishing pole; or a train), under the ground (e.g., a subway), in space (e.g., a spaceplane, a satellite, or a probe), or any combination of these environments. The movable object can be a vehicle, such as a vehicle described elsewhere herein. In some embodiments, the movable object can be mounted on a living subject, such as a human or an animal. Suitable animals can include primates, avines, canines, felines, equines, bovines, ovines, porcines, delphines, rodents, or insects.

The movable object may be capable of moving freely within the environment with respect to six degrees of freedom (e.g., three degrees of freedom in translation and three degrees of freedom in rotation). Alternatively, the movement of the movable object can be constrained with respect to one or more degrees of freedom, such as by a predetermined path, track, or orientation. The movement can be actuated by any suitable actuation mechanism, such as an engine or a motor. The actuation mechanism of the movable object can be powered by any suitable energy source, such as electrical energy, magnetic energy, solar energy, wind energy, gravitational energy, chemical energy, nuclear energy, or any suitable combination thereof. The movable object may be self-propelled via a propulsion system, as described elsewhere herein. The propulsion system may optionally run on an energy source, such as electrical energy, magnetic energy, solar energy, wind energy, gravitational energy, chemical energy, nuclear energy, or any suitable combination thereof. Alternatively, the movable object may be carried by a living being.

In some instances, the movable object can be a vehicle. Suitable vehicles may include water vehicles, aerial vehicles, space vehicles, or ground vehicles. For example, aerial vehicles may be fixed-wing aircraft (e.g., airplane, gliders), rotary-wing aircraft (e.g., helicopters, rotorcraft), aircraft having both fixed wings and rotary wings, or aircraft having neither (e.g., blimps, hot air balloons). A vehicle can be self-propelled, such as self-propelled through the air, on or in water, in space, or on or under the ground. A self-propelled vehicle can utilize a propulsion system, such as a propulsion system including one or more engines, motors, wheels, axles, magnets, rotors, propellers, blades, nozzles, or any suitable combination thereof. In some instances, the propulsion system can be used to enable the movable object to take off from a surface, land on a surface, maintain its current position and/or orientation (e.g., hover), change orientation, and/or change position.

The movable object can be controlled remotely by a user or controlled locally by an occupant within or on the movable object. In some embodiments, the movable object is an unmanned movable object, such as a UAV. An unmanned movable object, such as a UAV, may not have an occupant onboard the movable object. The movable object can be controlled by a human or an autonomous control system (e.g., a computer control system), or any suitable combination thereof. The movable object can be an autonomous or semi-autonomous robot, such as a robot configured with an artificial intelligence.

The movable object can have any suitable size and/or dimensions. In some embodiments, the movable object may be of a size and/or dimensions to have a human occupant within or on the vehicle. Alternatively, the movable object may be of size and/or dimensions smaller than that capable of having a human occupant within or on the vehicle. The movable object may be of a size and/or dimensions suitable for being lifted or carried by a human. Alternatively, the movable object may be larger than a size and/or dimensions suitable for being lifted or carried by a human. In some instances, the movable object may have a maximum dimension (e.g., length, width, height, diameter, diagonal) of less than or equal to about: 2 cm, 5 cm, 10 cm, 50 cm, 1 m, 2 m, 5 m, or 10 m. The maximum dimension may be greater than or equal to about: 2 cm, 5 cm, 10 cm, 50 cm, 1 m, 2 m, 5 m, or 10 m. For example, the distance between shafts of opposite rotors of the movable object may be less than or equal to about: 2 cm, 5 cm, 10 cm, 50 cm, 1 m, 2 m, 5 m, or 10 m. Alternatively, the distance between shafts of opposite rotors may be greater than or equal to about: 2 cm, 5 cm, 10 cm, 50 cm, 1 m, 2 m, 5 m, or 10 m.

In some embodiments, the movable object may have a volume of less than 100 cm×100 cm×100 cm, less than 50 cm×50 cm×30 cm, or less than 5 cm×5 cm×3 cm. The total volume of the movable object may be less than or equal to about: 1 $cm^3$, 2 $cm^3$, 5 $cm^3$, 10 $cm^3$, 20 $cm^3$, 30 $cm^3$, 40 $cm^3$, 50 $cm^3$, 60 $cm^3$, 70 $cm^3$, 80 $cm^3$, 90 $cm^3$, 100 $cm^3$, 150 $cm^3$, 200 $cm^3$, 300 $cm^3$, 500 $cm^3$, 750 $cm^3$, 1000 $cm^3$, 5000 $cm^3$, 10,000 $cm^3$, 100,000 $cm^3$, 1 $m^3$, or 10 $m^3$. Conversely, the total volume of the movable object may be greater than or equal to about: 1 $cm^3$, 2 $cm^3$, 5 $cm^3$, 10 $cm^3$, 20 $cm^3$, 30 $cm^3$, 40 $cm^3$, 50 $cm^3$, 60 $cm^3$, 70 $cm^3$, 80 $cm^3$, 90 $cm^3$, 100 $cm^3$, 150 $cm^3$, 200 $cm^3$, 300 $cm^3$, 500 $cm^3$, 750 $cm^3$, 1000 $cm^3$, 5000 $cm^3$, 10,000 $cm^3$, 100,000 $cm^3$, 1 $m^3$, or 10 $m^3$.

In some embodiments, the movable object may have a footprint (which may refer to the lateral cross-sectional area encompassed by the movable object) less than or equal to about: 32,000 $cm^2$, 20,000 $cm^2$, 10,000 $cm^2$, 1,000 $cm^2$, 500 $cm^2$, 100 $cm^2$, 50 $cm^2$, 10 $cm^2$, or 5 $cm^2$. Conversely, the footprint may be greater than or equal to about: 32,000 $cm^2$, 20,000 $cm^2$, 10,000 $cm^2$, 1,000 $cm^2$, 500 $cm^2$, 100 $cm^2$, 50 $cm^2$, 10 $cm^2$, or 5 $cm^2$.

In some instances, the movable object may weigh no more than 1000 kg. The weight of the movable object may be less than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg. Conversely, the weight may be greater than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg.

In some embodiments, a movable object may be small relative to a load carried by the movable object. The load may include a payload and/or a carrier, as described in further detail below. In some examples, a ratio of a movable object weight to a load weight may be greater than, less than, or equal to about 1:1. In some instances, a ratio of a movable object weight to a load weight may be greater than, less than, or equal to about 1:1. Optionally, a ratio of a carrier weight to a load weight may be greater than, less than, or equal to about 1:1. When desired, the ratio of an movable object weight to a load weight may be less than or equal to: 1:2, 1:3, 1:4, 1:5, 1:10, or even less. Conversely, the ratio of a movable object weight to a load weight can also be greater than or equal to: 2:1, 3:1, 4:1, 5:1, 10:1, or even greater.

In some embodiments, the movable object may have low energy consumption. For example, the movable object may use less than about: 5 W/h, 4 W/h, 3 W/h, 2 W/h, 1 W/h, or less. In some instances, a carrier of the movable object may have low energy consumption. For example, the carrier may use less than about: 5 W/h, 4 W/h, 3 W/h, 2 W/h, 1 W/h, or less. Optionally, a payload of the movable object may have low energy consumption, such as less than about: 5 W/h, 4 W/h, 3 W/h, 2 W/h, 1 W/h, or less.

In some embodiments, the movable object can be configured to carry a load. The load can include one or more of passengers, cargo, equipment, instruments, and the like. The load can be provided within a housing. The housing may be separate from a housing of the movable object, or be part of a housing for a movable object. Alternatively, the load can be provided with a housing while the movable object does not have a housing. Alternatively, portions of the load or the entire load can be provided without a housing. The load can be rigidly fixed relative to the movable object. Optionally, the load can be movable relative to the movable object (e.g., translatable or rotatable relative to the movable object).

In some embodiments, the load includes a payload. The payload can be configured not to perform any operation or function. Alternatively, the payload can be a payload configured to perform an operation or function, also known as a functional payload. For example, the payload can include one or more sensors for surveying one or more targets. Any suitable sensor can be incorporated into the payload, such as an image capture device (e.g., a camera), an audio capture device (e.g., a parabolic microphone), an infrared imaging device, or an ultraviolet imaging device. The sensor can provide static sensing data (e.g., a photograph) or dynamic sensing data (e.g., a video). In some embodiments, the sensor provides sensing data for the target of the payload. Alternatively or in combination, the payload can include one or more emitters for providing signals to one or more targets. Any suitable emitter can be used, such as an illumination source or a sound source. In some embodiments, the payload includes one or more transceivers, such as for communication with a module remote from the movable object. Optionally, the payload can be configured to interact with the environment or a target. For example, the payload can include a tool, instrument, or mechanism capable of manipulating objects, such as a robotic arm.

Optionally, the load may include a carrier. The carrier can be provided for the payload and the payload can be coupled to the movable object via the carrier, either directly (e.g., directly contacting the movable object) or indirectly (e.g., not contacting the movable object). Conversely, the payload can be mounted on the movable object without requiring a carrier. The payload can be integrally formed with the carrier. Alternatively, the payload can be releasably coupled to the carrier. In some embodiments, the payload can include one or more payload elements, and one or more of the payload elements can be movable relative to the movable object and/or the carrier, as described above.

The carrier can be integrally formed with the movable object. Alternatively, the carrier can be releasably coupled to the movable object. The carrier can be coupled to the movable object directly or indirectly. The carrier can provide support to the payload (e.g., carry at least part of the weight of the payload). The carrier can include a suitable mounting structure (e.g., a gimbal platform) capable of stabilizing and/or directing the movement of the payload. In some embodiments, the carrier can be adapted to control the state of the payload (e.g., position and/or orientation) relative to the movable object. For example, the carrier can be configured to move relative to the movable object (e.g., with respect to one, two, or three degrees of translation and/or one, two, or three degrees of rotation) such that the payload maintains its position and/or orientation relative to a suitable reference frame regardless of the movement of the movable object. The reference frame can be a fixed reference frame (e.g., the surrounding environment). Alternatively, the reference frame can be a moving reference frame (e.g., the movable object, a payload target).

In some embodiments, the carrier can be configured to permit movement of the payload relative to the carrier and/or movable object. The movement can be a translation with respect to up to three degrees of freedom (e.g., along one, two, or three axes) or a rotation with respect to up to three degrees of freedom (e.g., about one, two, or three axes), or any suitable combination thereof.

In some instances, the carrier can include a carrier frame assembly and a carrier actuation assembly. The carrier frame assembly can provide structural support to the payload. The carrier frame assembly can include individual carrier frame components, some of which can be movable relative to one another. The carrier actuation assembly can include one or more actuators (e.g., motors) that actuate movement of the individual carrier frame components. The actuators can permit the movement of multiple carrier frame components simultaneously, or may be configured to permit the movement of a single carrier frame component at a time. The movement of the carrier frame components can produce a corresponding movement of the payload. For example, the carrier actuation assembly can actuate a rotation of one or more carrier frame components about one or more axes of rotation (e.g., roll axis, pitch axis, or yaw axis). The rotation of the one or more carrier frame components can cause a payload to rotate about one or more axes of rotation relative to the movable object. Alternatively or in combination, the carrier actuation assembly can actuate a translation of one or more carrier frame components along one or more axes of translation, and thereby produce a translation of the payload along one or more corresponding axes relative to the movable object.

In some embodiments, the movement of the movable object, carrier, and payload relative to a fixed reference frame (e.g., the surrounding environment) and/or to each other, can be controlled by a terminal. The terminal can be a remote control device at a location distant from the movable object, carrier, and/or payload. The terminal can be disposed on or affixed to a support platform. Alternatively, the terminal can be a handheld or wearable device. For example, the terminal can include a smartphone, tablet, laptop, computer, glasses, gloves, helmet, microphone, or suitable combinations thereof. The terminal can include a user interface, such as a keyboard, mouse, joystick, touchscreen, or display. Any suitable user input can be used to interact with the terminal, such as manually entered commands, voice control, gesture control, or position control (e.g., via a movement, location or tilt of the terminal). The terminal can be the same remote controller as described previously herein.

The terminal can be used to control any suitable state of the movable object, carrier, and/or payload. For example, the terminal can be used to control the position and/or orientation of the movable object, carrier, and/or payload relative to a fixed reference from and/or to each other. In some embodiments, the terminal can be used to control individual elements of the movable object, carrier, and/or payload, such as the actuation assembly of the carrier, a sensor of the payload, or an emitter of the payload. The terminal can include a wireless communication device adapted to communicate with one or more of the movable object, carrier, or payload.

The terminal can include a suitable display unit for viewing information of the movable object, carrier, and/or payload. For example, the terminal can be configured to display information of the movable object, carrier, and/or payload with respect to position, translational velocity, translational acceleration, orientation, angular velocity, angular acceleration, or any suitable combinations thereof. In some embodiments, the terminal can display information provided by the payload, such as data provided by a functional payload (e.g., images recorded by a camera or other image capturing device).

Optionally, the same terminal may both control the movable object, carrier, and/or payload, or a state of the movable object, carrier and/or payload, as well as receive and/or display information from the movable object, carrier and/or payload. For example, a terminal may control the position of the payload relative to an environment, while displaying image data captured by the payload, or information about the position of the payload. Alternatively, different terminals may be used for different functions. For example, a first terminal may control movement or a state of the movable object, carrier, and/or payload while a second terminal may receive and/or display information from the movable object, carrier, and/or payload. For example, a first terminal may be used to control the positioning of the payload relative to an environment while a second terminal displays image data captured by the payload. Various communication modes may be utilized between a movable object and an integrated terminal that both controls the movable object and receives data, or between the movable object and multiple terminals that both control the movable object and receives data. For example, at least two different communication modes may be formed between the movable object and the terminal that both controls the movable object and receives data from the movable object.

Figure 31:
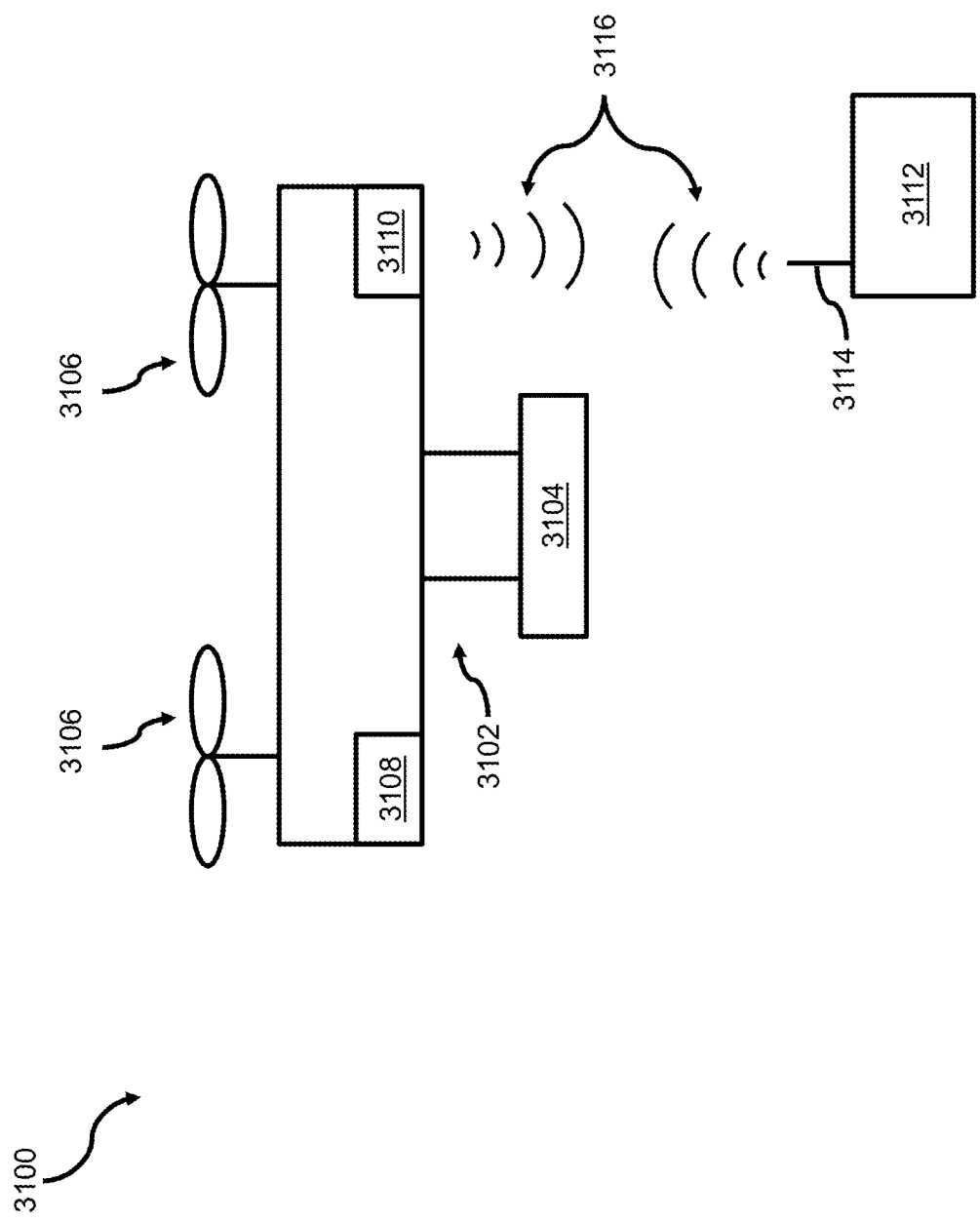
FIG. 31 illustrates a movable object comprising a carrier and a payload, in accordance with embodiments of the disclosure.

In some embodiments, the movable object that supports the imaging device may be a UAV. FIG. 31 illustrates a movable object 3100 including a carrier 3102 and a payload 3104, in accordance with embodiments. Although the movable object 3100 is depicted as an aircraft, this depiction is not intended to be limiting, and any suitable type of movable object can be used, as previously described herein. One of skill in the art would appreciate that any of the embodiments described herein in the context of aircraft systems can be applied to any suitable movable object (e.g., a UAV). In some instances, the payload 3104 may be provided on the movable object 3100 without requiring the carrier 3102. The payload may include one or more imaging devices. The movable object 3100 may include propulsion mechanisms 3106, a sensing system 3108, and a communication system 3110.

Furthermore, while a payload and a single carrier may be illustrated herein, any number of carriers and/or payloads may be carried by a UAV. For instance, the UAV may bear the weight of two or more, three or more, four or more, or five or more carriers (e.g., gimbals), each supporting one or more payloads (e.g., cameras). For example, a dual-camera configuration may be provided as described elsewhere herein.

The propulsion mechanisms 3106 can include one or more of rotors, propellers, blades, engines, motors, wheels, axles, magnets, or nozzles, as previously described. For example, the propulsion mechanisms 3106 may be self-tightening rotors, rotor assemblies, or other rotary propulsion units, as disclosed elsewhere herein. The movable object may have one or more, two or more, three or more, or four or more propulsion mechanisms. The propulsion mechanisms may all be of the same type. Alternatively, one or more propulsion mechanisms can be different types of propulsion mechanisms. The propulsion mechanisms 3106 can be mounted on the movable object 3100 using any suitable means, such as a support element (e.g., a drive shaft) as described elsewhere herein. The propulsion mechanisms 3106 can be mounted on any suitable portion of the movable object 3100, such on the top, bottom, front, back, sides, or suitable combinations thereof.

In some embodiments, the propulsion mechanisms 3106 can enable the movable object 3100 to take off vertically from a surface or land vertically on a surface without requiring any horizontal movement of the movable object 3100 (e.g., without traveling down a runway). Optionally, the propulsion mechanisms 3106 can be operable to permit the movable object 3100 to hover in the air at a specified position and/or orientation. One or more of the propulsion mechanism 3100 may be controlled independently of the other propulsion mechanisms. Alternatively, the propulsion mechanisms 3100 can be configured to be controlled simultaneously. For example, the movable object 3100 can have multiple horizontally oriented rotors that can provide lift and/or thrust to the movable object. The multiple horizontally oriented rotors can be actuated to provide vertical takeoff, vertical landing, and hovering capabilities to the movable object 3100. In some embodiments, one or more of the horizontally oriented rotors may spin in a clockwise direction, while one or more of the horizontally rotors may spin in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object 3100 (e.g., with respect to up to three degrees of translation and up to three degrees of rotation).

The sensing system 3108 can include one or more sensors that may sense the spatial disposition, velocity, and/or acceleration of the movable object 3100 (e.g., with respect to up to three degrees of translation and up to three degrees of rotation). The one or more sensors can include any of the sensors previously described herein, including GPS sensors, motion sensors, inertial sensors, proximity sensors, or image sensors. The sensing data provided by the sensing system 3108 can be used to control the spatial disposition, velocity, and/or orientation of the movable object 3100 (e.g., using a suitable processing unit and/or control module, as described below). Alternatively, the sensing system 3108 can be used to provide data regarding the environment surrounding the movable object, such as weather conditions, proximity to potential obstacles, location of geographical features, location of manmade structures, and the like.

The communication system 3110 enables communication with terminal 3112 having a communication system 3114 via wireless signals 3116. The communication systems 3110, 3114 may include any number of transmitters, receivers, and/or transceivers suitable for wireless communication. The communication may be one-way communication, such that data can be transmitted in only one direction. For example, one-way communication may involve only the movable object 3100 transmitting data to the terminal 3112, or vice-versa. The data may be transmitted from one or more transmitters of the communication system 3110 to one or more receivers of the communication system 3112, or vice-versa. Alternatively, the communication may be two-way communication, such that data can be transmitted in both directions between the movable object 3100 and the terminal 3112. The two-way communication can involve transmitting data from one or more transmitters of the communication system 3110 to one or more receivers of the communication system 3114, and vice-versa.

In some embodiments, the terminal 3112 can provide control data to one or more of the movable object 3100, carrier 3102, and payload 3104 and receive information from one or more of the movable object 3100, carrier 3102, and payload 3104 (e.g., position and/or motion information of the movable object, carrier or payload; data sensed by the payload such as image data captured by a payload camera). The terminal can be the same as the remote controller as described previously. In some instances, control data from the terminal may include instructions for relative positions, movements, actuations, or controls of the movable object, carrier, and/or payload. For example, the control data may result in a modification of the location and/or orientation of the movable object (e.g., via control of the propulsion mechanisms 3106), or a movement of the payload with respect to the movable object (e.g., via control of the carrier 3102). The control data from the terminal may result in control of the payload, such as control of the operation of a camera or other image capturing device (e.g., taking still or moving pictures, zooming in or out, turning on or off, switching imaging modes, change image resolution, changing focus, changing depth of field, changing exposure time, changing viewing angle or field of view). In some instances, the communications from the movable object, carrier and/or payload may include information from one or more sensors (e.g., of the sensing system 3108 or of the payload 3104). The communications may include sensed information from one or more different types of sensors (e.g., GPS sensors, motion sensors, inertial sensor, proximity sensors, or image sensors). Such information may pertain to the position (e.g., location, orientation), movement, or acceleration of the movable object, carrier, and/or payload. Such information from a payload may include data captured by the payload or a sensed state of the payload. The control data provided transmitted by the terminal 3112 can be configured to control a state of one or more of the movable object 3100, carrier 3102, or payload 3104. Alternatively or in combination, the carrier 3102 and payload 3104 can also each include a communication module configured to communicate with terminal 3112, such that the terminal can communicate with and control each of the movable object 3100, carrier 3102, and payload 3104 independently.

In some embodiments, the movable object 3100 can be configured to communicate with another remote device in addition to the terminal 3112, or instead of the terminal 3112. The terminal 3112 may also be configured to communicate with another remote device as well as the movable object 3100. For example, the movable object 3100 and/or terminal 3112 may communicate with another movable object, or a carrier or payload of another movable object. When desired, the remote device may be a second terminal or other computing device (e.g., computer, laptop, tablet, smartphone, or other mobile device). The remote device can be configured to transmit data to the movable object 3100, receive data from the movable object 3100, transmit data to the terminal 3112, and/or receive data from the terminal 3112. Optionally, the remote device can be connected to the Internet or other telecommunications network, such that data received from the movable object 3100 and/or terminal 3112 can be uploaded to a website or server.

Figure 32:
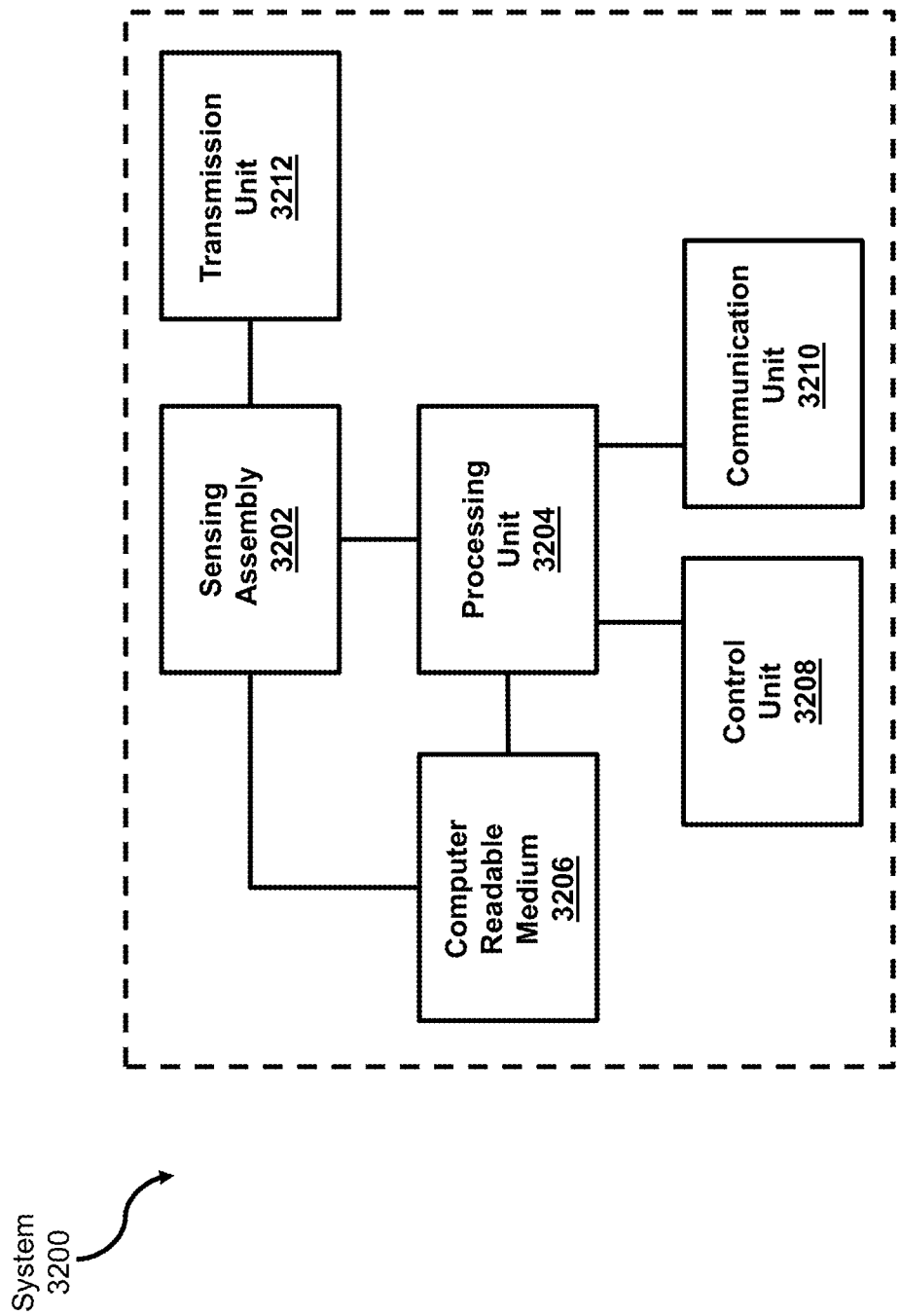
FIG. 32 illustrates an exemplary system for capturing image data, in accordance with embodiments of the disclosure.

FIG. 32 illustrates an exemplary system 3200 for capturing image data, in accordance with embodiments. The system 3200 can be used in combination with any suitable embodiment of the systems, devices, and methods disclosed herein. For example, the system 3200 may implemented or carried by a movable object. The system 3200 can include a sensing module 3202, processing unit 3204, non-transitory computer readable medium 3206, control module 3208, and communication module 3210.

The sensing module 3202 can utilize different types of sensors that collect information relating to the movable objects in different ways. Different types of sensors may sense different types of signals or signals from different sources. For example, the sensors can include inertial sensors, GPS sensors, proximity sensors (e.g., lidar), or vision/image sensors (e.g., a camera). The sensing module 3202 can be operatively coupled to a processing unit 3204 having a plurality of processors. In some embodiments, the sensing module can be operatively coupled to a transmission module 3212 (e.g., a Wi-Fi image transmission module) configured to directly transmit sensing data to a suitable external device or system. For example, the transmission module 3212 can be used to transmit images captured by one or more cameras of the sensing module 3202 to a remote terminal. For instance, the transmission module may be used to transmit images captured by multiple cameras supported by multiple gimbals to a remote terminal.

The processing unit 3204 can have one or more processors, such as a programmable processor (e.g., a central processing unit (CPU)). For example, the processing unit 3204 may include a field programmable gate array (FPGA) and/or one or more ARM processors. The processing unit 3204 can be operatively coupled to a non-transitory computer readable medium 3206. The non-transitory computer readable medium 3206 can store logic, code, and/or program instructions executable by the processing unit 3204 for performing one or more steps. The non-transitory computer readable medium can include one or more memory units (e.g., removable media or external storage such as an SD card or random access memory (RAM)). In some embodiments, data from the sensing module 3202 can be directly conveyed to and stored within the memory units of the non-transitory computer readable medium 3206. The memory units of the non-transitory computer readable medium 3206 can store logic, code and/or program instructions executable by the processing unit 3204 to perform any suitable embodiment of the methods described herein. For example, the processing unit 3204 can be configured to execute instructions causing one or more processors of the processing unit 3204 to perform the image zoom control functionalities discussed herein. The memory units can store sensing data from the sensing module to be processed by the processing unit 3204. In some embodiments, the memory units of the non-transitory computer readable medium 3206 can be used to store the processing results produced by the processing unit 3204.

In some embodiments, the processing unit 3204 can be operatively coupled to a control module 3208 configured to control a state of the movable object. For example, the control module 3208 can be configured to control the propulsion mechanisms of the movable object to adjust the spatial disposition, velocity, and/or acceleration of the movable object with respect to six degrees of freedom. Alternatively or in combination, the control module 3208 can control one or more of a state of a carrier, payload, or sensing module.

The processing unit 3204 can be operatively coupled to a communication module 3210 configured to transmit and/or receive data from one or more external devices (e.g., a terminal, display device, or other remote controller). Any suitable means of communication can be used, such as wired communication or wireless communication. For example, the communication module 3210 can utilize one or more of local area networks (LAN), wide area networks (WAN), infrared, radio, WiFi, point-to-point (P2P) networks, telecommunication networks, cloud communication, and the like. Optionally, relay stations, such as towers, satellites, or mobile stations, can be used. Wireless communications can be proximity dependent or proximity independent. In some embodiments, line-of-sight may or may not be required for communications. The communication module 3210 can transmit and/or receive one or more of sensing data from the sensing module 3202, and/or processing results produced by the processing unit 3204, predetermined control data or user commands from a terminal or remote controller, and the like.

The components of the system 3200 can be arranged in any suitable configuration. For example, one or more of the components of the system 3200 can be located on the movable object, carrier, payload, terminal, sensing system, or an additional external device in communication with one or more of the above. Additionally, although FIG. 32 depicts a single processing unit 3204 and a single non-transitory computer readable medium 3206, one of skill in the art would appreciate that this is not intended to be limiting, and that the system 3200 can include a plurality of processing units and/or non-transitory computer readable media. In some embodiments, one or more of the plurality of processing units and/or non-transitory computer readable media can be situated at different locations, such as on the movable object, carrier, payload, terminal, sensing module, additional external device in communication with one or more of the above, or suitable combinations thereof, such that any suitable aspect of the processing and/or memory functions performed by the system 3200 can occur at one or more of the aforementioned locations.

It should be understood from the foregoing that, while particular implementations have been illustrated and described, various modifications can be made thereto and are contemplated herein. It is also not intended that the disclosure be limited by the specific examples provided within the specification. While the disclosure has been described with reference to the aforementioned specification, the descriptions and illustrations of the embodiments herein are not meant to be construed in a limiting sense. Furthermore, it shall be understood that all aspects of the disclosure are not limited to the specific depictions, configurations or relative proportions set forth herein which depend upon a variety of conditions and variables. Various modifications in form and detail of the embodiments of the disclosure will be apparent to a person skilled in the art. It is therefore contemplated that the disclosure shall also cover any such modifications, variations and equivalents.

What is claimed is:

1. A method of controlling operation of a plurality of gimbals carried by a movable object, comprising:
   showing, on a display, a plurality of regions, each region associated with a respective gimbal of the plurality of gimbals and configured to depict data captured by a payload carried by the respective gimbal; and
   in response to a user interaction with a first region of the plurality of regions, the first region associated with a first gimbal of the plurality of gimbals:
      controlling operation of the first gimbal and not operation of a second gimbal of the plurality of gimbals based on the user interaction with the first region when the movable object is operating in an independent mode; and
      simultaneously controlling the operation of the first gimbal and at least the operation of the second gimbal in a synchronized manner based on the user interaction with the first region when the movable object is operating in a simultaneous mode.

2. The method of claim 1, further comprising switching between the independent mode and the simultaneous mode in response to a user input via a control interface remote to the movable object.

3. The method of claim 1, further comprising identifying the first gimbal and the second gimbal for simultaneous control based on selection of regions associated with the first gimbal and the second gimbal.

4. The method of claim 1, wherein:
   in the independent mode, the operation of the first gimbal is controlled by the user touching and dragging the data in the first region and the operation of the second gimbal is controlled by the user touching and dragging the data in a second region associated with the second gimbal; and
   in the simultaneous mode, the operation of the first gimbal and the operation of the second gimbal are controlled in a synchronized manner by the user touching and dragging a selected region of the plurality of regions.

5. The method of claim 4, wherein a non-selected region is within the selected region and smaller than the selected region.

6. The method of claim 4, wherein the data in the first region includes a first image captured by a first imaging device carried by the first gimbal, and the data in the second region includes a second image captured by a second imaging device carried by the second gimbal.

7. The method of claim 6, wherein controlling the operation of the first gimbal comprises adjusting an orientation of the first gimbal relative to the movable object, and controlling the operation of the second gimbal comprises adjusting an orientation of the second gimbal relative to the movable object.

8. The method of claim 7, wherein:
   adjusting the orientation of the first gimbal includes at least one of:
      adjusting the orientation of the first gimbal for a first rotation angle directly correlated to a degree of dragging the first image;
      adjusting the orientation of the first gimbal at a first speed directly correlated to a speed of dragging the first image; or
      adjusting the orientation of the first gimbal in a first direction directly correlated to a direction of dragging the first image; or
   adjusting the orientation of the second gimbal includes at least one of:
      adjusting the orientation of the second gimbal for a second rotation angle directly correlated to a degree of dragging the second image;
      adjusting the orientation of the second gimbal at a second speed directly correlated to a speed of dragging the second image; or
      adjusting the orientation of the second gimbal in a second direction directly correlated to a direction of dragging the second image.

9. The method of claim 1,
   wherein:
      a second region of the plurality of regions that is associated with the second gimbal is within the first region;
      the data in the first region includes a first image captured by a first imaging device carried by the first gimbal; and
      the data in the second region includes a second image captured by a second imaging device carried by the second gimbal;
   the method further comprising:
      in response to a touch of the second image in the second region, causing the second image to occupy the first region and the first image to occupy the second region.

10. The method of claim 9, wherein:
the operation of the first gimbal is controlled by touching and dragging the first image when the first image is within the first region; and
the operation of the second gimbal is controlled by touching and dragging the second image when the second image is within the first region.

11. A controller for controlling operation of a plurality of gimbals carried by a movable object, comprising:
a display configured to show a plurality of regions, each region associated with a respective gimbal of the plurality of gimbals and depicting data captured by a payload carried by the respective gimbal; and
one or more processors configured to, in response to a user interaction with a first region of the plurality of regions, the first region associated with a first gimbal of the plurality of gimbals:
control operation of the first gimbal and not operation of a second gimbal of the plurality of gimbals based on the user interaction with the first region when the movable object is operating in an independent mode; and
simultaneously control the operation of the first gimbal and at least the operation of the second gimbal in a synchronized manner based on the user interaction with the first region when the movable object is operating in a simultaneous mode.

12. The controller of claim 11, wherein the one or more processors are further configured to switch between the independent mode and the simultaneous mode in response to a user input via a control interface remote to the movable object.

13. The controller of claim 11, wherein the one or more processors are further configured to identify the first gimbal and the second gimbal for simultaneous control based on selection of regions associated with the first gimbal and the second gimbal.

14. The controller of claim 11, wherein:
in the independent mode, the operation of the first gimbal is controlled by the user touching and dragging the data in the first region and the operation of the second gimbal is controlled by the user touching and dragging the data in a second region associated with the second gimbal; and
in the simultaneous mode, the operation of the first gimbal and the operation of the second gimbal are controlled in a synchronized manner by the user touching and dragging a selected region of the plurality of regions.

15. The controller of claim 14, wherein a non-selected region is within the selected region and smaller than the selected region.

16. The controller of claim 14, wherein the data in the first region includes a first image captured by a first imaging device carried by the first gimbal, and the data in the second region includes a second image captured by a second imaging device carried by the second gimbal.

17. The controller of claim 16, wherein the one or more processors are configured to control the operation of the first gimbal by adjusting an orientation of the first gimbal relative to the movable object, and to control the operation of the second gimbal by adjusting an orientation of the second gimbal relative to the movable object.

18. The controller of claim 17, wherein:
adjusting the orientation of the first gimbal includes at least one of:
adjusting the orientation of the first gimbal for a first rotation angle directly correlated to a degree of dragging the first image;
adjusting the orientation of the first gimbal at a first speed directly correlated to a speed of dragging the first image; or
adjusting the orientation of the first gimbal in a first direction directly correlated to a direction of dragging the first image; or
adjusting the orientation of the second gimbal includes at least one of:
adjusting the orientation of the second gimbal for a second rotation angle directly correlated to a degree of dragging the second image;
adjusting the orientation of the second gimbal at a second speed directly correlated to a speed of dragging the second image; or
adjusting the orientation of the second gimbal in a second direction directly correlated to a direction of dragging the second image.

19. The controller of claim 11, wherein:
a second region of the plurality of regions that is associated with the second gimbal is within the first region;
the data in the first region includes a first image captured by a first imaging device carried by the first gimbal;
the data in the second region includes a second image captured by a second imaging device carried by the second gimbal; and
the one or more processors are further configured to, in response to a touch of the second image in the second region, cause the second image to occupy the first region and the first image to occupy the second region.

20. The controller of claim 19, wherein:
the operation of the first gimbal is controlled by touching and dragging the first image when the first image is within the first region; and
the operation of the second gimbal is controlled by touching and dragging the second image when the second image is within the first region.

* * * * *